US012707317B2

(12) United States Patent
Mehta et al.

(10) Patent No.: US 12,707,317 B2
(45) Date of Patent: Aug. 11, 2026

(54) UTILIZATION OF REPLICATED PODS WITH DISTRIBUTED UNIT APPLICATIONS

(71) Applicant: Boost SubscriberCo L.L.C., Englewood, CO (US)

(72) Inventors: Dhaval Mehta, Aldie, VA (US); Sourabh Gupta, Ashburn, VA (US); Gurpreet Sohi, Parker, CO (US)

(73) Assignee: BOOST SUBSCRIBERCO L.L.C., Englewood, CO (US)

( * ) Notice: Subject to any disclaimer, the term of this patent is extended or adjusted under 35 U.S.C. 154(b) by 869 days.

(21) Appl. No.: 17/974,983

(22) Filed: Oct. 27, 2022

(65) Prior Publication Data

US 2023/0337047 A1 Oct. 19, 2023

Related U.S. Application Data

(60) Provisional application No. 63/331,647, filed on Apr. 15, 2022.

(51) Int. Cl.
*H04W 28/02* (2009.01)
*H04W 28/18* (2009.01)

(52) U.S. Cl.
CPC ....... *H04W 28/0268* (2013.01); *H04W 28/18* (2013.01)

(58) Field of Classification Search
CPC . H04L 41/0806; H04L 67/10; H04L 67/1001; H04L 67/10015; H04L 67/1031; H04W 28/0268; H04W 28/18
See application file for complete search history.

(56) References Cited

U.S. PATENT DOCUMENTS 9,164,159 B2 10/2015 Nath et al.
9,781,685 B2 10/2017 Tsui et al.
(Continued)

FOREIGN PATENT DOCUMENTS

CN 108965485 A * 12/2018 ............. H04L 67/10
EP 3 869 847 A1 8/2021

OTHER PUBLICATIONS

International Search Report and Written Opinion for International Application No. PCT/US2023/018716, dated Aug. 1, 2023, 27 pages.

(Continued)

*Primary Examiner* — Khoa Huynh
(74) *Attorney, Agent, or Firm* — Seed Intellectual Property Law Group LLP

(57) ABSTRACT

Methods and apparatuses for improving telecommunications services by intelligently deploying radio access network components and redundant links within a data center hierarchy to satisfy latency, power, availability, and quality of service requirements for one or more network slices are described. The radio access network components may include virtualized distributed units (VDUs) and virtualized centralized units (VCUs). To satisfy a latency requirement for a network slice, various components of a radio access network may need to be redeployed closer to user equipment. To satisfy a power requirement for the network slice, various components of the radio access network may need to be redeployed closer to core network components. Over time, the components of the radio access network may be dynamically reassigned to different layers within a data center hierarchy in order to satisfy changing latency requirements and power requirements for the network slice.

16 Claims, 34 Drawing Sheets

(56) References Cited

U.S. PATENT DOCUMENTS 10,178,646 B2 1/2019 Bosch et al.
10,230,571 B2 3/2019 Rangasamy et al.
10,278,123 B2 4/2019 Wang et al.
10,452,372 B2 10/2019 Lundberg et al.
10,484,892 B2 11/2019 Bellamkonda et al.
10,499,276 B2 12/2019 Chan et al.
10,499,376 B2 12/2019 Kim
10,656,929 B2 5/2020 Jamjoom et al.
10,716,096 B2 7/2020 Yu et al.
10,812,377 B2 10/2020 Stammers et al.
10,886,976 B2 1/2021 Rajagopal et al.
10,904,038 B1 1/2021 Haque
10,944,668 B2 3/2021 Rajagopal et al.
10,986,540 B2 4/2021 Bor Yaliniz et al.
11,019,159 B2 5/2021 Lawson et al.
11,095,543 B1 8/2021 Iglesias et al.
11,128,985 B2 9/2021 Edge et al.
11,153,271 B2 10/2021 Yang et al.
11,223,994 B2 1/2022 Yang et al.
11,228,621 B2 1/2022 Sharma et al.
11,240,063 B2 2/2022 Liu et al.
11,252,655 B1 2/2022 Gupta et al.
11,284,297 B2 3/2022 Barton et al.
2002/0170053 A1 11/2002 Peterka et al.
2015/0109976 A1 4/2015 Zhang et al.
2017/0079059 A1 3/2017 Li et al.
2018/0049015 A1 2/2018 Gupta et al.
2018/0307514 A1 10/2018 Koutyrine et al.
2019/0220703 A1 7/2019 Prakash et al.
2019/0253907 A1 8/2019 Yao et al.
2019/0289497 A1 9/2019 Rajagopal
2019/0306923 A1 10/2019 Xiong et al.
2019/0349429 A1 11/2019 Jain et al.
2020/0050494 A1 2/2020 Bartfai-Walcott et al.
2020/0106536 A1 4/2020 Bedekar
2020/0125389 A1 4/2020 Palermo et al.
2020/0195495 A1 6/2020 Parker et al.
2021/0014912 A1 1/2021 Song et al.
2021/0144517 A1 5/2021 Guim Bernat et al.
2021/0144613 A1 5/2021 Colom Ikuno et al.
2021/0194821 A1 6/2021 Guim Bernat et al.
2021/0204162 A1 7/2021 Chunduri et al.
2021/0242893 A1 8/2021 Goodman et al.
2021/0258231 A1 8/2021 Venkataramu et al.
2021/0258836 A1 8/2021 Faccin et al.
2021/0306874 A1 9/2021 Bedekar
2021/0314842 A1 10/2021 Padlikar et al.
2021/0377116 A1 12/2021 Yeh et al.
2021/0392477 A1 12/2021 Taft et al.
2022/0035650 A1 2/2022 Banerjee et al.
2022/0070734 A1 3/2022 Rajagopal
2023/0422095 A1* 12/2023 Eker .................. H04L 41/0806

OTHER PUBLICATIONS

Latif et al., "Telco Meets AWS Cloud: Deploying DISH's 5G Network in AWS Cloud," accessed Jun. 22, 2023, 10 pages.
"5G Network Evolution with AWS," Amazon Web Services, Inc., https://dl.awsstatic.com/whitepapers/5g-network-evolution-with-aws.pdf, Jul. 2020, 48 pages.
"Deploying E2E 5G Network with AWS," Amazon Web Services, Inc., https://d1.awsstatic.com/architecture-diagrams/ArchitectureDiagrams/5g-with-aws-ra.pdf?did-wp_card&trk=wp_card, 2020, 1 page.
"Promoting the Deployment of 5G Open Radio Access Networks," 5G Americas, Nov. 2020, 60 pages.
"Continuous Integration and Continuous Delivery for 5G Networks on AWS," Amazon Web Services, Inc., https://docs.aws.amazon.com/whitepapers/latest/cicd_for_5g_networks_on_aws/cicd_for_5g_networks_on_aws.html, Mar. 8, 2021, 31 pages.
"Cloud Automation for 5G Network," Amazon Web Services, Inc., https://d1.awsstatic.com/whitepapers/cloud-automation-for-5g-network.pdf, Jun. 16, 2021, 22 pages.
Bye et al., "Reinventing cloud-native 5G networks," Amazon Web Services, Inc., https://www.fcc.gov/file/21588/download, 2021, 11 pages.
"Next-Generation Mobile Private Networks Powered by AWS," Amazon Web Services, Inc., https://docs.aws.amazon.com/whitepapers/latest/mobile-private-networks/mobile-private-network-components.html, Jan. 27, 2021, 29 pages.
"DISH lays the foundation for 5G network security," Dish Wireless, https://mma.prnewswire.com/media/1483423/Security_Whitepaper_CLEAN.pdf?p=original, Apr. 8, 2021, 12 pages.
"Future of the Connected Vehicle," Dish Wireless, https://www.dishwireless.com/content/dam/pdfs/wi-whitepaper-connectedcar.pdf, Jan. 6, 2022, 22 pages.
Maule et al., "Real-time Dynamic Network Slicing for the 5G Radio Access Network," Iquadrat Informatica S.L., https://ieeexplore.ieee.org/document/9013965, Dec. 9-13, 2019, 6 pages.
"Amazon EC2 Overview and Networking Introduction for Telecom Companies," Amazon Web Services, Inc., https://dl.awsstatic.com/whitepapers/amazon-ec2-networking-for-telecom.pdf, Sep. 2019, 27 pages.

* cited by examiner

UTILIZATION OF REPLICATED PODS WITH DISTRIBUTED UNIT APPLICATIONS

CROSS-REFERENCE TO RELATED APPLICATION(S)

This application claims the benefit of and priority to U.S. Application No. 63/331,647, filed Apr. 15, 2022, which is herein incorporated by reference in its entirety.

BACKGROUND

Fifth generation (5G) mobile networks have the promise to provide higher throughput, lower latency, and higher availability compared with previous global wireless standards. A combination of control and user plane separation (CUPS) and multi-access edge computing (MEC), which allows compute and storage resources to be moved from a centralized cloud location to the "edge" of a network and closer to end user devices and equipment, may enable low-latency applications with millisecond response times. A control plane may comprise a part of a network that controls how data packets are forwarded or routed. The control plane may be responsible for populating routing tables or forwarding tables to enable data plane functions. A data plane (or forwarding plane) may comprise a part of a network that forwards and routes data packets based on control plane logic. Control plane logic may also identify packets to be discarded and packets to which a high quality of service should apply.

5G networks may leverage the use of cyclic prefix orthogonal frequency-division multiplexing (CP-OFDM) to increase channel utilization and reduce interference, the use of multiple-input multiple-output (MIMO) antennas to increase spectral efficiency, and the use of millimeter wave spectrum (mmWave) operation to increase throughput and reduce latency in data transmission. 5G wireless user equipment (UE) may communicate over both a lower frequency sub-6 GHz band between 410 MHz and 7125 MHz and a higher frequency mmWave band between 24.25 GHz and 52.6 GHz. In general, although lower frequencies may provide a lower maximum bandwidth and lower data rates than higher frequencies, lower frequencies may provide higher spectral efficiency and greater range. Thus, there is a tradeoff between coverage and speed. For example, although the mmWave spectrum may provide higher data rates, the millimeter waves may not penetrate through objects, such as walls and glass, and may have a more limited range.

BRIEF SUMMARY

Systems and methods for improving telecommunications services by intelligently deploying radio access network components and redundant links within a data center hierarchy to satisfy latency, power, availability, and quality of service requirements for one or more network slices are provided. The radio access network components may include virtualized distributed units (VDUs) and virtualized centralized units (VCUs). To satisfy a latency requirement for a network slice, various components of a radio access network may need to be redeployed closer to user equipment (e.g., at a cell site used by mobile computing devices). To satisfy a power requirement for the network slice, various components of the radio access network may need to be redeployed closer to core network components (e.g., at an edge data center). Over time, the virtualized components of the radio access network may be dynamically reassigned to different layers within a data center hierarchy in order to satisfy changing latency requirements and/or power requirements for the network slice. Redundant links may be automatically generated in response to server failures and/or link failures occurring within the data center hierarchy.

Moreover, systems and methods for improving telecommunications services using virtualized network functions are also provided. The virtualized network functions may be deployed across different data centers with varying electrical distances from user equipment and devices. The user devices may include mobile computing devices, such as laptop computers and smartphones. One or more of the virtualized network functions may be assigned to computing resources within a particular data center based on latency requirements, power requirements, and/or quality of service requirements for one or more network slices supported by the virtualized network functions. A network slice may comprise an end-to-end logical communications network that extends from a user device to a data network. A network slice may comprise a set of virtualized network functions. The set of virtualized networks functions may include a set of shared core network functions that are shared by two or more network slices.

According to some embodiments, the technical benefits of the systems and methods disclosed herein include increasing system availability, decreasing system downtime, reducing data communication latency, enabling real-time interactivity between user equipment and cloud-based services, increasing data rates such that user equipment (e.g., wireless electronic devices) and data networks may transmit and receive content more quickly, and reducing energy consumption of the computing and data storage resources required for providing a telecommunications infrastructure.

In some embodiments, a telecommunications network may increase system availability by determining a first number of replica pods for a virtualized distributed unit that performs medium access control layer operations, detecting that the first number of replica pods is different than a number of pods running the virtualized distributed unit, and transmitting an instruction or a control signal to a replication controller to adjust the number of pods running the virtualized distributed unit to the first number of replica pods. In some cases, the method may further include determining a service availability for the virtualized distributed unit and adjusting the first number of replica pods for the virtualized distributed unit based on the service availability.

BRIEF DESCRIPTION OF THE DRAWINGS

Like-numbered elements may refer to common components in the different figures.

FIGS. 2A-2D depicts various embodiment of a radio access network.

DETAILED DESCRIPTION

Figure 1A:
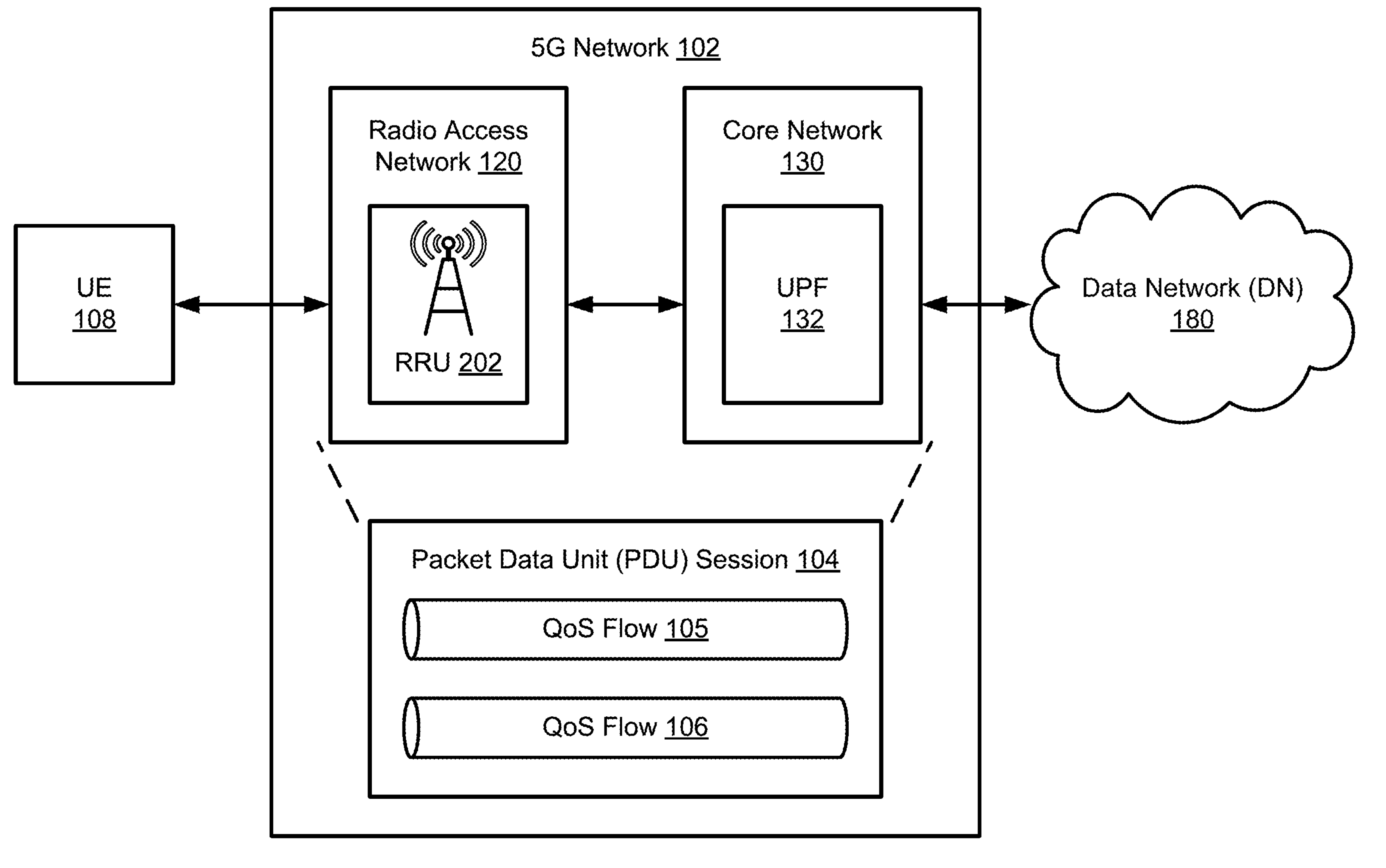
FIG. 1A depicts an embodiment of a 5G network including a radio access network (RAN) and a core network.

Technology is described for improving telecommunications services by intelligently deploying radio access network components and redundant links within a data center hierarchy to satisfy latency, power, availability, and quality of service requirements for one or more network slices. The radio access network components may include virtualized distributed units (VDUs) and virtualized centralized units (VCUs). In some embodiments, to satisfy a reduced latency requirement for a network slice, various components of a radio access network, such as a VDU and/or a VCU, may need to be redeployed closer to user equipment (e.g., at a cell site). In some embodiments, to meet a reduced power requirement for the network slice, various components of the radio access network may need to be redeployed closer to the core network components (e.g., at an edge data center). In some embodiments, various components of the radio access network may be dynamically reassigned to different layers within a data center hierarchy in order to satisfy changing latency requirements and power requirements for the network slice.

Technical benefits of intelligently deploying radio access network components and redundant links within the data center hierarchy includes reduced downtime and increased system availability. One technical issue with dynamically assigning radio access network components to computing resources (e.g., servers) may be increased power consumption due to the redeployment of virtualized components. Technical issues with utilizing redundant links may include increased virtual infrastructure cost and increased power consumption to support the redundant links. Technical benefits of dynamically assigning radio access network components to computing resources (e.g., servers) as changes in latency, power, availability, and/or quality of service requirements occur to network slices over time, are that system performance may be increased, packet delay variation may be reduced, end-to-end latency may be reduced, and overall power consumption for implementing the network slices may be reduced.

A telecommunications link (or link) may refer to a communications channel that electrically connects two or more electronic devices. A communications channel may refer to a wireless communications channel, a physical transmission medium (e.g., a wire or cable), or to a logical connection over a multiplexed medium (e.g., a radio channel). The two or more electronic devices may include routers, servers, and computing devices. The communications channel may allow data transmissions (e.g., data packets) to be exchanged between the two or more electronic devices. In some cases, a link may comprise a physical link or a virtual circuit that uses one or more physical links.

A redundant link may comprise a duplicate link between a router within a first layer of a data center hierarchy and one or more other routers within a second layer of the data center hierarchy. In one example, the first layer of the data center hierarchy may correspond with a cell site layer and the second layer of the data center hierarchy may correspond with a local data center. A redundant link may comprise a redundant link between two different data centers or between two server clusters located in different layers of the data center hierarchy that prevents a routing failure from being a single point of failure for a network connection. In some cases, the redundant link may provide load sharing between the two different data centers or between the server clusters.

In some embodiments, redundant links may be dynamically generated in response to server failures (e.g., due to hardware failures or virtual machine failures) and/or link failures that affect virtualized radio access network components. In one example, if it is detected that a first failure rate corresponding with a first set of machines residing within a first data center layer has exceeded a threshold failure rate (e.g., more than two failures over the past 24 hours), then a redundant link to the first set of machines residing within the first data center layer may be removed or bypassed and a new redundant link to a different set of machines residing within a second data center layer may be generated or instantiated such that the new redundant link connects to a set of machines that have not exceeded the threshold failure rate.

Application containers (or containers) may allow applications to be bundled with their own libraries and configuration files, and then executed in isolation on a single operating system (OS) kernel. In some cases, a container may include the compiled code for an application (e.g., composed of microservices) along with the binaries and libraries necessary to execute the application. A pod may refer to or comprise one or more containers with shared computing, storage, and networking resources. A pod may be run on a node, which may comprise a virtual machine or a physical machine. A plurality of nodes or machines may correspond with a cluster. Each pod may communicate with other pods running on the same node or other nodes in a cluster.

In some embodiments, the number of replica pods for a virtualized distributed unit may be adjusted over time based on power requirements and system availability requirements. In one example, the total number of replica pods across every virtualized distributed unit running within a server cluster (or a node cluster) may be set based on a maximum power requirement for the entire cluster. The number of replica pods per virtualized distributed unit may be determined such that service availability for the virtualized distributed units with a high-availability configuration or high-availability requirement are satisfied first subject to a maximum power requirement for the server cluster (or node cluster) executing the virtualized distributed units. The server cluster (or node cluster) may run the virtualized distributed units as containerized applications and may run the virtualized distributed units using a plurality of virtual machines or a plurality of physical machines.

In some cases, various virtualized network functions for a network slice may be assigned to different computing resources (e.g., servers or virtual machines) across a data center hierarchy based on latency requirements, power requirements, and/or quality of service requirements. In some embodiments, the assignment of a user plane function to a particular server or to a machine (e.g., a real or virtual machine) within a particular data center layer of the data center hierarchy may be determined based on a maximum latency requirement for a network slice. In one example, a server within a local data center may be selected for running the user plane function to ensure that a 2 ms one-way latency from a mobile computing device to the server may be sustained. In some embodiments, a server within an edge data center may be selected for running a virtualized distributed unit if at least a 1 ms one-way latency from a mobile computing device to the server may be obtained or sustained. In other embodiments, a server within an edge data center may be selected for running a user plane function if at least a 1 ms one-way latency from a virtualized distributed unit to the user plane function may be obtained or sustained. The server assignments of both a virtualized distributed unit and a user plane function associated with a network slice may change over time in order to satisfy latency, power, and quality of service requirements for the network slice.

In some cases, a set of shared core network functions that are shared by two or more network slices may be identified based on latency requirements, power requirements, and/or quality of service requirements for the two or more network slices. In some embodiments, the set of shared core network functions may be identified based on a first latency requirement associated with a first network slice and a second latency requirement for a second network slice. In other embodiments, the set of shared core network functions may be identified based on a first power requirement associated with a first network slice and a second power requirement for a second network slice. A first set of network functions for the first network slice may include the set of shared core network functions and a second set of network functions for the second network slice may include the same set of shared core network functions. Data communications (e.g., data packets) from a mobile computing device to one or more data networks may be concurrently transferred using both the first network slice and the second network slice.

In some cases, one or more quality of service parameters associated with a network slice may be used to assign virtualized network functions for the network slice to computing resources within a data center hierarchy. The computing resources may include hardware servers, virtual servers, real machines, and virtual machines. One or more of the virtualized network functions may be implemented as containerized applications or microservices. The one or more quality of service parameters may specify requirements for a bit rate, a bit error rate, a throughput, a packet loss, a maximum packet loss rate, a packet error rate, a packet delay variation, an end-to-end latency, a point-to-point latency between virtualized network functions, a network availability, and a network bandwidth associated with the network slice. The point-to-point latency between two virtualized network functions may comprise a one-way data latency between a virtualized distributed unit and a user plane function. Over time, quality of service parameters associated with the network slice may be updated (e.g., a maximum latency requirement may be relaxed or increased from 1 ms to 5 ms) causing a reassignment of the virtualized network functions for the network slice to different computing resources within the data center hierarchy.

FIG. 1A depicts an embodiment of a 5G network 102 including a radio access network (RAN) 120 and a core network 130. The radio access network 120 may comprise a new-generation radio access network (NG-RAN) that uses the 5G new radio interface (NR). The 5G network 102 connects user equipment (UE) 108 to the data network (DN) 180 using the radio access network 120 and the core network 130. The data network 180 may comprise the Internet, a local area network (LAN), a wide area network (WAN), a private data network, a wireless network, a wired network, or a combination of networks. The UE 108 may comprise an electronic device with wireless connectivity or cellular communication capability, such as a mobile phone or handheld computing device. In at least one example, the UE 108 may comprise a 5G smartphone or a 5G cellular device that connects to the radio access network 120 via a wireless connection. The UE 108 may comprise one of a number of UEs not depicted that are in communication with the radio access network 120. The UEs may include mobile and non-mobile computing devices. The UEs may include laptop computers, desktop computers, an Internet-of-Things (IoT) devices, and/or any other electronic computing device that includes a wireless communications interface to access the radio access network 120.

The radio access network 120 includes a remote radio unit (RRU) 202 for wirelessly communicating with UE 108. The remote radio unit (RRU) 202 may comprise a radio unit (RU) and may include one or more radio transceivers for wirelessly communicating with UE 108. The remote radio unit (RRU) 202 may include circuitry for converting signals sent to and from an antenna of a base station into digital signals for transmission over packet networks. The radio access network 120 may correspond with a 5G radio base station that connects user equipment to the core network 130. The 5G radio base station may be referred to as a generation Node B, a "gNodeB," or a "gNB." A base station may refer to a network element that is responsible for the transmission and reception of radio signals in one or more cells to or from user equipment, such as UE 108.

The core network 130 may utilize a cloud-native service-based architecture (SBA) in which different core network functions (e.g., authentication, security, session management, and core access and mobility functions) are virtualized and implemented as loosely coupled independent services that communicate with each other, for example, using HTTP protocols and APIs. In some cases, control plane (CP) functions may interact with each other using the service-based architecture. In at least one embodiment, a microservices-based architecture in which software is composed of small independent services that communicate over well-defined APIs may be used for implementing some of the core network functions. For example, control plane (CP) network functions for performing session management may be implemented as containerized applications or microservices. Although a microservice-based architecture does not necessarily require a container-based implementation, a container-based implementation may offer improved scalability and availability over other approaches. Network functions that have been implemented using microservices may store their state information using the unstructured data storage function (UDSF) that supports data storage for stateless network functions across the service-based architecture (SBA).

The primary core network functions may comprise the access and mobility management function (AMF), the session management function (SMF), and the user plane function (UPF). The UPF (e.g., UPF 132) may perform packet processing including routing and forwarding, quality of service (QoS) handling, and packet data unit (PDU) session management. The UPF may serve as an ingress and egress point for user plane traffic and provide anchored mobility support for user equipment. For example, the UPF 132 may provide an anchor point between the UE 108 and the data network 180 as the UE 108 moves between coverage areas. The AMF may act as a single-entry point for a UE connection and perform mobility management, registration management, and connection management between a data network and UE. The SMF may perform session management, user plane selection, and IP address allocation.

Other core network functions may include a network repository function (NRF) for maintaining a list of available network functions and providing network function service registration and discovery, a policy control function (PCF) for enforcing policy rules for control plane functions, an authentication server function (AUSF) for authenticating user equipment and handling authentication related functionality, a network slice selection function (NSSF) for selecting network slice instances, and an application function (AF) for providing application services. Application-level session information may be exchanged between the AF and PCF (e.g., bandwidth requirements for QoS). In some cases, when user equipment requests access to resources, such as establishing a PDU session or a QoS flow, the PCF may dynamically decide if the user equipment should grant the requested access based on a location of the user equipment.

A network slice may comprise an independent end-to-end logical communications network that includes a set of logically separated virtual network functions. Network slicing may allow different logical networks or network slices to be implemented using the same compute and storage infrastructure. Therefore, network slicing may allow heterogeneous services to coexist within the same network architecture via allocation of network computing, storage, and communication resources among active services. In some cases, the network slices may be dynamically created and adjusted over time based on network requirements. For example, some networks may require ultra-low-latency or ultra-reliable services. To meet ultra-low-latency requirements, components of the radio access network 120, such as a distributed unit (DU) and a centralized unit (CU), may need to be deployed at a cell site or in a local data center (LDC) that is in close proximity to a cell site such that the latency requirements are satisfied (e.g., such that the one-way latency from the cell site to the DU component or CU component is less than 1.2 ms).

In some embodiments, the distributed unit (DU) and the centralized unit (CU) of the radio access network 120 may be co-located with the remote radio unit (RRU) 202. In other embodiments, the distributed unit (DU) and the remote radio unit (RRU) 202 may be co-located at a cell site and the centralized unit (CU) may be located within a local data center (LDC).

The 5G network 102 may provide one or more network slices, wherein each network slice may include a set of network functions that are selected to provide specific telecommunications services. For example, each network slice may comprise a configuration of network functions, network applications, and underlying cloud-based compute and storage infrastructure. In some cases, a network slice may correspond with a logical instantiation of a 5G network, such as an instantiation of the 5G network 102. In some cases, the 5G network 102 may support customized policy configuration and enforcement between network slices per service level agreements (SLAs) within the radio access network (RAN) 120. User equipment, such as UE 108, may connect to multiple network slices at the same time (e.g., eight different network slices). In one embodiment, a PDU session, such as PDU session 104, may belong to only one network slice instance.

In some cases, the 5G network 102 may dynamically generate network slices to provide telecommunications services for various use cases, such the enhanced Mobile Broadband (eMIBB), Ultra-Reliable and Low-Latency Communication (URLCC), and massive Machine Type Communication (mMTC) use cases.

A cloud-based compute and storage infrastructure may comprise a networked computing environment that provides a cloud computing environment. Cloud computing may refer to Internet-based computing, wherein shared resources, software, and/or information may be provided to one or more computing devices on-demand via the Internet (or other network). The term "cloud" may be used as a metaphor for the Internet, based on the cloud drawings used in computer networking diagrams to depict the Internet as an abstraction of the underlying infrastructure it represents.

The core network 130 may include a plurality of network elements that are configured to offer various data and telecommunications services to subscribers or end users of user equipment, such as UE 108. Examples of network elements include network computers, network processors, networking hardware, networking equipment, routers, switches, hubs, bridges, radio network controllers, gateways, servers, virtualized network functions, and network functions virtualization infrastructure. A network element may comprise a real or virtualized component that provides wired or wireless communication network services.

Virtualization allows virtual hardware to be created and decoupled from the underlying physical hardware. One example of a virtualized component is a virtual router (or a vRouter). Another example of a virtualized component is a virtual machine. A virtual machine may comprise a software implementation of a physical machine. The virtual machine may include one or more virtual hardware devices, such as a virtual processor, a virtual memory, a virtual disk, or a virtual network interface card. The virtual machine may load and execute an operating system and applications from the virtual memory. The operating system and applications used by the virtual machine may be stored using the virtual disk. The virtual machine may be stored as a set of files including a virtual disk file for storing the contents of a virtual disk and a virtual machine configuration file for storing configuration settings for the virtual machine. The configuration settings may include the number of virtual processors (e.g., four virtual CPUs), the size of a virtual memory, and the size of a virtual disk (e.g., a 64 GB virtual disk) for the virtual machine. Another example of a virtualized component is a software container or an application container that encapsulates an application's environment.

In some embodiments, applications and services may be run using virtual machines instead of containers in order to improve security. A common virtual machine may also be used to run applications and/or containers for a number of closely related network services.

The 5G network 102 may implement various network functions, such as the core network functions and radio access network functions, using a cloud-based compute and storage infrastructure. A network function may be implemented as a software instance running on hardware or as a virtualized network function. Virtual network functions (VNFs) may comprise implementations of network functions as software processes or applications. In at least one example, a virtual network function (VNF) may be implemented as a software process or application that is run using virtual machines (VMs) or application containers within the cloud-based compute and storage infrastructure. Application containers (or containers) allow applications to be bundled with their own libraries and configuration files, and then executed in isolation on a single operating system (OS) kernel. Application containerization may refer to an OS-level virtualization method that allows isolated applications to be run on a single host and access the same OS kernel. Containers may run on bare-metal systems, cloud instances, and virtual machines. Network functions virtualization may be used to virtualize network functions, for example, via virtual machines, containers, and/or virtual hardware that runs processor readable code or executable instructions stored in one or more computer-readable storage mediums (e.g., one or more data storage devices).

As depicted in FIG. 1A, the core network 130 includes a user plane function (UPF) 132 for transporting IP data traffic (e.g., user plane traffic) between the UE 108 and the data network 180 and for handling packet data unit (PDU) sessions with the data network 180. The UPF 132 may comprise an anchor point between the UE 108 and the data network 180. The UPF 132 may be implemented as a software process or application running within a virtualized infrastructure or a cloud-based compute and storage infrastructure. The 5G network 102 may connect the UE 108 to the data network 180 using a packet data unit (PDU) session 104, which may comprise part of an overlay network.

The PDU session 104 may utilize one or more quality of service (QoS) flows, such as QoS flows 105 and 106, to exchange traffic (e.g., data and voice traffic) between the UE 108 and the data network 180. The one or more QoS flows may comprise the finest granularity of QoS differentiation within the PDU session 104. The PDU session 104 may belong to a network slice instance through the 5G network 102. To establish user plane connectivity from the UE 108 to the data network 180, an AMF that supports the network slice instance may be selected and a PDU session via the network slice instance may be established. In some cases, the PDU session 104 may be of type IPv4 or IPv6 for transporting IP packets. The radio access network 120 may be configured to establish and release parts of the PDU session 104 that cross the radio interface.

The radio access network 120 may include a set of one or more remote radio units (RRUs) that includes radio transceivers (or combinations of radio transmitters and receivers) for wirelessly communicating with UEs. The set of RRUs may correspond with a network of cells (or coverage areas) that provide continuous or nearly continuous overlapping service to UEs, such as UE 108, over a geographic area. Some cells may correspond with stationary coverage areas and other cells may correspond with coverage areas that change over time (e.g., due to movement of a mobile RRU).

In some cases, the UE 108 may be capable of transmitting signals to and receiving signals from one or more RRUs within the network of cells over time. One or more cells may correspond with a cell site. The cells within the network of cells may be configured to facilitate communication between UE 108 and other UEs and/or between UE 108 and a data network, such as data network 180. The cells may include macrocells (e.g., capable of reaching 18 miles) and small cells, such as microcells (e.g., capable of reaching 1.2 miles), picocells (e.g., capable of reaching 0.12 miles), and femtocells (e.g., capable of reaching 32 feet). Small cells may communicate through macrocells. Although the range of small cells may be limited, small cells may enable mmWave frequencies with high-speed connectivity to UEs within a short distance of the small cells. Macrocells may transit and receive radio signals using multiple-input multiple-output (MIMO) antennas that may be connected to a cell tower, an antenna mast, or a raised structure.

Referring to FIG. 1A, the UPF 132 may be responsible for routing and forwarding user plane packets between the radio access network 120 and the data network 180. Uplink packets arriving from the radio access network 120 may use a general packet radio service (GPRS) tunneling protocol (or GTP tunnel) to reach the UPF 132. The GPRS tunneling protocol for the user plane may support multiplexing of traffic from different PDU sessions by tunneling user data over the interface between the radio access network 120 and the UPF 132.

The UPF 132 may remove the packet headers belonging to the GTP tunnel before forwarding the user plane packets towards the data network 180. As the UPF 132 may provide connectivity towards other data networks in addition to the data network 180, the UPF 132 must ensure that the user plane packets are forwarded towards the correct data network. Each GTP tunnel may belong to a specific PDU session, such as PDU session 104. Each PDU session may be set up towards a specific data network name (DNN) that uniquely identifies the data network to which the user plane packets should be forwarded. The UPF 132 may keep a record of the mapping between the GTP tunnel, the PDU session, and the DNN for the data network to which the user plane packets are directed.

Downlink packets arriving from the data network 180 are mapped onto a specific QoS flow belonging to a specific PDU session before forwarded towards the appropriate radio access network 120. A QoS flow may correspond with a stream of data packets that have equal quality of service (QoS). A PDU session may have multiple QoS flows, such as the QoS flows 105 and 106 that belong to PDU session 104. The UPF 132 may use a set of service data flow (SDF) templates to map each downlink packet onto a specific QoS flow. The UPF 132 may receive the set of SDF templates from a session management function (SMF), such as the SMF 133 depicted in FIG. 1B, during setup of the PDU session 104. The SMF may generate the set of SDF templates using information provided from a policy control function (PCF), such as the PCF 135 depicted in FIG. 1C. The UPF 132 may track various statistics regarding the volume of data transferred by each PDU session, such as PDU session 104, and provide the information to an SMF.

Figure 1B:
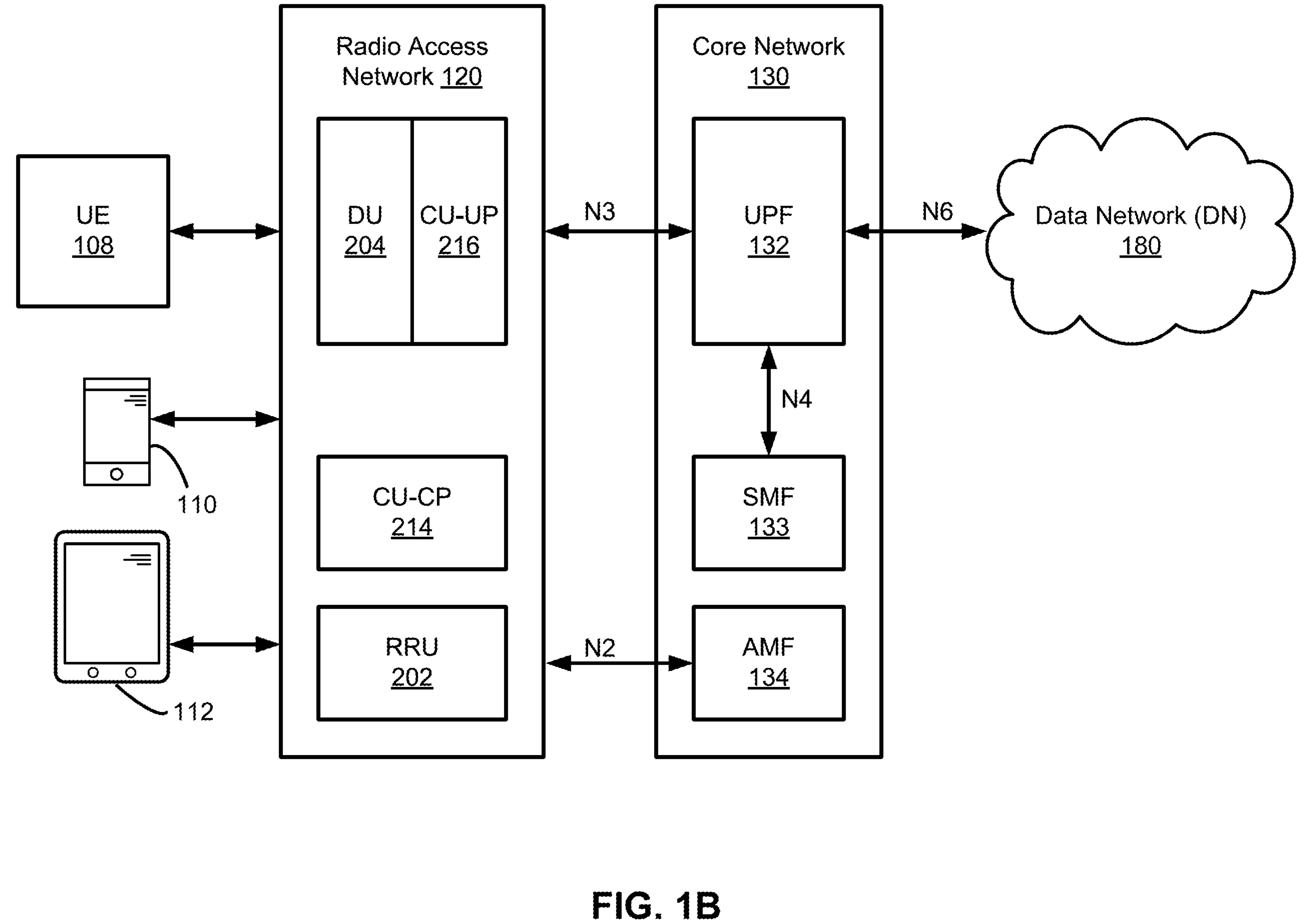
FIGS. 1B-1C depict various embodiments of a radio access network and a core network for providing a communications channel (or channel) between user equipment and data network.

FIG. 1B depicts an embodiment of a radio access network 120 and a core network 130 for providing a communications channel (or channel) between user equipment and data network 180. The communications channel may comprise a pathway through which data is communicated between the UE 108 and the data network 180. The user equipment in communication with the radio access network 120 includes UE 108, mobile phone 110, and mobile computing device 112. The user equipment may include a plurality of electronic devices, including mobile computing device and non-mobile computing device.

The core network 130 includes network functions such as an access and mobility management function (AMF) 134, a session management function (SMF) 133, and a user plane function (UPF) 132. The AMF may interface with user equipment and act as a single-entry point for a UE connection. The AMF may interface with the SMF to track user sessions. The AMF may interface with a network slice selection function (NSSF) not depicted to select network slice instances for user equipment, such as UE 108. When user equipment is leaving a first coverage area and entering a second coverage area, the AMF may be responsible for coordinating the handoff between the coverage areas whether the coverage areas are associated with the same radio access network or different radio access networks.

The UPF 132 may transfer downlink data received from the data network 180 to user equipment, such as UE 108, via the radio access network 120 and/or transfer uplink data received from user equipment to the data network 180 via the radio access network 180. An uplink may comprise a radio link though which user equipment transmits data and/or control signals to the radio access network 120. A downlink may comprise a radio link through which the radio access network 120 transmits data and/or control signals to the user equipment.

The radio access network 120 may be logically divided into a remote radio unit (RRU) 202, a distributed unit (DU) 204, and a centralized unit (CU) that is partitioned into a CU user plane portion CU-UP 216 and a CU control plane portion CU-CP 214. The CU-UP 216 may correspond with the centralized unit for the user plane and the CU-CP 214 may correspond with the centralized unit for the control plane. The CU-CP 214 may perform functions related to a control plane, such as connection setup, mobility, and security. The CU-UP 216 may perform functions related to a user plane, such as user data transmission and reception functions. Additional details of radio access networks are described in reference to FIG. 2A.

Decoupling control signaling in the control plane from user plane traffic in the user plane may allow the UPF 132 to be positioned in close proximity to the edge of a network compared with the AMF 134. As a closer geographic or topographic proximity may reduce the electrical distance, this means that the electrical distance from the UPF 132 to the UE 108 may be less than the electrical distance of the AMF 134 to the UE 108. The radio access network 120 may be connected to the AMF 134, which may allocate temporary unique identifiers, determine tracking areas, and select appropriate policy control functions (PCFs) for user equipment, via an N2 interface. The N3 interface may be used for transferring user data (e.g., user plane traffic) from the radio access network 120 to the user plane function UPF 132 and may be used for providing low-latency services using edge computing resources. The electrical distance from the UPF 132 (e.g., located at the edge of a network) to user equipment, such as UE 108, may impact the latency and performance services provided to the user equipment. The UE 108 may be connected to the SMF 133 via an N1 interface not depicted, which may transfer UE information directly to the AMF 134. The UPF 132 may be connected to the data network 180 via an N6 interface. The N6 interface may be used for providing connectivity between the UPF 132 and other external or internal data networks (e.g., to the Internet). The radio access network 120 may be connected to the SMF 133, which may manage UE context and network handovers between base stations, via the N2 interface. The N2 interface may be used for transferring control plane signaling between the radio access network 120 and the AMF 134.

The RRU 202 may perform physical layer functions, such as employing orthogonal frequency-division multiplexing (OFDM) for downlink data transmission. In some cases, the DU 204 may be located at a cell site (or a cellular base station) and may provide real-time support for lower layers of the protocol stack, such as the radio link control (RLC) layer and the medium access control (MAC) layer. The CU may provide support for higher layers of the protocol stack, such as the service data adaptation protocol (SDAP) layer, the packet data convergence control (PDCP) layer, and the radio resource control (RRC) layer. The SDAP layer may comprise the highest L2 sublayer in the 5G NR protocol stack. In some embodiments, a radio access network may correspond with a single CU that connects to multiple DUs (e.g., 10 DUs), and each DU may connect to multiple RRUs (e.g., 18 RRUs). In this case, a single CU may manage 10 different cell sites (or cellular base stations) and 180 different RRUs.

In some embodiments, the radio access network 120 or portions of the radio access network 120 may be implemented using multi-access edge computing (MEC) that allows computing and storage resources to be moved closer to user equipment. Allowing data to be processed and stored at the edge of a network that is located close to the user equipment may be necessary to satisfy low-latency application requirements. In at least one example, the DU 204 and CU-UP 216 may be executed as virtual instances within a data center environment that provides single-digit millisecond latencies (e.g., less than 2 ms) from the virtual instances to the UE 108.

Figure 1C:
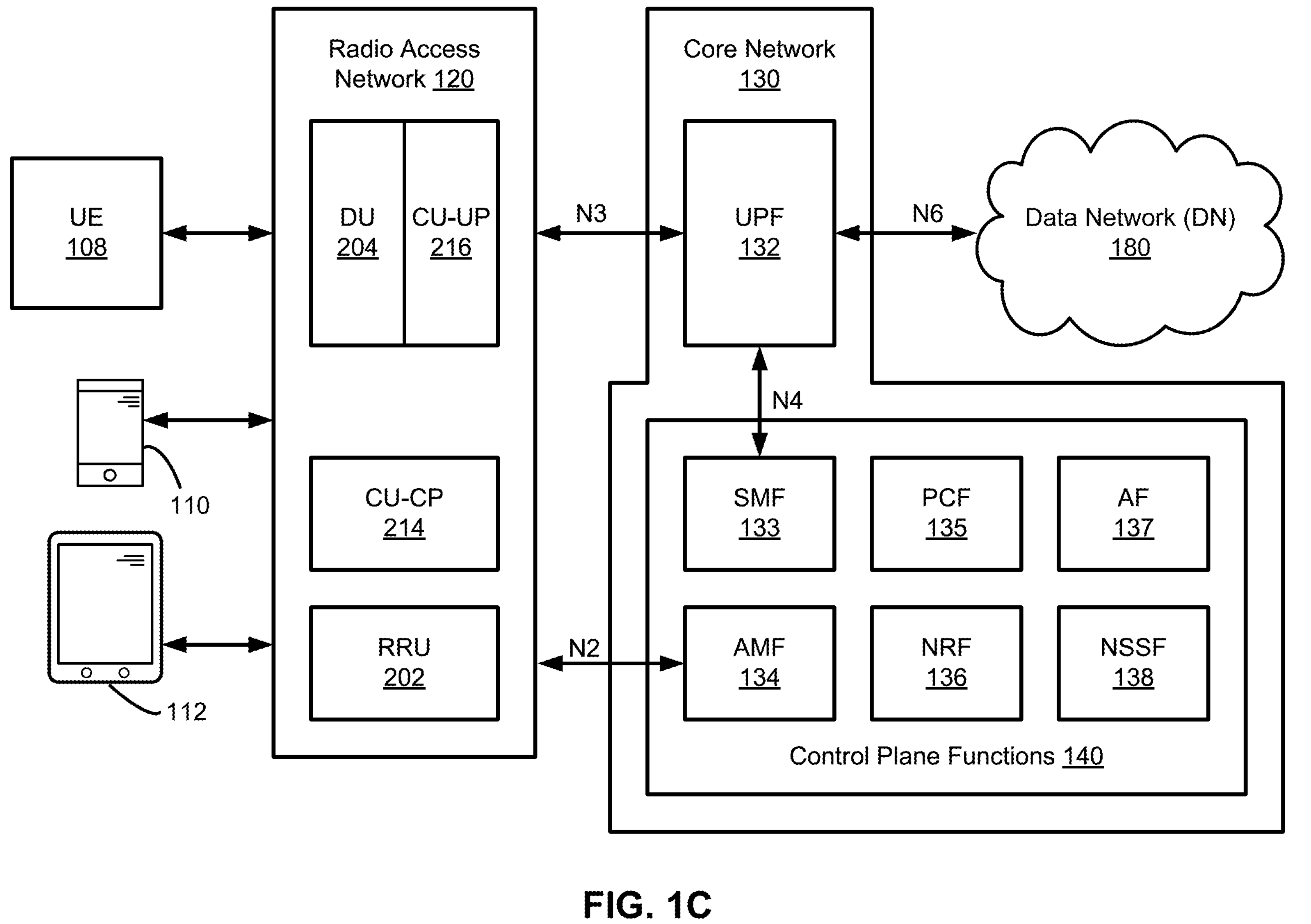

FIG. 1C depicts an embodiment of a radio access network 120 and a core network 130 for providing a communications channel (or channel) between user equipment and data network 180. The core network 130 includes UPF 132 for handling user data in the core network 130. Data is transported between the radio access network 120 and the core network 130 via the N3 interface. The data may be tunneled across the N3 interface (e.g., IP routing may be done on the tunnel header IP address instead of using end user IP addresses). This may allow for maintaining a stable IP anchor point even though UE 108 may be moving around a network of cells or moving from one coverage area into another coverage area. The UPF 132 may connect to external data networks, such as the data network 180 via the N6 interface. The data may not be tunneled across the N6 interface as IP packets may be routed based on end user IP addresses. The UPF 132 may connect to the SMF 133 via the N4 interface.

As depicted, the core network 130 includes a group of control plane functions 140 comprising SMF 133, AMF 134, PCF 135, NRF 136, AF 137, and NSSF 138. The SMF 133 may configure or control the UPF 132 via the N4 interface. For example, the SMF 133 may control packet forwarding rules used by the UPF 132 and adjust QoS parameters for QoS enforcement of data flows (e.g., limiting available data rates). In some cases, multiple SMF/UPF pairs may be used to simultaneously manage user plane traffic for a particular user device, such as UE 108. For example, a set of SMFs may be associated with UE 108, wherein each SMF of the set of SMFs corresponds with a network slice. The SMF 133 may control the UPF 132 on a per end user data session basis, in which the SMF 133 may create, update, and remove session information in the UPF 132.

In some cases, the SMF 133 may select an appropriate UPF for a user plane path by querying the NRF 136 to identify a list of available UPFs and their corresponding capabilities and locations. The SMF 133 may select the UPF 132 based on a physical location of the UE 108 and a physical location of the UPF 132 (e.g., corresponding with a physical location of a data center in which the UPF 132 is running). The SMF 133 may also select the UPF 132 based on a particular network slice supported by the UPF 132 or based on a particular data network that is connected to the UPF 132. The ability to query the NRF 136 for UPF information eliminates the need for the SMF 133 to store and update the UPF information for every available UPF within the core network 130.

In some embodiments, the SMF 133 may query the NRF 136 to identify a set of available UPFs for a packet data unit (PDU) session and acquire UPF information from a variety of sources, such as the AMF 134 or the UE 108. The UPF information may include a location of the UPF 132, a location of the UE 108, the UPF's dynamic load, the UPF's static capacity among UPFs supporting the same data network, and the capability of the UPF 132.

The radio access network 120 may provide separation of the centralized unit for the control plane (CU-CP) 216 and the centralized unit for the user plane (CU-UP) 214 functionalities while supporting network slicing. The CU-CP 216 may obtain resource utilization and latency information from the DU 204 and/or the CU-UP 216, and select a CU-UP to pair with the DU 204 based on the resource utilization and latency information in order to configure a network slice. Network slice configuration information associated with the network slice may be provided to the UE 108 for purposes of initiating communication with the UPF 132 using the network slice.

Figure 1D:
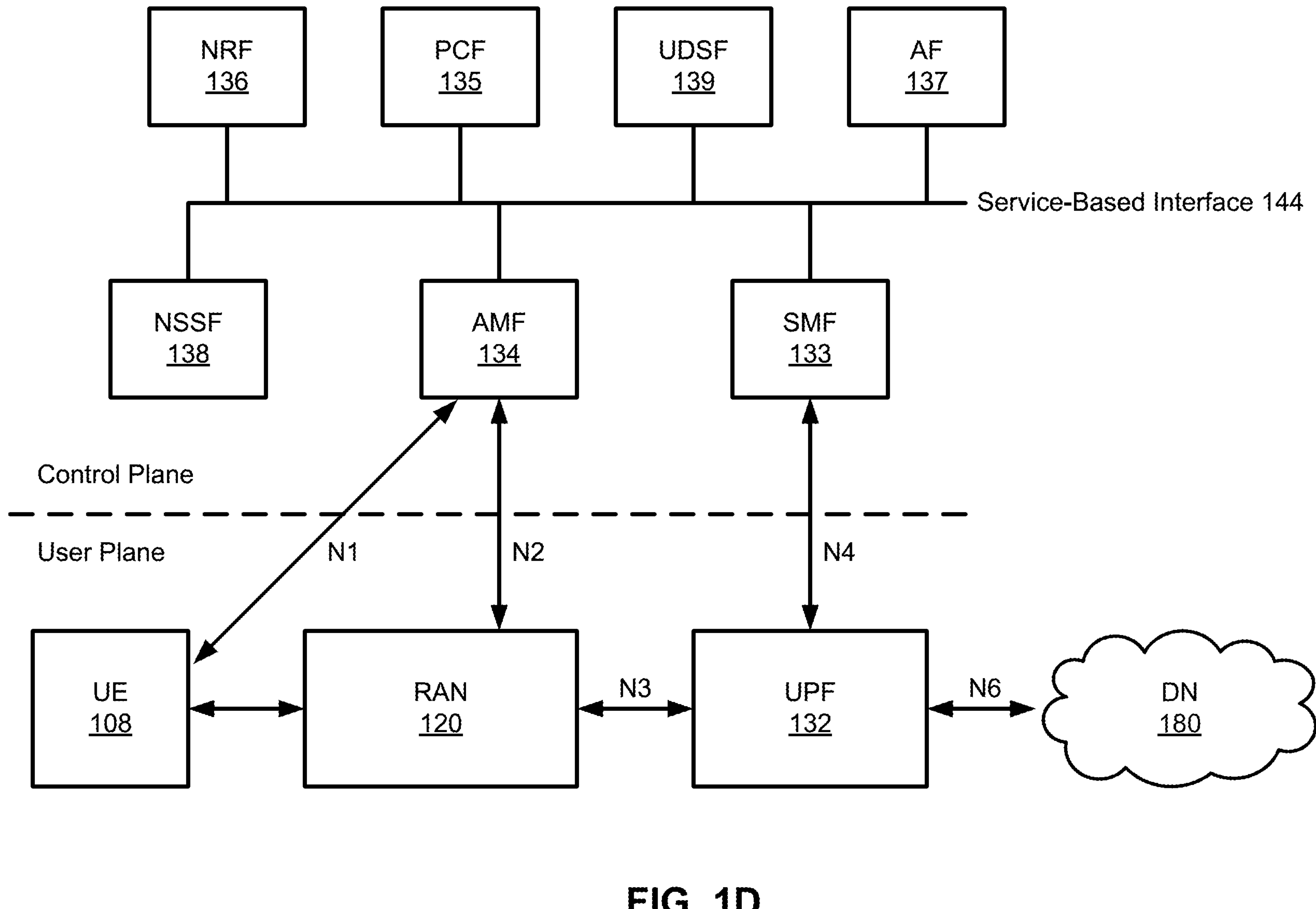
FIG. 1D depicts one embodiment of network functions interacting between user and control planes.

FIG. 1D depicts one embodiment of network functions interacting between user and control planes. The logical connections between the network functions depicted in FIG. 1D should not be interpreted as direct physical connections. The RAN 120 is connected to the user plane function UPF 132 via interface N3. The UPF 132 is connected to the data network DN 180 via the No interface. In some cases, the data network DN 180 may represent an edge computing network or resources, such as a mobile edge computing (MEC) network. UE 108 connects to the AMF 134, which is responsible for authentication and authorization of access requests, as well as mobility management functions via the N1 interface.

In a service-based view, the AMF 134 may communicate with other network functions through a service-based interface 144 using application programming interfaces (APIs). The SMF 133 may comprise a network function that is responsible for the allocation and management of IP addresses that are assigned to the UE 108, as well as the selection of the UPF 132 for traffic associated with a particular PDU session for the UE 108. The SMF 133 may also communicate with other network functions through the service-based interface 144 using application programming interfaces (APIs). Each of the network functions NRF 136, PCF 135, UDSF 139, AF 137, NSSF 138, AMF 134, and SMF 133 may communicate with each other via the service-based interface 144 using application programming interfaces (APIs). The unstructured data storage function (UDSF) 139 may provide service interfaces to store, update, read, and delete network function data. Using the UDSF 139, network functions such as the PCF 135, SMF 133, and AMF 134 may remain stateless or primarily stateless.

Figure 1E:
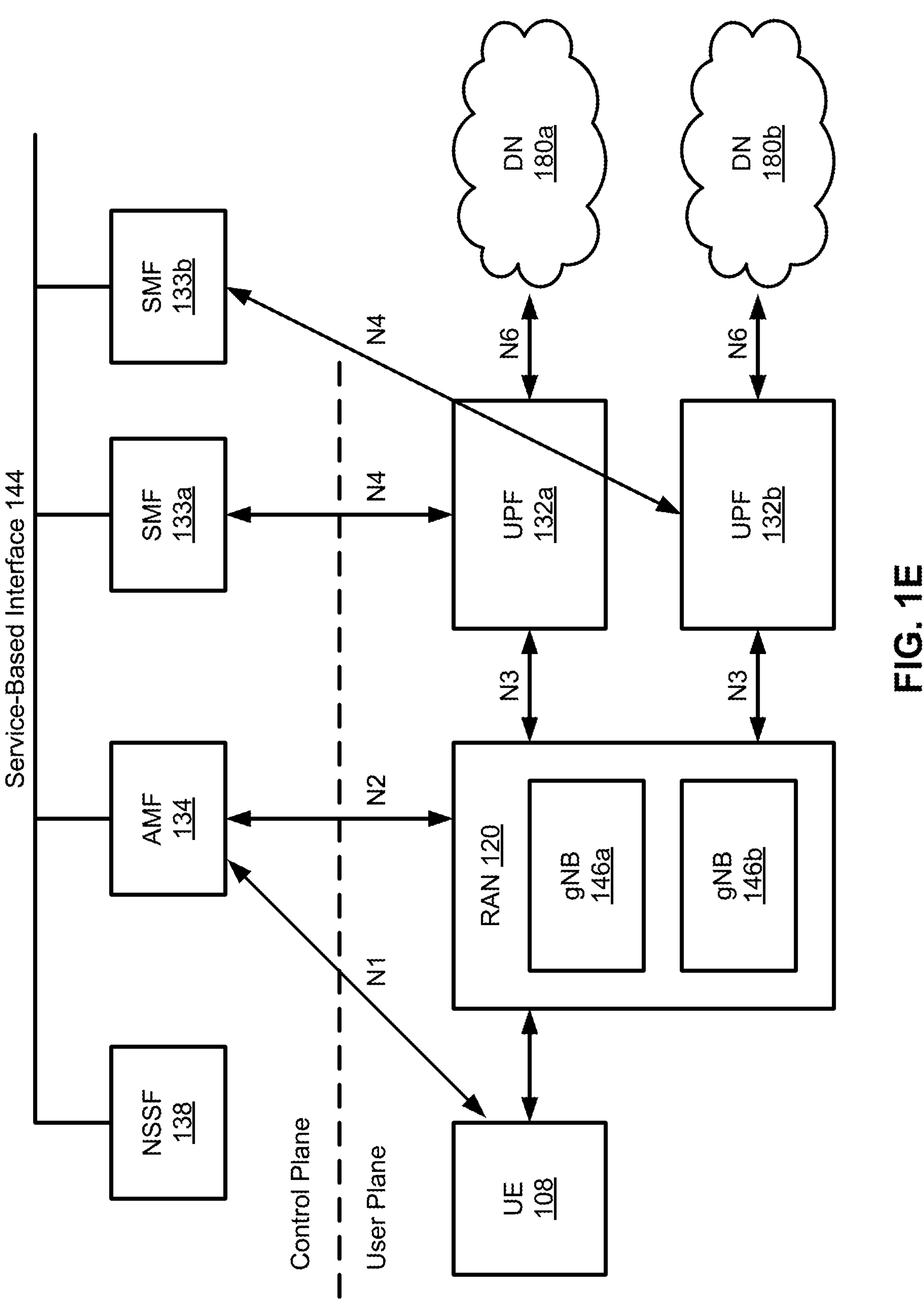
FIG. 1E depicts another embodiment of network functions interacting between user and control planes.

FIG. 1E depicts another embodiment of network functions interacting between user and control planes. As depicted, UPFs 132*a*-132*b* (also referred to as UPFs 132) are in communication with data networks (DNs) 180*a*-180*b* (also referred to as DNs 180). In some cases, a plurality of UPFs 132 may be connected in series between the RAN 120 and a plurality of DNs 180. The RAN 120 may include gNBs 146*a*-146*b* (also referred to as gNBs 146). Each gNB 146 may comprise at least a DU 204, a CU-UP 216, and a CU-CP 214.

Multiple PDU sessions to different data networks may be accommodated through the use of multiple UPFs in parallel. For the sake of clarity, some of the network functions depicted in FIG. 1D have been omitted, however it should be understood that the omitted network functions may interact with the network functions depicted in FIG. 1E. Each UPF 132*a*-132*b* may be associated with a PDU session, and may connect to a corresponding SMF 133*a*-133*b* over an N4 interface to receive session control information. If the UE 108 has multiple PDU sessions active, then each PDU session may be supported by a different UPF 132, each of which may be connected to an SMF 133 over an N4 interface. It should also be understood that any of the network functions may be virtualized within a network, and that the network itself may be provided as a network slice.

Figure 1F:
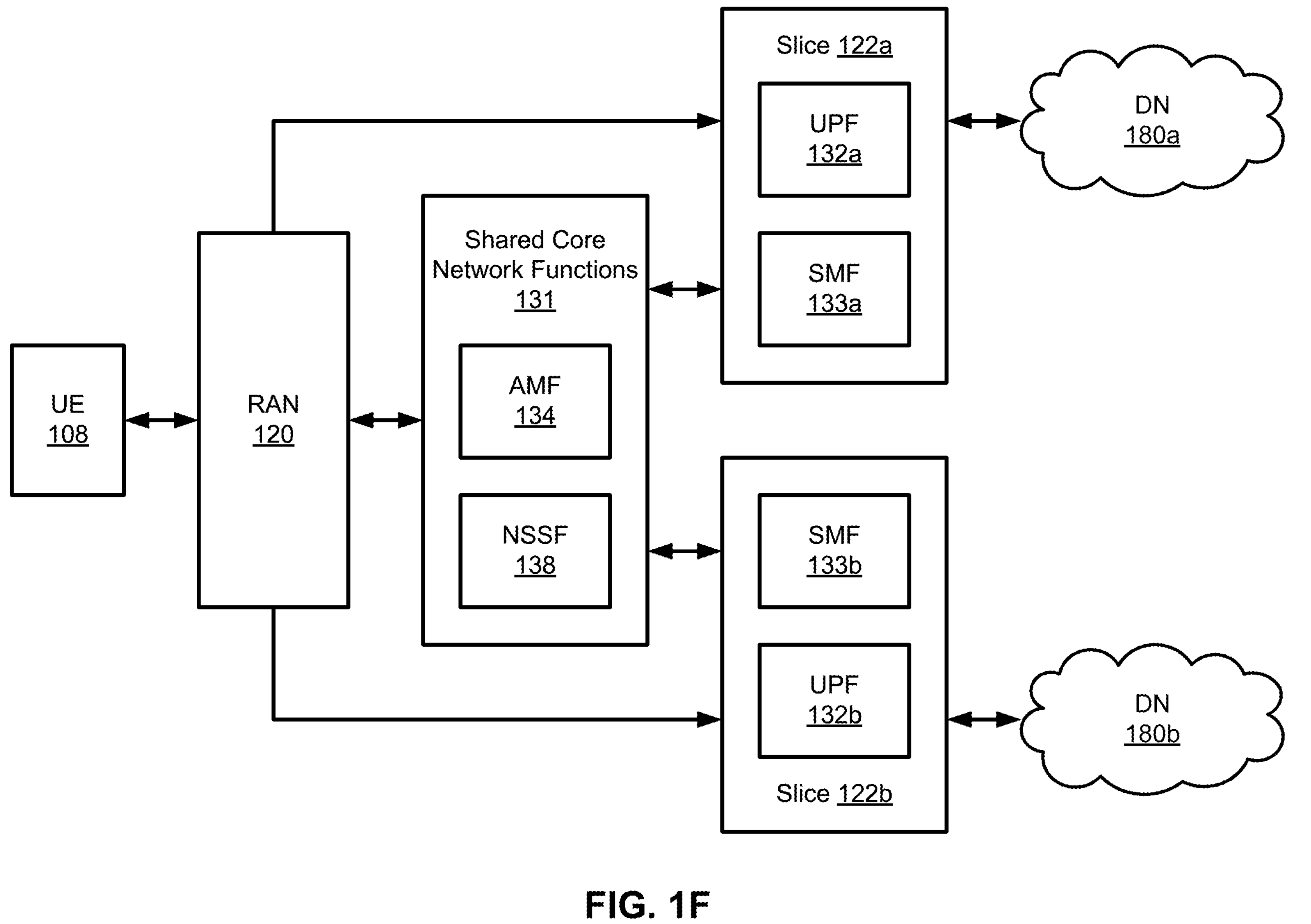
FIG. 1F depicts an embodiment of network slices sharing a set of shared core network functions.

FIG. 1F depicts an embodiment of network slices 122*a* and 122*b* (also referred to as network slices 122) sharing a set of shared core network functions 131. The set of shared core network functions 131 includes AMF 134 and NSSF 138. The radio access network (RAN) 120 may support differentiated handling of traffic between isolated network slices 122*a* and 122*b* for the UE 108. The network slice selection function (NSSF) 138 within the shared core network functions 131 may support the selection of network slice instances to serve the UE 108. In some cases, network slice selection may be determined by the network (e.g., using either NSSF 138 or AMF 134) based on network slice policy. The UE 108 may simultaneously connect to data networks 180*a* and 180*b* via the network slices 122*a* and 122*b* to support different latency requirements.

Figure 1G:
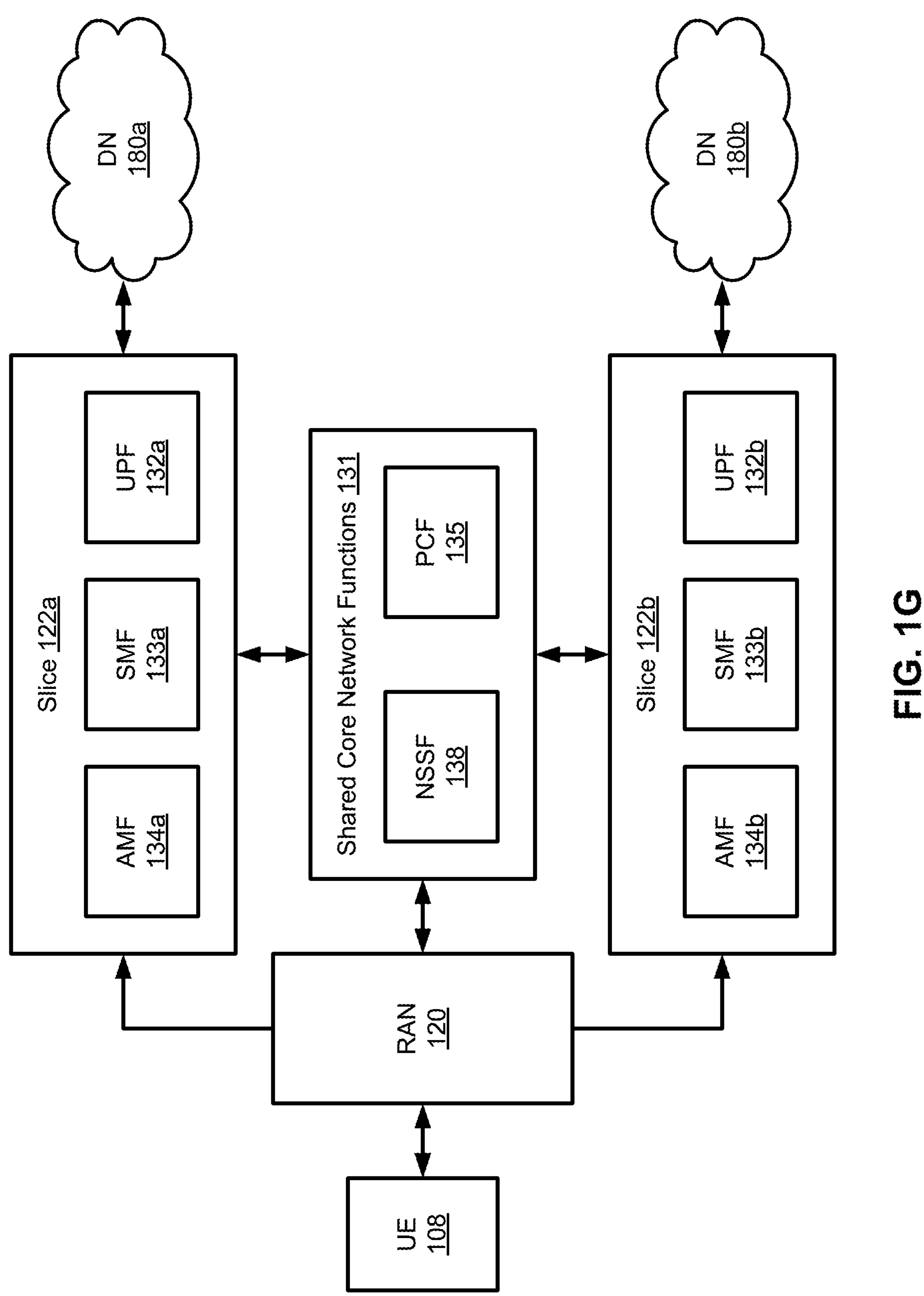
FIGS. 1G-1H depict various embodiment of network slices after updates have been made based on changed to the network slice policy.

FIG. 1G depicts an embodiment of network slices 122*a* and 122*b* after updates have been made based on changed to the network slice policy. As depicted, the network slices 122*a* and 122*b* share a set of shared core network functions 131 that includes PCF 135 and NSSF 138. Each network slice 122 includes an AMF 134, an SMF 133, and a UPF 132.

Figure 1H:
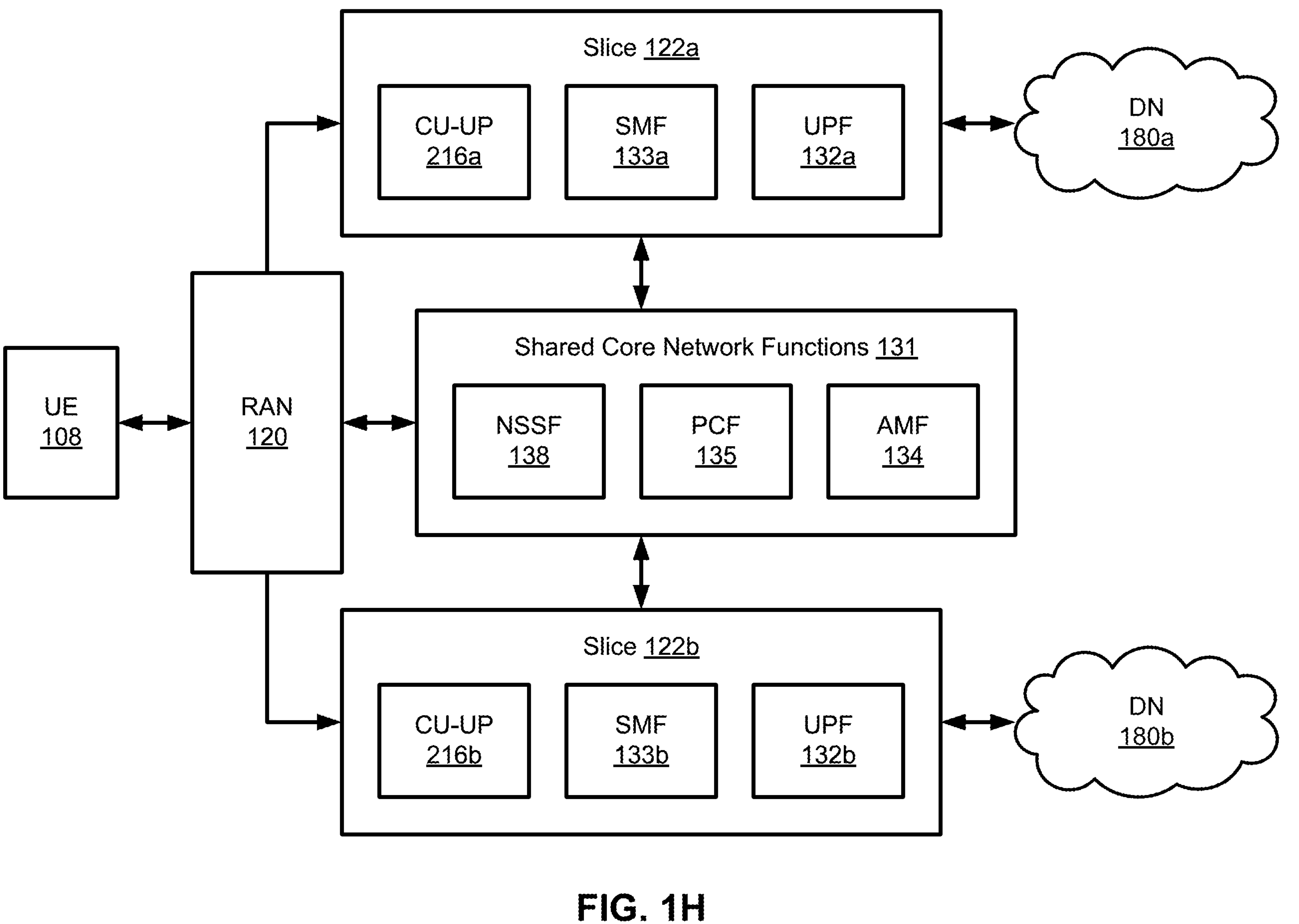

FIG. 1H depicts another embodiment of network slices 122*a* and 122*b* after updates have been made based on changed to the network slice policy. As depicted, the network slices 122*a* and 122*b* share a set of shared core network functions 131 that includes AMF 134, PCF 135, and NSSF 138. Each network slice 122 includes a CU-UP 216, SMF 133, and a UPF 132; accordingly, network slice 122*a* includes CU-UP 216*a*, SMF 133*a*, and UPF 132*a* and network slice 122*b* includes CU-UP 216*b*, SMF 133*b*, and UPF 132*b*.

Figure 2A:
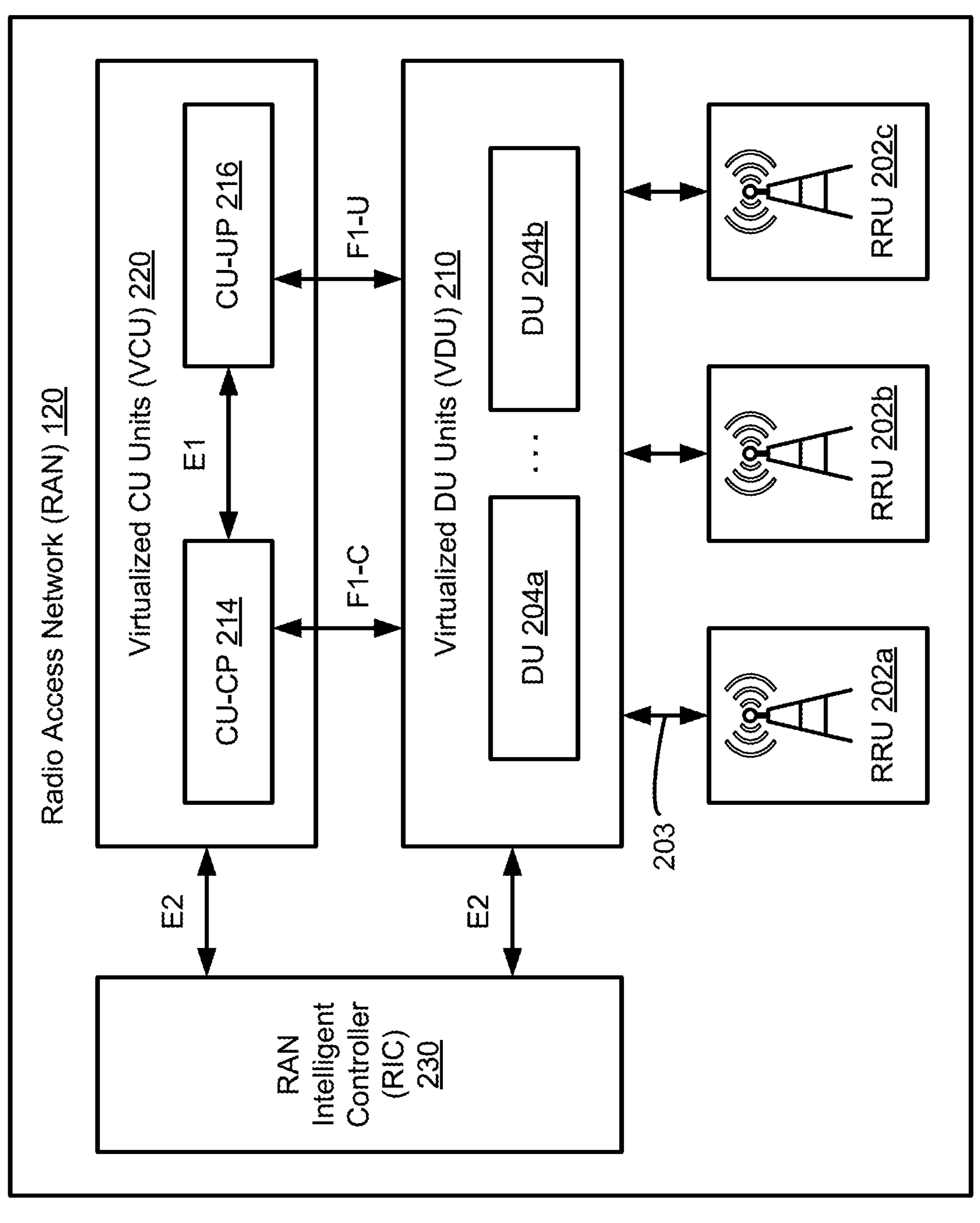

FIG. 2A depicts an embodiment of a radio access network 120. The radio access network 120 includes virtualized CU units 220, virtualized DU units 210, remote radio units (RRUs) 202, and a RAN intelligent controller (RIC) 230. The virtualized DU units 210 may comprise virtualized versions of distributed units (DUs) 204. The distributed unit (DU) 204 may comprise a logical node configured to provide functions for the radio link control (RLC) layer, the medium access control (MAC) layer, and the physical layer (PHY) layers. The virtualized CU units 220 may comprise virtualized versions of centralized units (CUs) comprising a centralized unit for the user plane CU-CP 216 and a centralized unit for the control plane CU-CP 214. In one example, the centralized units (CUs) may comprise a logical node configured to provide functions for the radio resource control (RRC) layer, the packet data convergence control (PDCP) layer, and the service data adaptation protocol (SDAP) layer. The centralized unit for the control plane CU-CP 214 may comprise a logical node configured to provide functions of the control plane part of the RRC and PDCP. The centralized unit for the user plane CU-CP 216 may comprise a logical node configured to provide functions of the user plane part of the SDAP and PDCP. Virtualizing the control plane and user plane functions allows the centralized units (CUs) to be consolidated in one or more data centers on RAN-based open interfaces.

The remote radio units (RRUs) 202 may correspond with different cell sites. A single DU may connect to multiple RRUs via a fronthaul interface 203. The fronthaul interface 203 may provide connectivity between DUs and RRUs. For example, DU 204*a* may connect to 18 RRUs via the fronthaul interface 203. A centralized units (CUs) may control the operation of multiple DUs via a midhaul F1 interface that comprises the F1-C and F1-U interfaces. The F1 interface may support control plane and user plane separation, and separate the Radio Network Layer and the Transport Network Layer. In one example, the centralized unit for the control plane CU-CP 214 may connect to ten different DUs within the virtualized DU units 210. In this case, the centralized unit for the control plane CU-CP 214 may control ten DUs and 180 RRUs. A single distributed unit (DU) 204 may be located at a cell site or in a local data center. Centralizing the distributed unit (DU) 204 at a local data center or at a single cell site location instead of distributing the DU 204 across multiple cell sites may result in reduced implementation costs.

The centralized unit for the control plane CU-CP 214 may host the radio resource control (RRC) layer and the control plane part of the packet data convergence control (PDCP) layer. The E1 interface may separate the Radio Network Layer and the Transport Network Layer. The CU-CP 214 terminates the E1 interface connected with the centralized unit for the user plane CU-UP 216 and the F1-C interface connected with the distributed units (DUs) 204. The centralized unit for the user plane CU-UP 216 hosts the user plane part of the packet data convergence control (PDCP) layer and the service data adaptation protocol (SDAP) layer. The CU-UP 216 terminates the E1 interface connected with the centralized unit for the control plane CU-CP 214 and the F1-U interface connected with the distributed units (DUs) 204. The distributed units (DUs) 204 may handle the lower layers of the baseband processing up through the packet data convergence control (PDCP) layer of the protocol stack. The interfaces F1-C and E1 may carry signaling information for setting up, modifying, relocating, and/or releasing a UE context.

The RAN intelligent controller (RIC) 230 may control the underlying RAN elements via the E2 interface. The E2 interface connects the RAN intelligent controller (RIC) 230 to the distributed units (DUs) 204 and the centralized units CU-CP 214 and CU-UP 216. The RAN intelligent controller (RIC) 230 may comprise a near-real time RIC. A non-real-time RIC (NRT-RIC) not depicted may comprise a logical node allowing non-real time control rather than near-real-time control and the near-real-time RIC 230 may comprise a logical node allowing near-real-time control and optimization of RAN elements and resources on the bases of information collected from the distributed units (DUs) 204 and the centralized units CU-CP 214 and CU-UP 216 via the E2 interface.

The virtualization of the distributed units (DUs) 204 and the centralized units CU-CP 214 and CU-UP 216 allows various deployment options that may be adjusted over time based on network conditions and network slice requirements. In at least one example, both a distributed unit (DU) 204 and a corresponding centralized unit CU-UP 216 may be implemented at a cell site. In another example, a distributed unit (DU) 204 may be implemented at a cell site and the corresponding centralized unit CU-UP 216 may be implemented at a local data center (LDC). In another example, both a distributed unit (DU) 204 and a corresponding centralized unit CU-UP 216 may be implemented at a local data center (LDC). In another example, both a distributed unit (DU) 204 and a corresponding centralized unit CU-UP 216 may be implemented at a cell site, but the corresponding the centralized unit CU-CP 214 may be implemented at a local data center (LDC). In another example, a distributed unit (DU) 204 may be implemented at a local data center (LDC) and the corresponding centralized units CU-CP 214 and CU-UP 216 may be implemented at an edge data center (EDC).

In some embodiments, network slicing operations may be communicated via the E1, F1-C, and F1-U interfaces of the radio access network 120. For example, CU-CP 214 may select the appropriate DU 204 and CU-UP 216 entities to serve a network slicing request associated with a particular service level agreement (SLA).

Figure 2B:
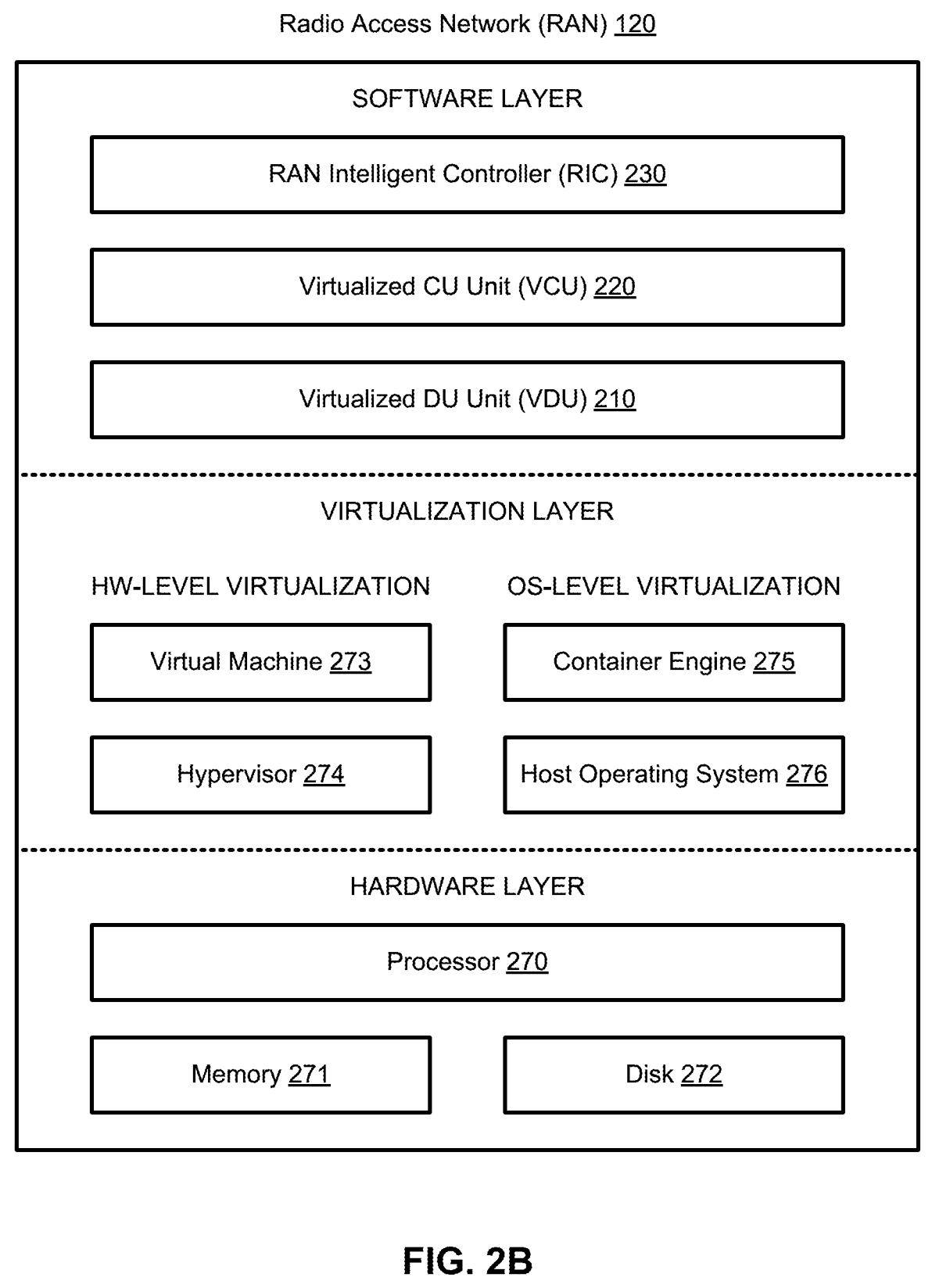

FIG. 2B depicts another embodiment of a radio access network 120. As depicted, the radio access network 120 includes hardware-level components and software-level components. The hardware-level components include one or more processors 270, one or more memory 271, and one or more disks 272. The software-level components include software applications, such as a RAN intelligent controller (RIC) 230, virtualized CU unit (VCU) 220, and virtualized DU unit (VDU) 210. The software-level components may be run using the hardware-level components or executed using processor and storage components of the hardware-level components. In one example, one or more of the RIC 230, VCU 220, and VDU 210 may be run using the processor 270, memory 271, and disk 272. In another example, one or more of the RIC 230, VCU 220, and VDU 210 may be run using a virtual processor and a virtual memory that are themselves executed or generated using the processor 270, memory 271, and disk 272.

The software-level components also include virtualization layer processes, such as virtual machine 273, hypervisor 274, container engine 275, and host operating system 276. The hypervisor 274 may comprise a native hypervisor (or bare-metal hypervisor) or a hosted hypervisor (or type 2 hypervisor). The hypervisor 274 may provide a virtual operating platform for running one or more virtual machines, such as virtual machine 273. A hypervisor may comprise software that creates and runs virtual machine instances. Virtual machine 273 may include a plurality of virtual hardware devices, such as a virtual processor, a virtual memory, and a virtual disk. The virtual machine 273 may include a guest operating system that has the capability to run one or more software applications, such as the RAN intelligent controller (RIC) 230. The virtual machine 273 may run the host operation system 276 upon which the container engine 275 may run. A virtual machine, such as virtual machine 273, may include one or more virtual processors.

A container engine 275 may run on top of the host operating system 276 in order to run multiple isolated instances (or containers) on the same operating system kernel of the host operating system 276. Containers may perform virtualization at the operating system level and may provide a virtualized environment for running applications and their dependencies. The container engine 275 may acquire a container image and convert the container image into running processes. In some cases, the container engine 275 may group containers that make up an application into logical units (or pods). A pod may contain one or more containers and all containers in a pod may run on the same node in a cluster. Each pod may serve as a deployment unit for the cluster. Each pod may run a single instance of an application.

In order to scale an application horizontally, multiple instances of a pod may be run in parallel. A "replica" may refer to a unit of replication employed by a computing platform to provision or deprovision resources. Some computing platforms may run containers directly and therefore a container may comprise the unit of replication. Other computing platforms may wrap one or more containers into a pod and therefore a pod may comprise the unit of replication.

A replication controller may be used to ensure that a specified number of replicas of a pod are running at the same time. If less than the specified number of pods are running (e.g., due to a node failure or pod termination), then the replication controller may automatically replace a failed pod with a new pod. In some cases, the number of replicas may be dynamically adjusted based on a prior number of node failures. For example, if it is detected that a prior number of node failures for nodes in a cluster running a particular network slice has exceeded a threshold number of node failures, then the specified number of replicas may be increased (e.g., increased by one). Running multiple pod instances and keeping the specified number of replicas constant may prevent users from losing access to their application in the event that a particular pod fails or becomes inaccessible.

In some embodiments, a virtualized infrastructure manager not depicted may run on the radio access network (RAN) 120 in order to provide a centralized platform for managing a virtualized infrastructure for deploying various components of the radio access network (RAN) 120. The virtualized infrastructure manager may manage the provisioning of virtual machines, containers, and pods. The virtualized infrastructure manager may also manage a replication controller responsible for managing a number of pods. In some cases, the virtualized infrastructure manager may perform various virtualized infrastructure related tasks, such as cloning virtual machines, creating new virtual machines, monitoring the state of virtual machines, and facilitating backups of virtual machines.

Figure 2C:
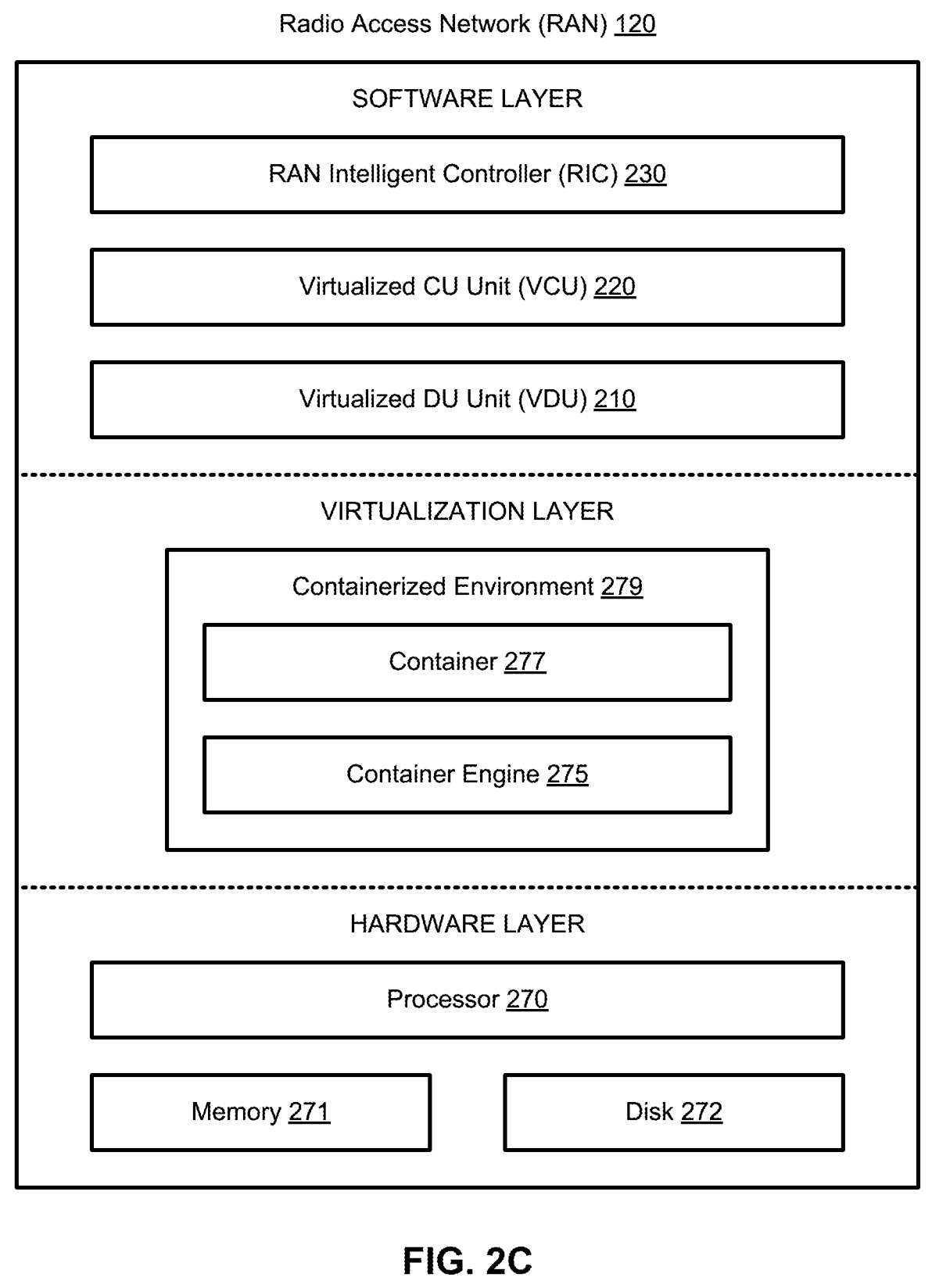

FIG. 2C depicts an embodiment of the radio access network 120 of FIG. 2B in which the virtualization layer includes a containerized environment 279. The containerized environment 279 includes a container engine 275 for instantiating and managing application containers, such as container 277. Containerized applications may comprise applications that run in isolated runtime environments (or containers). The containerized environment 279 may include a container orchestration service for automating the deployments of containerized applications. The container 277 may be used to deploy microservices for running network functions. The container 277 may run DU components and/or CU components of the radio access network (RAN) 120. The containerized environment 279 may be executed using hardware-level components or executed using processor and storage components of the hardware-level components. In one example, the containerized environment 279 may be run using the processor 270, memory 271, and disk 272. In another example, the containerized environment 279 may be run using a virtual processor and a virtual memory that are themselves executed or generated using the processor 270, memory 271, and disk 272.

Figure 2D:
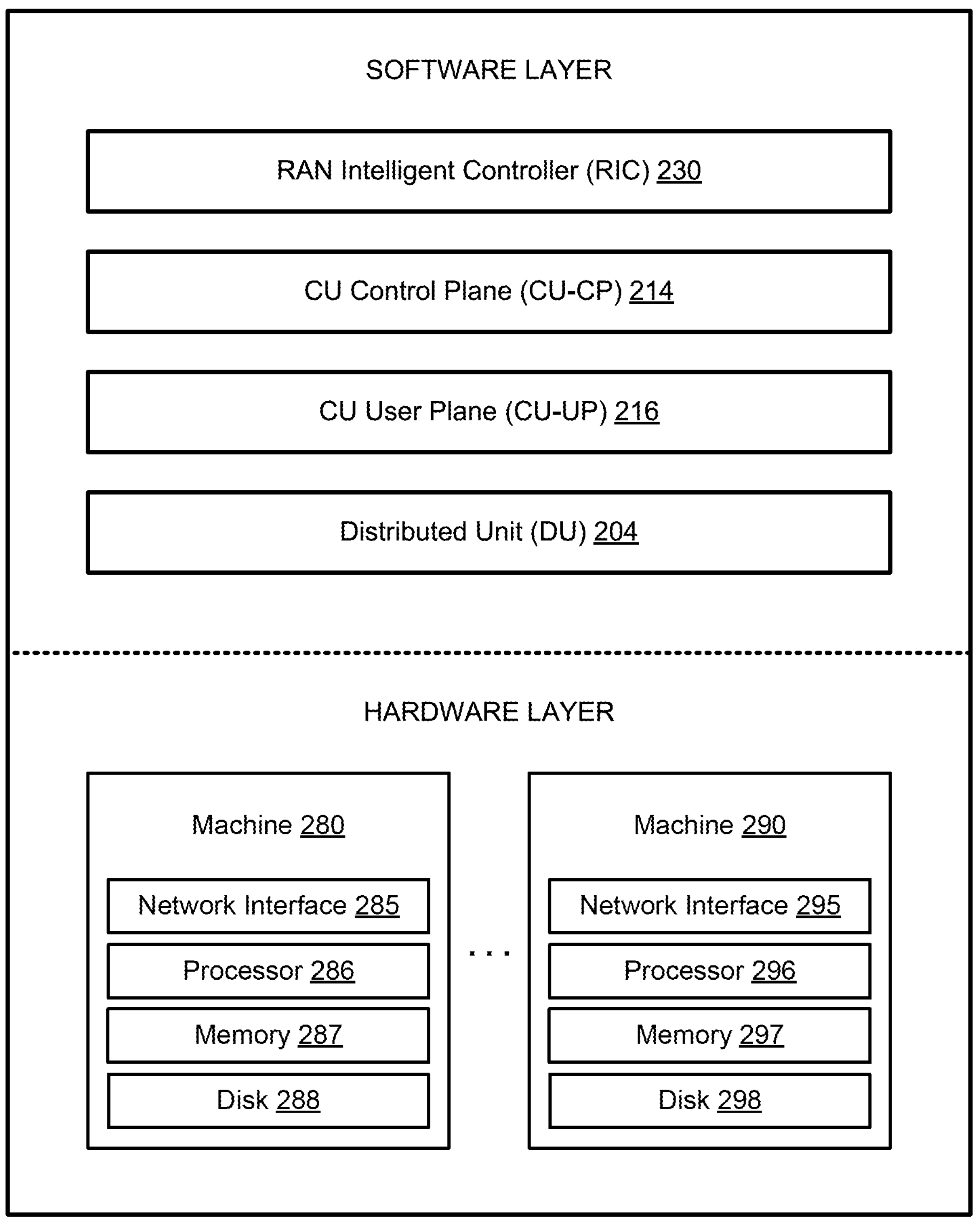

FIG. 2D depicts another embodiment of a radio access network 120. As depicted, the radio access network 120 includes hardware-level components and software-level components. The hardware-level components include a plurality of machines (e.g., physical machines) that may be grouped together and presented as a single computing system or a cluster. Each machine of the plurality of machines may comprise a node in a cluster (e.g., a failover cluster).

As depicted, the plurality of machines include machine 280 and machine 290. The machine 280 includes a network interface 285, processor 286, memory 287, and disk 288 all in communication with each other. Processor 286 allows machine 280 to execute computer readable instructions stored in memory 287 to perform processes described herein. Processor 286 may include one or more processing units, such as one or more CPUs and/or one or more GPUs. Memory 287 may comprise one or more types of memory (e.g., RAM, SRAM, DRAM, ROM, EEPROM, or Flash). The disk 288 may comprise a hard disk drive and/or a solid-state drive. Similarly, the machine 290 includes a network interface 295, processor 296, memory 297, and disk 298 all in communication with each other. Processor 296 allows machine 290 to execute computer readable instructions stored in memory 297 to perform processes described herein. In some embodiments, the plurality of machines may be used to implement a failover cluster. In some cases, the plurality of machines may be used to run one or more virtual machines or to execute or generate a containerized environment, such as the containerized environment 279 depicted in FIG. 2C.

The software-level components include a RAN intelligent controller (RIC) 230, CU control plane (CU-CP) 214, CU user plane (CU-UP) 216, and distributed unit (DU) 204. In one embodiment, the software-level components may be run using a dedicated hardware server. In another embodiment, the software-level components may be run using a virtual machine running or containerized environment running on the plurality of machines. In another embodiment, the software-level components may be run from the cloud (e.g., the software-level components may be deployed using a cloud-based compute and storage infrastructure).

Figure 2E:
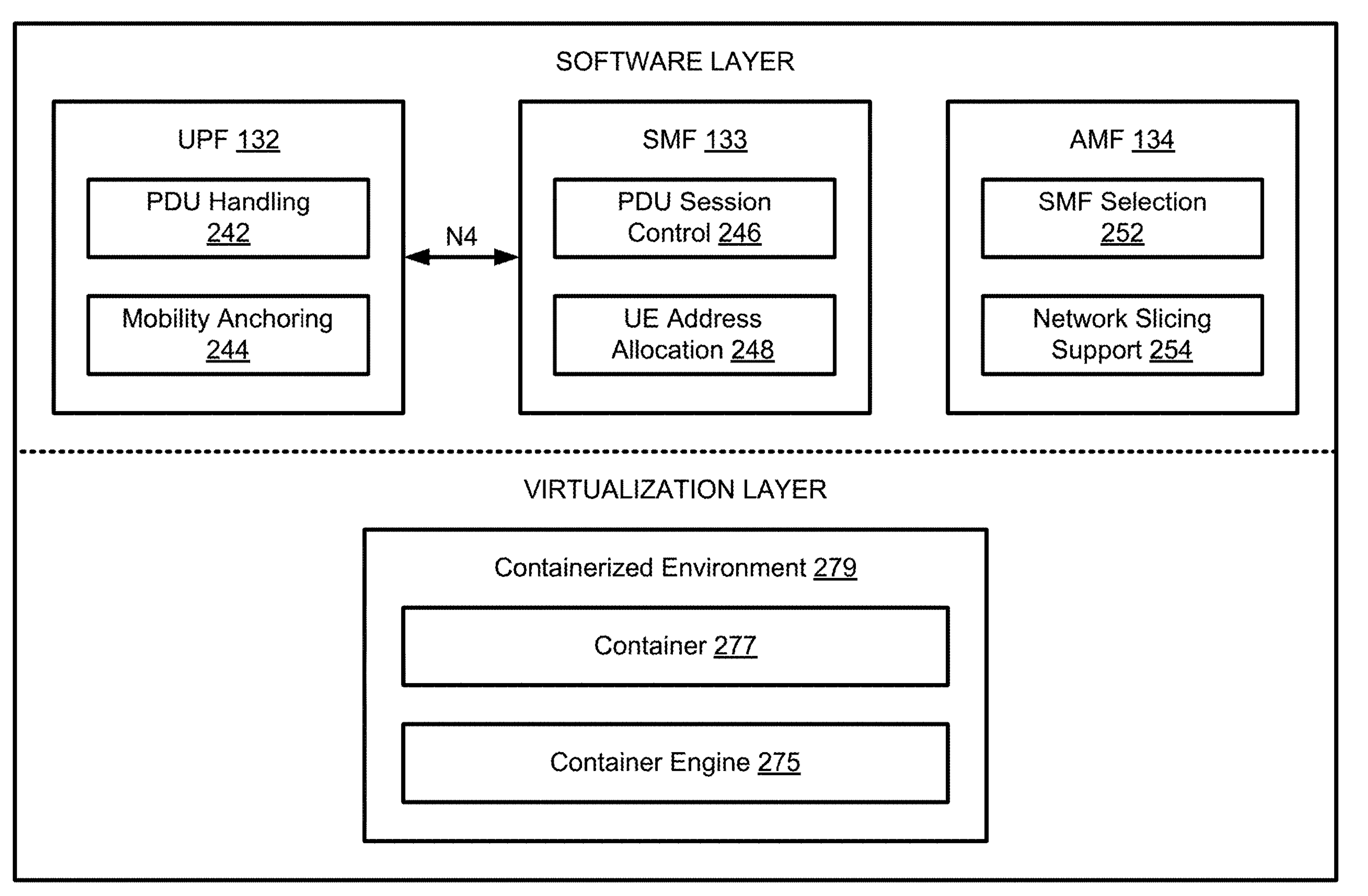
FIG. 2E depicts an embodiment of a core network.

FIG. 2E depicts an embodiment of a core network 130. As depicted, the core network 130 includes implementation for core network functions UPF 132, SMF 133, and AMF 134. The core network 130 may be used to provide Internet access for user equipment via a radio access network, such as the radio access network 120 in FIG. 1C. The AMF 134 may be configured to host various functions including SMF selection 252 and network slicing support 254. The UPF 132 may be configured to host various functions including mobility anchoring 244, packet data unit (PDU) handling 242, and QoS handling for the user plane. The SMF 133 may be configured to host various functions including UE IP address allocation and management 248, selection and control of user plane functions, and PDU session control 246. The core network functions may be run using containers within the containerized environment 279 that includes a container engine 275 for instantiating and managing application containers, such as container 277. In some embodiments, the containerized environment 279 may be executed or generated using a plurality of machines as depicted in FIG. 2D or may be executed or generated using hardware-level components, such as the processor 270, memory 271, and disk 272 depicted in FIG. 2C.

Figure 2F:
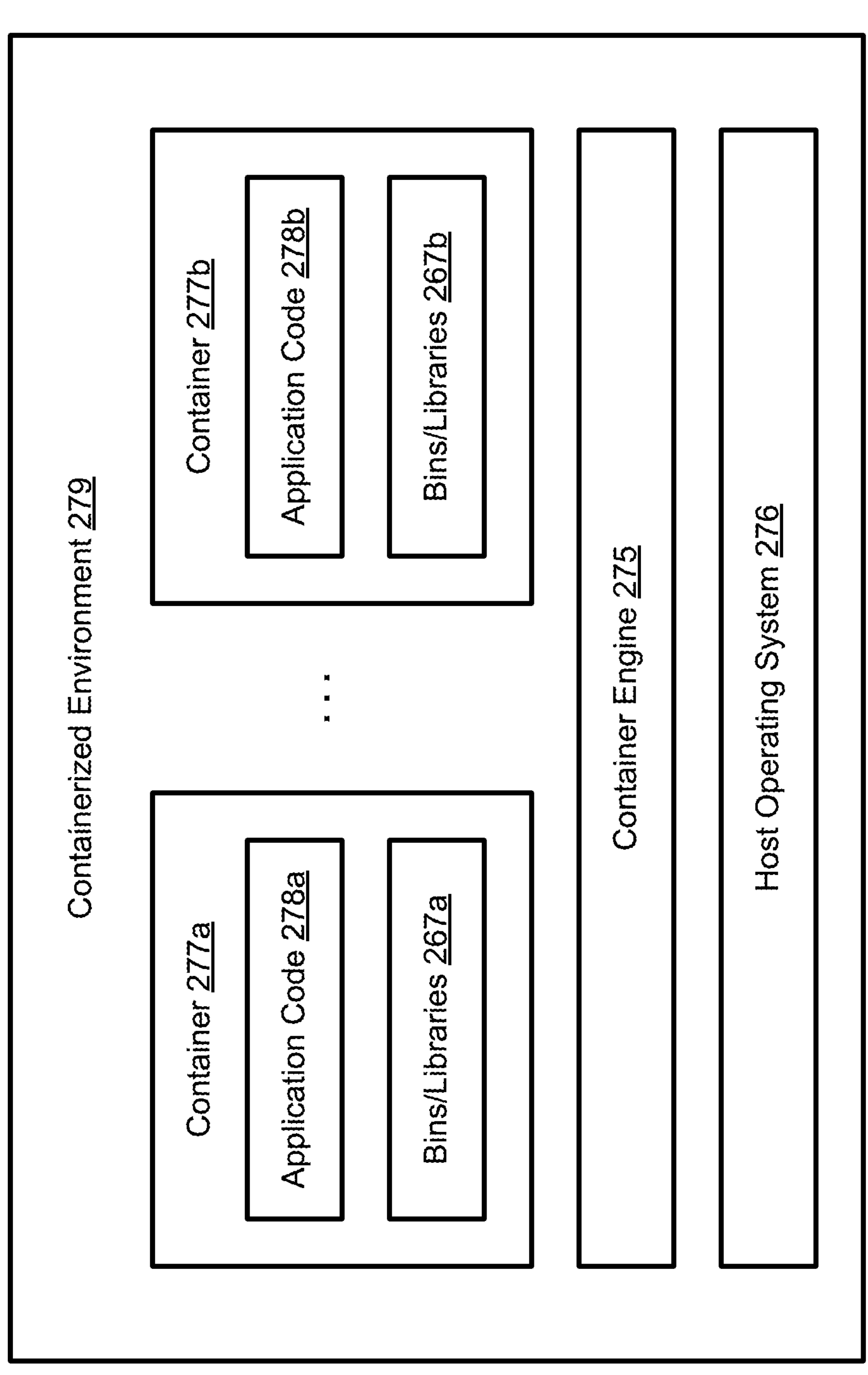
FIG. 2F depicts an embodiment of a containerized environment that includes a container engine running on top of a host operating system.

FIG. 2F depicts an embodiment of a containerized environment 279 that includes a container engine 275 running on top of a host operating system 276. The container engine 275 may manage or run containers 277 on the same operating system kernel of the host operating system 276. The container engine 275 may acquire a container image and convert the container image into one or more running processes. In some cases, the container engine 275 may group containers that make up an application into logical units (or pods). A pod may contain one or more containers and all containers in a pod may run on the same node in a cluster. Each container 277 may include application code 278 and application dependencies 267, such as operating system libraries, required to run the application code 278. Containers allow portability by encapsulating an application within a single executable package of software that bundles application code 278 together with the related configuration files, binaries, libraries, and dependencies required to run the application code 278.

Figure 3A:
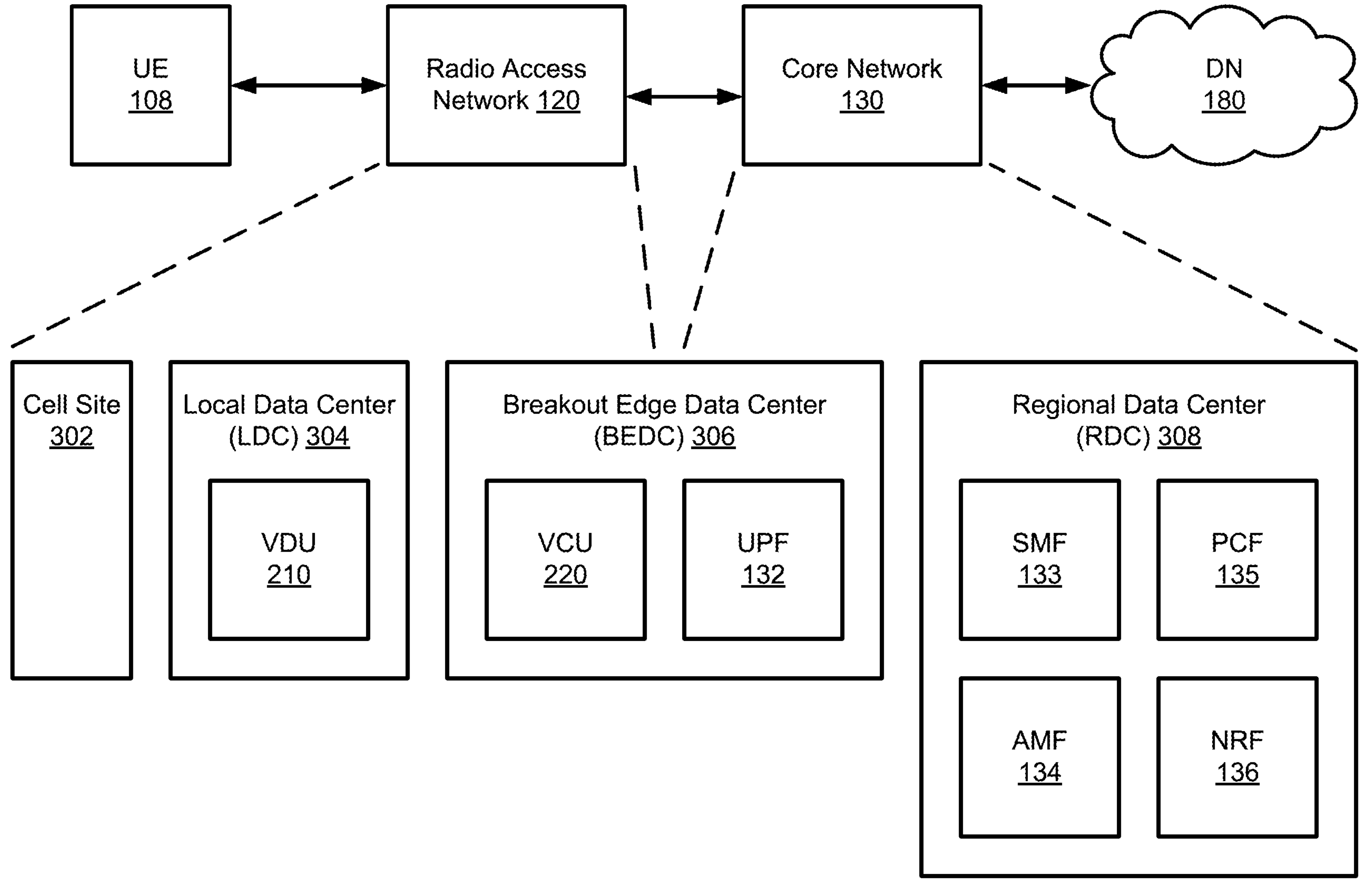
FIGS. 3A-3D depict various embodiments of a 5G network comprising implementations of a radio access network and a core network with virtualized network functions arranged within a data center hierarchy.

FIG. 3A depicts an embodiment of a 5G network comprising a radio access network 120 and a core network 130. The radio access network 120 and the core network 130 allow user equipment UE 108 to transfer data to the data network 180 and/or to receive data from the data network 180. As depicted, the VDU 210 and VCU 220 components of the radio access network 120 may be implemented using different data centers within a data center hierarchy that includes a local data center (LDC) 304 that is a first electrical distance away from the cell site 302, a breakout edge data center (BEDC) 306 that is a second electrical distance greater than the first electrical distance away from the cell site 302, and a regional data center (RDC) 308 that is a third electrical distance greater than the second electrical distance away from the cell site 302. The local data center (LDC) 304 may correspond with a first one-way latency from the cell site 302. The breakout edge data center (BEDC) 306 may correspond with a second one-way latency greater than the first one-way latency from the cell site 302. The regional data center (RDC) 308 may correspond with a third one-way latency greater than the second one-way latency from the cell site 302. The cell site 302 may include a cell tower or one or more remote radio units (RRUs) for sending and receiving wireless data transmissions. In some cases, the cell site 302 may correspond with a macrocell site or a small cell site, such as a microcell site.

In some cases, a data center may refer to a networked group of computing and storage devices that may run applications and services. The data center may include hardware servers, storage systems, routers, switches, firewalls, application-delivery controllers, cooling systems, and power subsystems. A data center may refer to a collection of computing and storage resources provided by on-premises physical servers and/or virtual networks that support applications and services across pools of physical infrastructure. Within a data center, a plurality of services may be connected together to provide a computing and storage resource pool upon which virtualized entities may be instantiated. Multiple data centers may be interconnected with each other to form larger networks consisting of pooled computing and storage resources connected to each other by connectivity resources. The connectivity resources may take the form of physical connections, such as Ethernet or optical communications links, and may include wireless communication channels as well. If two different data centers are connected by a plurality of different communication channels, the links may be combined together using various techniques including the formation of link aggregation groups (LAGs). A link aggregation group (LAG) may comprise a logical interface that uses the link aggregation control protocol (LACP) to aggregate multiple connections at a single direct connect endpoint.

As depicted in FIG. 3A, the VDU 210 is running within the local data center (LDC) 304 and the VCU 220 is running within the breakout edge data center (BEDC) 306. The core network functions SMF 133, AMF 134, PCF 135, and NRF 136 are running within the regional data center (RDC) 308. The user plane function UPF 132 is running within the breakout edge data center (BEDC) 306. In some embodiments, the breakout edge data center (BEDC) 306 may comprise an edge data center at an edge of a network managed by a cloud service provider.

One technical benefit of utilizing edge computing to move network functions closer to user equipment is that data communication latency may be reduced. The reduced latency may enable real-time interactivity between user equipment, such as UE 108 in FIG. 1A, and cloud-based services. Edge computing, including mobile edge computing, may refer to the arrangement of computing and associated storage resources at locations closer to the "edge" of a network in order to reduce data communication latency to and from user equipment (e.g., end user mobile phones). Some technical benefits of positioning edge computing resources closer to UEs include low latency data transmissions (e.g., under 5 ms), real-time (or near real-time) operations, reduced network backhaul traffic, and reduced energy consumption. The edge computing resources may be located within on-premises data centers (on-prem), near or on cell towers, and at network aggregation points within the radio access networks and core networks. Examples of applications and services that may be executed using edge computing include virtual network functions and 5G-enabled network services. The virtual network functions may comprise software-based network functions that are executed using the edge computing resources.

Technical benefits of dynamically assigning one or more virtualized network functions (e.g., a user plane function) to different locations or servers for execution within a data center hierarchy is that latency, power, and availability requirements may be optimized for multiple network slices over time. Technical benefits of adjusting the server location or the data center location of one or more virtualized network functions (e.g., a user plane function) for a network slice over time is that the network slice may be dynamically reconfigured to adapt to changes in latency, power, and availability requirements. In one example, a network slice may have a first configuration corresponding with a low-latency configuration in which a user plane function is deployed at a cell site and then subsequently be reconfigured to a second configuration corresponding with a low-power configuration in which the user plane function is redeployed at a breakout edge data center location.

The location of the UPF 132 (e.g., whether the UPF 132 is deployed at the local data center 304 or the breakout edge data center 306) places constraints on the transport network not depicted connecting the UPF 132 with the core network 130. For example, depending on the UPF placement location, the transport network for the backhaul (the N3 interface) may either be minimized if the UPF is placed closer to the VCU 220 (or closer to the RAN edge) or maximized if the UPF is placed farther away from the VCU 220.

The applications and services running on the edge computing resources may communicate with a large number of UEs that may experience connectivity failures (e.g., due to battery life limitations or latency issues) over time. The applications and services may utilize heartbeat tracking techniques to manage device connectivity to the UEs.

Figure 3B:
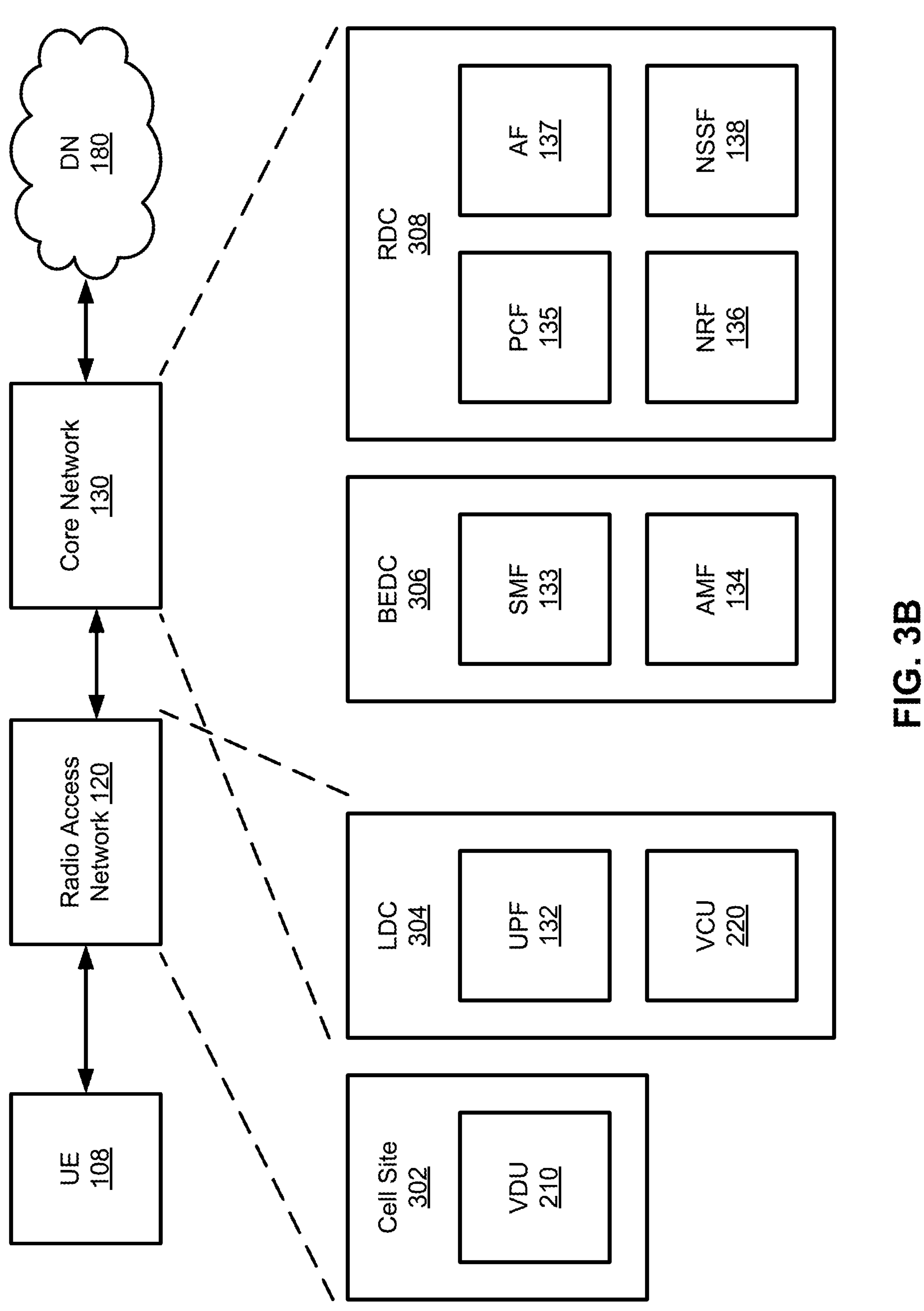

FIG. 3B depicts an embodiment of the 5G network depicted in FIG. 3A in which the VDU 210 has been moved to run at the cell site 302, the VCU 220 and the UPF 132 have been moved to run at the local data center (LDC) 304, and the SMF 133 and the AMF 134 have been moved to run in the breakout edge data center (BEDC) 306. A virtualized network function may be moved from a first data center to a second data center within a data center hierarchy by transferring an application or program code for the virtualized network function from a first server within the first data center to a second server within the second data center. In some embodiments, a second virtual processor that is instantiated and run within the second data center may acquire instructions or program code associated with a virtualized network function prior to a first virtual processor that previously run the virtualized network function within the first data center being deleted. The shifting of network functions closer to the cell site 302 and/or closer to user equipment may have been performed in response to changes in a service level agreement (SLA) or a request to establish a lower-latency network connection from user equipment to a data network. A service level agreement (SLA) may correspond with a service obligation in which penalties may apply if the SLA is violated. In some cases, SLA service metrics may include key performance indicators (KPIs), such as packet loss, latency, and guaranteed bit rate.

In some embodiments, network slices may be reconfigured in order to satisfy traffic isolation requirements, end-to-end latency requirements (e.g., the round-trip time between two end points in a network slice), and throughput requirements for each slice of the network slices. In some cases, the traffic isolation, end-to-end latency, and throughput requirements may vary as a function of a priority level assigned to a given network slice (e.g., whether a network slice have been assigned a high priority or a low priority).

In some embodiments, a first data center and a second data center within a data center hierarchy may both have the same applications or program code stored thereon such that both data centers can run one or more of the same virtualized network functions. In at least one such embodiment, a virtualized network function may be moved from the first data center to the second data center by transferring control or execution of the virtualized network function from the first data center to the second data center without transferring applications or program code.

Figure 3C:
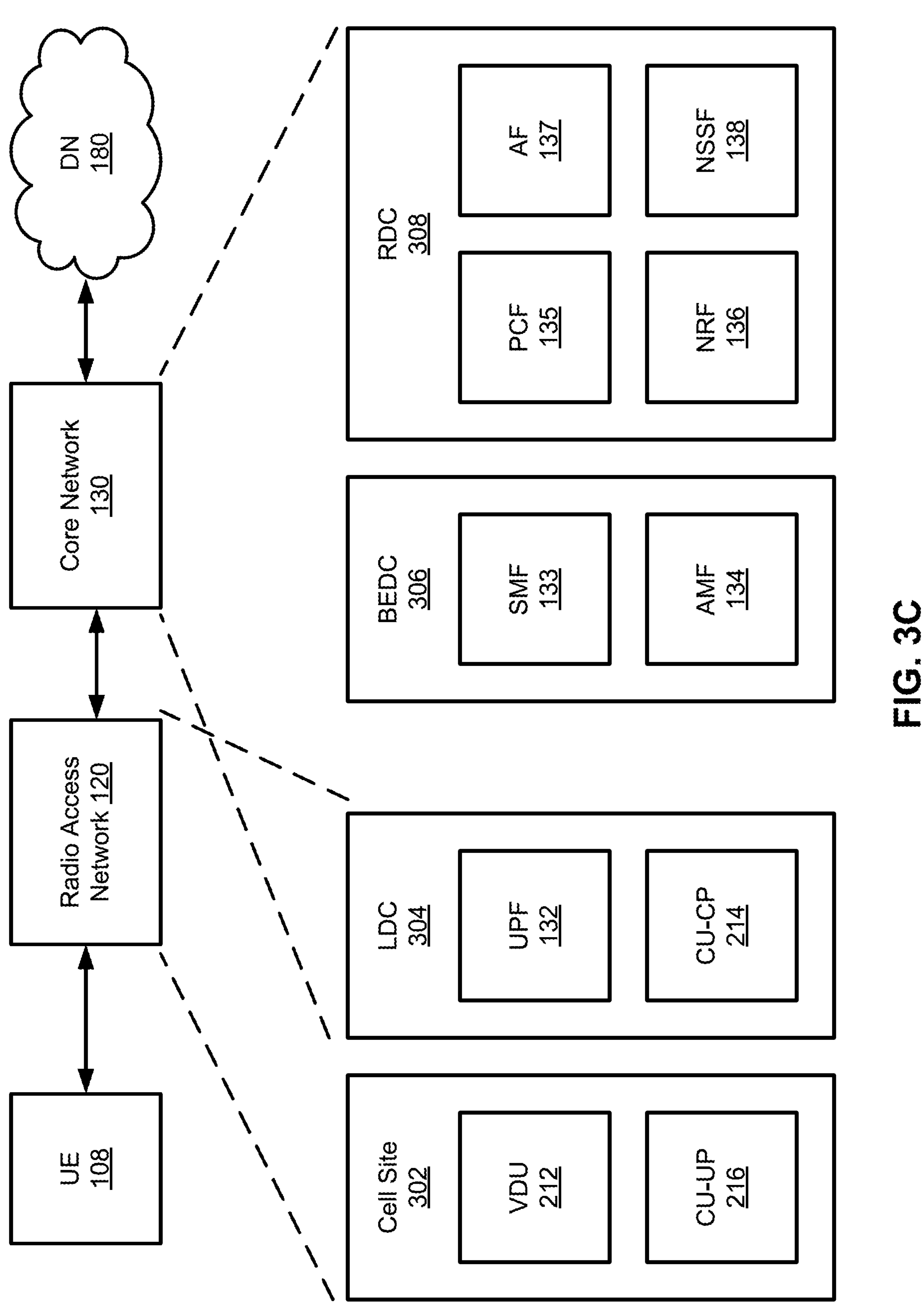

FIG. 3C depicts an embodiment of the 5G network depicted in FIG. 3B in which the VCU 220 has been partitioned such that the CU-CP 214 may run at the local data center (LDC) 304 and the CU-UP 216 may be moved to run at the cell site 302. The cell site 302 may include computing and storage resources for running containerized applications.

Figure 3D:
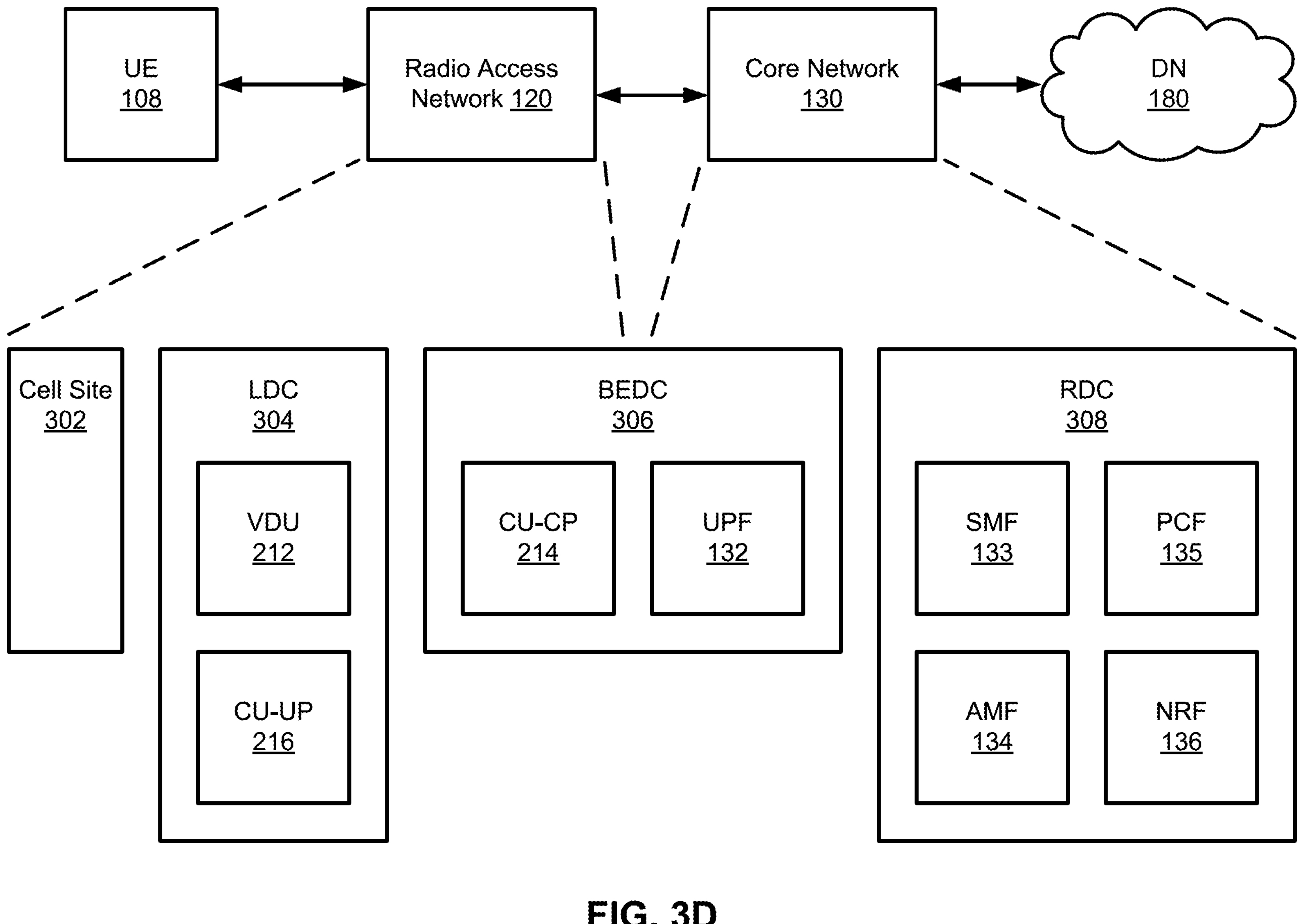

FIG. 3D depicts an embodiment of the 5G network depicted in FIG. 3C in which the CU-CP 214 and the UPF 132 have been moved to run in the breakout edge data center (BEDC) 306, the VDU 212 and the CU-UP 216 have been moved to run at the local data center (LDC) 304, and the SMF 133 and the AMF 134 have been moved to run in the regional data center (RDC) 308. Deploying the VDU 212 and the CU-UP 216 in the local data center (LDC) 304 may allow the VDU 212 to more efficiently support a number of cells sites including the cell site 302.

A data center hierarchy may include a plurality of data centers that span across different geographic regions. A region may correspond with a large geographical area in which multiple data centers are deployed to provide different cloud services. Each data center within the region may include a server cluster. A server cluster (or cluster) may comprise a set of physical machines that are connected together via a network. The cluster may be used to process and store data and to run applications and services in a distributed manner. Applications and data associated with the applications may be replicated or mirrored over a plurality of machines within a cluster to improve fault tolerance. Each machine in a cluster may comprise a node in the cluster. In at least one example, the cluster may comprise a failover cluster.

Geo-redundancy may be achieved by running applications or services across two or more availability zones within the same region. Geo-redundancy may refer to the physical placement of servers or server clusters within geographically diverse data centers to safeguard against catastrophic events and natural disasters.

An availability zone may comprise a smaller geographical area that is smaller than the large geographical area of the region. Multiple availability zones may reside within a region. An availability zone may comprise one or more data centers with redundant power, networking, and connectivity within a region.

Each region may comprise a separate geographical area that does not overlap with any other regions. A logical grouping of one or more data centers within a region may correspond with an availability zone. Each region may include multiple availability zones that may comprise multiple isolated geographical areas within the region. The data centers within the availability zones of a region may be physically isolated from each other inside the region to improve fault tolerance.

Each availability zone inside a geographical region may utilize its own power, cooling, and networking connections. An application may be deployed across two or more availability zones in order to ensure high availability. In this case, if a first availability zone goes down (e.g., due to a power failure) within a geographical region, then the application may still be accessible and running within a second availability zone. Each availability zone within the geographical region may be connected to each other with high bandwidth, low latency network connections to enable synchronous replication of applications and services across the two or more availability zones.

A local zone may correspond with a small geographical region in which one or more data centers are deployed to provide low latency (e.g., single-digit millisecond latency) applications and services. User equipment that is located within the small geographical region or that is located within a threshold distance (e.g., within two miles) of the small geographical region may be able to provide low latency services. A data center within a local zone may allow a direct private connection to compute and storage resources without requiring access to the Internet. The direct private connection may utilize fiber optic cables to allow a server within the local zone to privately connect to other data centers without requiring access to the Internet.

Figure 4A:
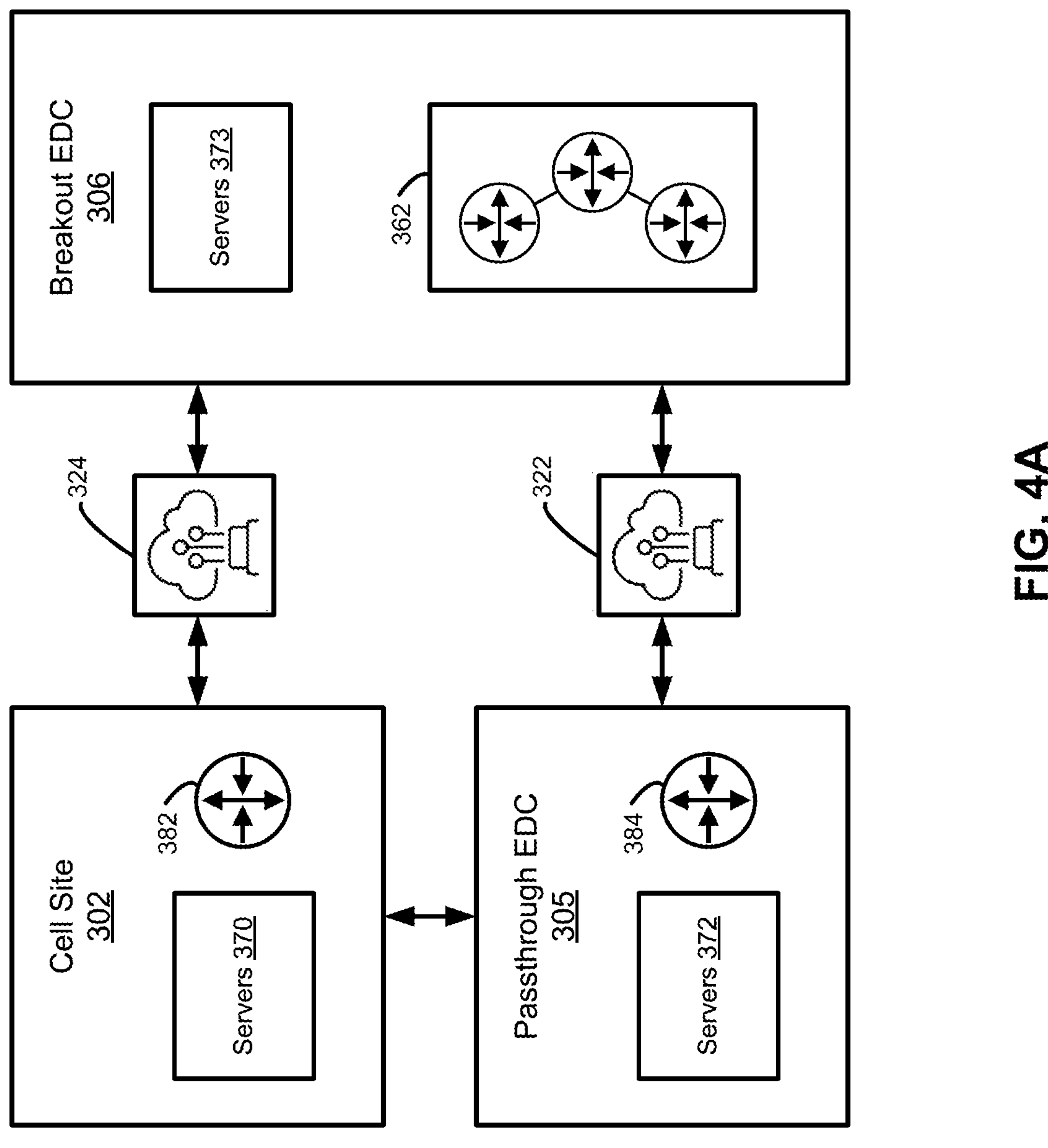
FIG. 4A depicts an embodiment of a data center hierarchy that includes a cell site, passthrough edge data center (EDC), and breakout EDC.

FIG. 4A depicts an embodiment of a data center hierarchy that includes a cell site 302 in which servers 370 and virtual router 382 reside, passthrough EDC 305 in which servers 372 and virtual router 384 reside, and breakout EDC 306 in which servers 373 and grouping of virtual routers 362 reside. A direct private connection 324 may be used to connect servers 370 at the cell site 302 with servers 373 within the breakout EDC 306. A direct private connection 322 may be used to connect servers 372 at the passthrough EDC 305 with servers 373 within the breakout EDC 306. The direct private connection 324 may include fiber-optic cables and may be used to establish or connect to a virtual private cloud hosted by the breakout EDC 306.

In some cases, a data center may include one or more servers in communication with one or more storage devices. The servers and data storage devices within a data center may be in communication with each other via a networking fabric connecting server data storage units within the data center to each other. In general, a "server" may refer to a hardware device that acts as the host in a client-server relationship or a software process that shares a resource with or performs work for one or more clients. Communication between computing devices in a client-server relationship may be initiated by a client sending a request to the server asking for access to a particular resource or for particular work to be performed. The server may subsequently perform the actions requested and send a response back to the client.

In some embodiments, a 5G network implementation may comprise a logical hierarchical architecture consisting of national data centers (NDCs), regional data centers (RDCs), and breakout edge data centers (BEDCs). Each region may host one NDC and three RDCs. NDC functions may communicate with each other through a network transit hub (or transit gateway). The NDC may be used to host a nationwide global service, such as subscriber database, IP multimedia subsystem (IMS) for voice and video-based services, OSS (Operating Support System), and BSS (Billing Support System).

An NDC may be hosted in a region with a large geographical area that includes multiple availability zones for high availability. High availability may be achieved by deploying two redundant networks functions (NFs) in two separate availability zones. Failover within an availability zone can be recovered within the region without the need to route traffic to other regions. NFs may failover between availability zones within the same region. The in-region networking uses underlay and overlay constructs to enable on-prem traffic to seamlessly flow to a standby NF in a secondary availability zone in the event that an active NF becomes unavailable.

Geo-Redundancy (GR) may be achieved by deploying two redundant NFs in two separate availability zones within the same region or in more than one region. This may be achieved by interconnecting all virtual private clouds (VPCs) via inter-region transit gateways and leveraging virtual routers (e.g., VPC routers) for overlay networking. In some cases, a virtual private cloud may span across multiple availability zones. The overlay network may be built as a full-mesh enabling service continuity using the NFs deployed across NDCs in other regions during outage scenarios (e.g., BEDCs and RDCs within a first region may continue to function using an NDC in a second region if an outage occurs for an NDC in the first region).

Figure 4B:
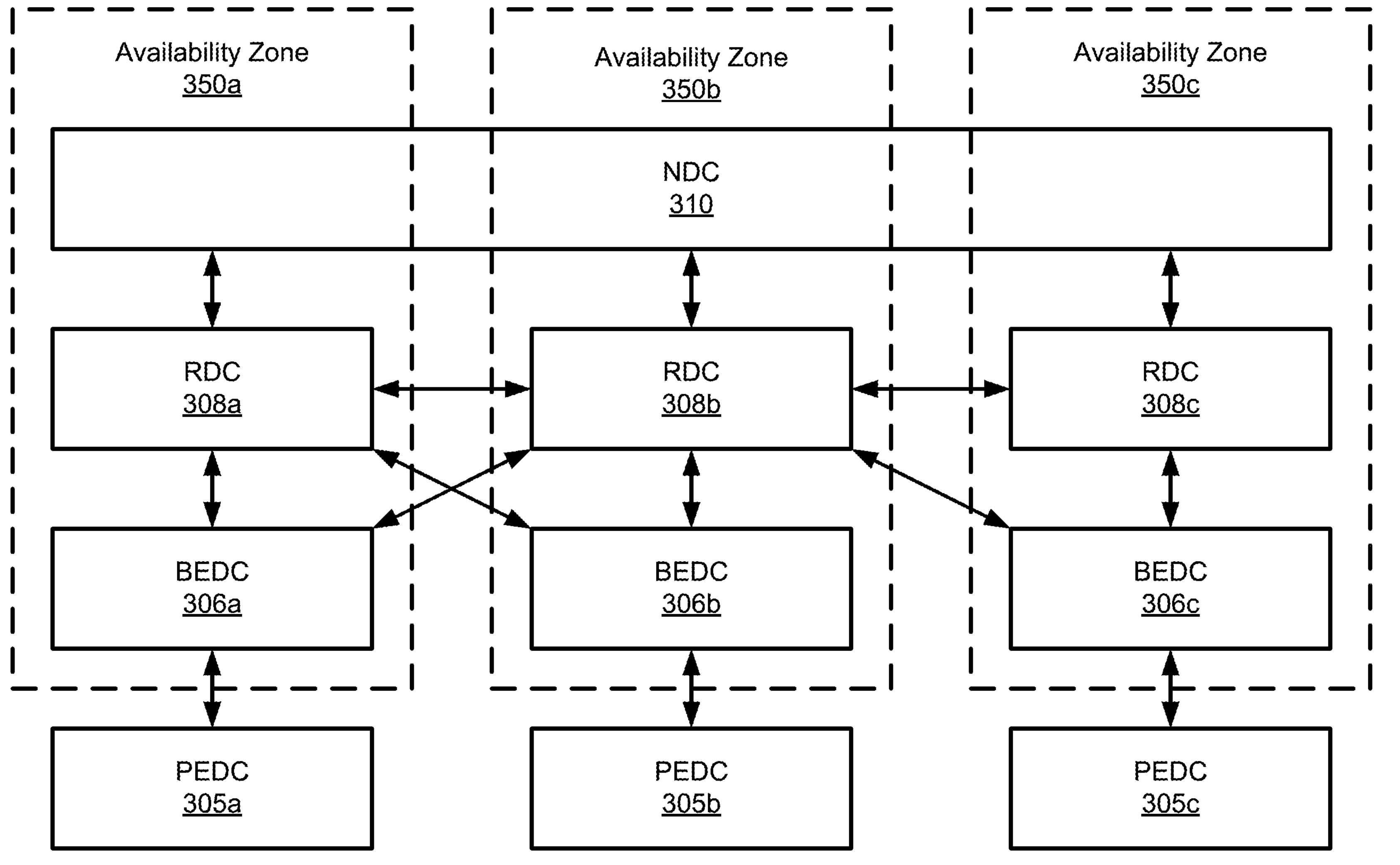
FIGS. 4B-4C depict various embodiments of an implementation of a data center hierarchy.
Figure 4C:
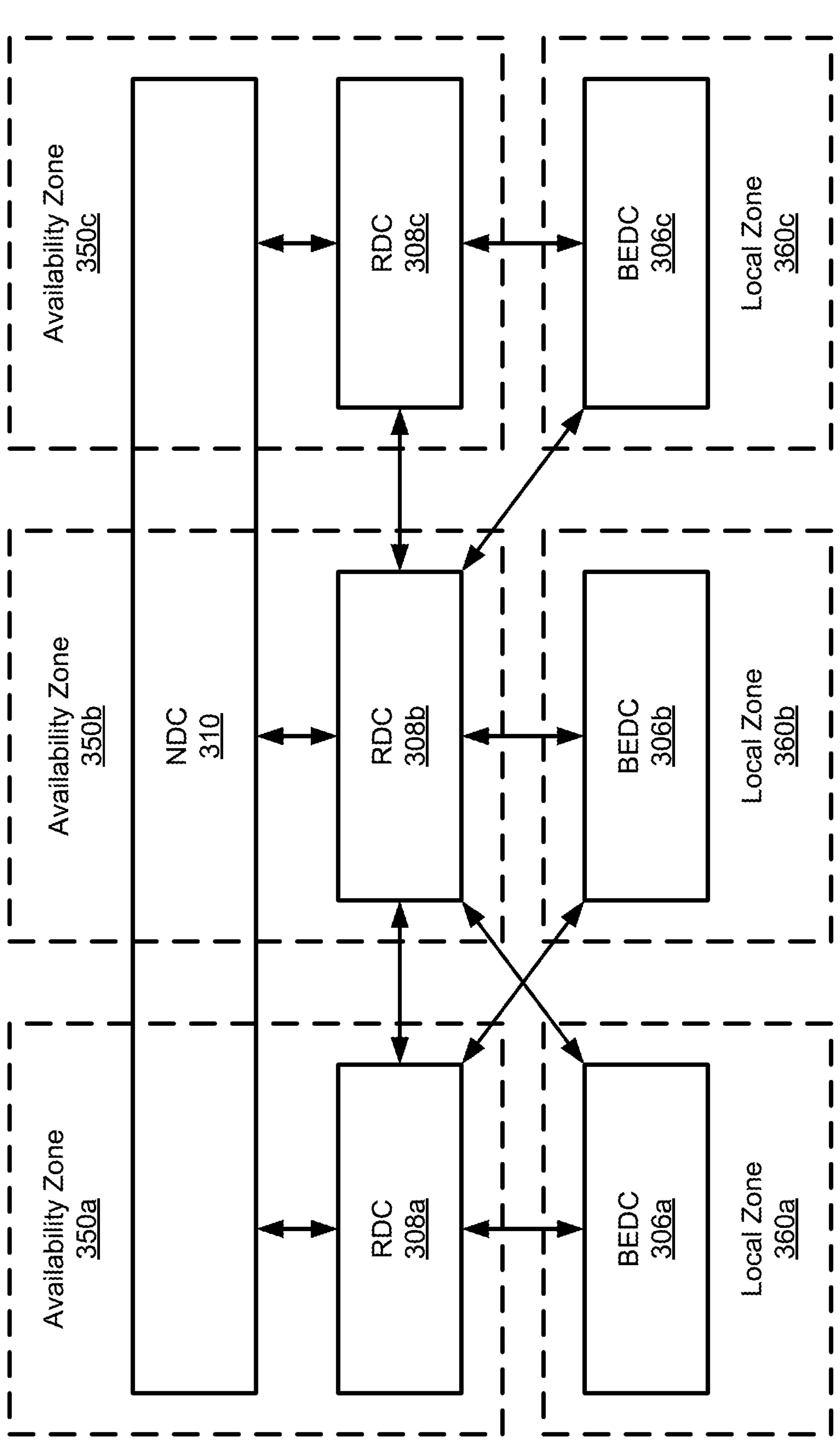

RDCs may be hosted in a region across multiple availability zones (e.g., across three different availability zones). In at least one example, RDCs may host 5G subscribers' signaling processes such as authentication and session management as well as voice for 5G subscribers. These workloads may operate with relatively high latencies, which allows for a centralized deployment throughout a region, resulting in cost efficiency and resiliency. For high availability, three RDCs may be deployed in a region, each in a separate availability zone (AZ) to ensure application resiliency and high availability. To deliver high network availability, network functions and applications may be instantiated and isolated in separate data centers and/or availability zones. As depicted in FIGS. 4B-4C, each region may be fully isolated and comprised of three availability zones 350*a*-350*c*, which may comprise fully isolated partitions within the region's computing and storage infrastructure.

Each availability zone may comprise one or more discrete data centers with redundant power, networking, and connectivity within a particular region. All availability zones within the particular region may be interconnected with high-bandwidth, low-latency networking over dedicated metro fiber providing high-throughput, low-latency networking between the availability zones. In at least one example, each availability zone within the particular region may be physically separated by at least a threshold distance (e.g., 100 miles) from each other to protect against power outages and natural disasters.

The RDCs across multiple availability zones may be interconnected using inter-region transit gateways and virtual routers (e.g., VPC routers) within an overlay network. This provides on-premises and BEDC reachability to the NFs deployed in each RDC with route policies in place to ensure traffic only flows to the backup RDCs, if the primary RDC becomes unreachable. An overlay network may comprise a virtual network of nodes and logical links that are built on top of an underlaying existing network (or an underlay network).

In some cases, BEDCs may be deployed within availability zones of a region. In other cases, BEDCs may be deployed in local zone (LZ) data centers (e.g., comprising small data centers that are close to major population centers that provide core cloud features for applications that require low latency connections). Deployment of NFs within local zone (LZ) data centers may allow the NFs to satisfy strict latency budgets.

Core network NFs (e.g., AMF and SMF) that are deployed in a local zone (LZ) data center or in a regional data center (RDC) may continue to be accessible in the event of an availability zone failure due to the deployment of redundant networks functions (NFs) across two or more availability zones. The redundant network functions may comprise backup core network functions within a neighboring availability zone that will take over and service requests in the event of an availability zone failure.

In a 5G network, there may be at least one network slice assigned to a UE. The 5G network slicing feature makes it possible to set up independent logical networks on a shared physical and virtual infrastructure. A slice can, for example, ensure ultra-reliable low-latency communication (URLLC). Each network slice may operate on specific tracking areas (TAs) served by a set of gNodeB base stations along with the access and mobility management function (AMNF). This means that each network function can be placed in accordance with both the area and the service conveyed by the related slice. One important aspect of network slicing orchestration is to map traffic from a single slice or group of slices to transport network resources that match the required end-to-end QoS for that slice or group of slices.

IP transport fabric may utilize virtual routers and segment routing with multi-protocol label switching (MPLS) for user plane traffic. A network slice instance (NSI) may extend end-to-end across a physical network. In some cases, a network slice instance may comprise one or more network slice subnet instances (NSSI) that may each be deployed by the download and instantiation of one or more virtual network functions. As network slice instances are defined, a programmable network element (e.g., a programmable routing platform) may allow virtual router instances to be configured on-demand. In one example, each programmable network element may allow 100 virtual router instances to be configured. Virtual router instances may also be configured and run using virtual servers.

Traffic from virtual routers may encapsulated using generic routing encapsulation (GRE) tunnels, creating an overlay network. This leverages the underlay network for end-point reachability. The overlay network may utilize intermediate systems to intermediate systems (IS-IS) routing protocol in conjunction with segment routing multi-protocol label switching (SR-MPLS) to distribute routing information and establish network reachability between the virtual routers. Multi-protocol border gateway protocol (MP-BGP) over GRE may be used to provide reachability from on-prem to overlay network and reachability between different regions in the cloud.

A network slice may comprise an isolated end-to-end (E2E) virtualized network across all the network domains running on a shared physical infrastructure and may be controlled and managed independently. Each network slice may comprise a collection of network resources in the form of multiple virtual network functions (VNFs) that are network capabilities implemented as software instances running on commodity servers or commercial off-the-shelf (COTS) hardware.

With the virtualization of networks, virtual network slices may be configured on-demand by downloading network resources into one or more existing network nodes or points of presence (PoP). A point of presence (PoP) may comprise a demarcation point or access point at which two or more networks share a connection. A PoP may include routers, switches, servers, and other devices necessary for network traffic (e.g., user plane traffic) to move between the two or more networks. The virtual network slices may utilize the same shared physical network infrastructure in order to enable the end-to-end deployment of isolated network slices across different points of presence (PoPs) in a transport network.

With 5G networks, each end-to-end network slice instance (NSI) may include three network slice subnets corresponding with a core network, a transport network, and a radio access network. The particular functionality of each network slice may be implemented by instantiating a virtual network function (VNF) associated with the particular functionality using one or more existing PoPs. In some cases, a PoP may have downloaded and instantiated one or more VNFs, with each VNF corresponding to a network slice. When a network slice is no longer required, then the corresponding VNF for the network slice may be deactivated or removed from the PoP.

FIG. 4B depicts an embodiment of an implementation of a data center hierarchy for a region. As depicted, a national data center (NDC) 310 may span across three availability zones 350*a*-350*c*. Within each availability zone 350 may reside a regional data center (RDC) 308 and a breakout edge data center (BEDC) 306. For example, RDC 308*b* and BEDC 306*b* reside within availability zone 350*b*. Passthrough edge data centers (PEDCs) 305*a*-305*c* may serve as aggregation points for local data centers (LDCs) and cell sites prior to connecting to the breakout edge data centers (BEDCs) 306*a*-306*c*.

FIG. 4C depicts an embodiment of an implementation of a data center hierarchy for a region. As depicted, a national data center (NDC) 310 may span across three availability zones 350*a*-350*c*. Within each availability zone 350 may reside a regional data center (RDC) 308. Breakout edge data centers (BEDCs) 306*a*-306*c* reside within local zones 360*a*-360*c*. In some cases, passthrough edge data centers (PEDCs) that serve as aggregation points may be collocated with the breakout edge data centers (BEDC) 306*a*-306*c*.

In some embodiments, a radio access network, such as the radio access network 120 in FIG. 1B, may connect through a passthrough edge data center (PEDC) to a breakout edge data center (BEDC) 306 using two different direct private networking connections. Using two different direct private networking connections at two different locations may extend reachability into an availability zone and allow for DU traffic to be rerouted from an active BEDC to a backup BEDC (or a secondary BEDC) in the event that a local zone fails. A direct private networking connection may provide direct connectivity from RAN DUs (on-prem) to local zones where cell sites are homed. Cell sites may be mapped to a particular local zone based on proximity to meet 5G RAN mid-haul latency expected between DU and CU. In one example, a direct private networking connection may be used to make a private networking connection from a portion of the data center hierarchy into a data center owned by a cloud service provider. The direct private networking connection may enable single-digit millisecond mid-haul connectivity between a radio access network and a breakout edge data center (BEDC).

Figure 4D:
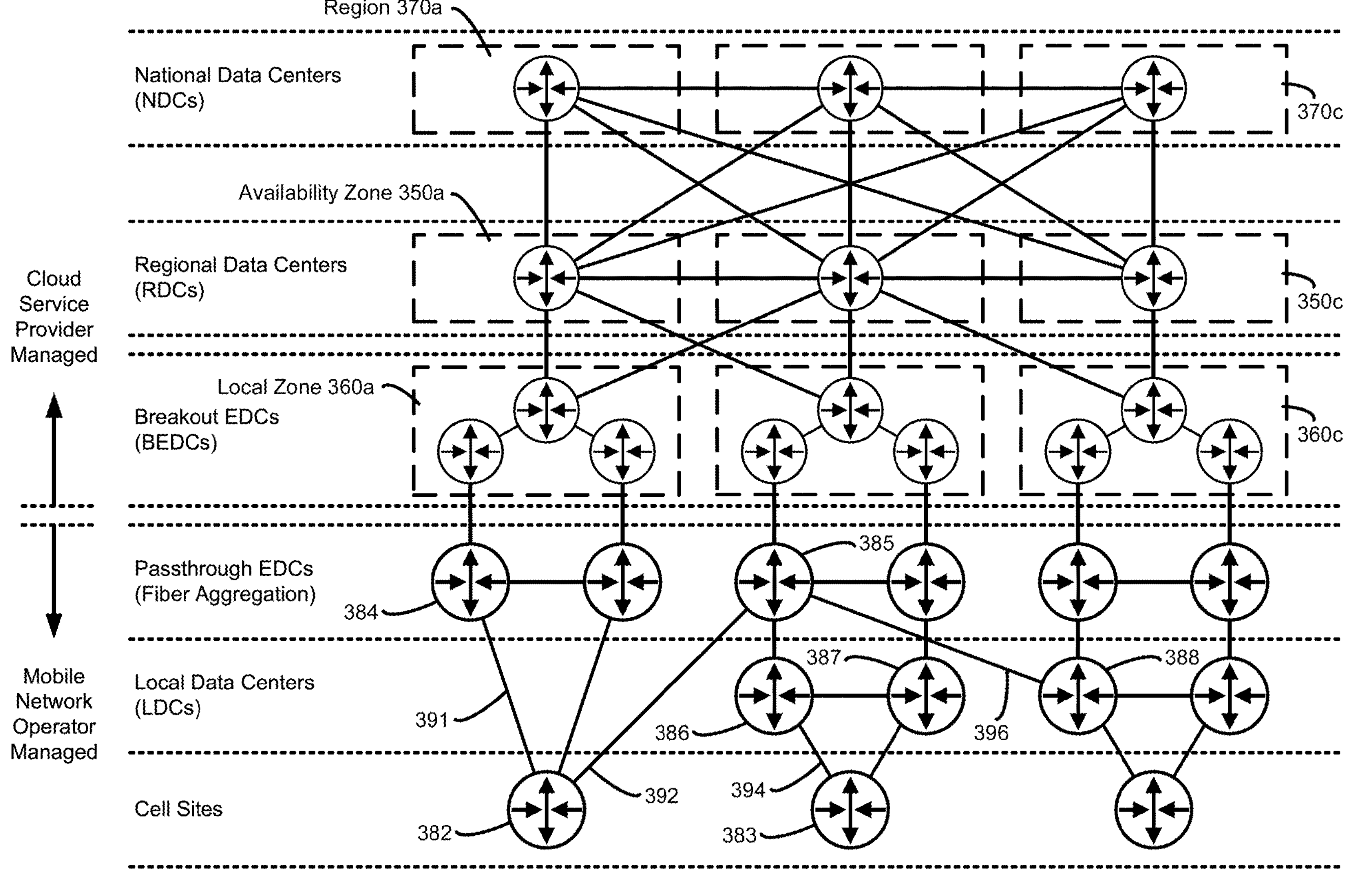
FIG. 4D depicts an embodiment of a data center hierarchy implemented using a cloud-based compute and storage infrastructure.

FIG. 4D depicts an embodiment of a data center hierarchy implemented using a cloud-based compute and storage infrastructure. The data center hierarchy includes multiple data center layers extending from a cell site layer (e.g., where an RRU resides). As the data center layers extend away from the cell site layer, the one-way latency for compute and storage resources may increase. As depicted, the data center layers include the local data center layer in which local data centers (LDCs) reside, the passthrough edge data center layer in which passthrough edge data centers (PEDCs) reside, the breakout edge data center layer in which breakthrough edge data centers (BEDCs) reside, the regional data center layer in which regional data centers (RDCs) reside, and the national data center layer in which national data centers (NDCs) reside. The NDCs may house different server clusters for running regions 370*a*-370*c*. In one example, region 370*a* may correspond with a first region (e.g., us-west-1), region 370*b* may correspond with a second region (e.g., us-west-2), and region 370*c* may correspond with a third region (e.g., us-east-1). Real and virtual routers within the data center layers may be connected together using an optical transport network (OTN) or high-speed pipes for RAN transport.

A virtual router 382 residing in the cell site layer may connect to a virtual router 384 residing in the passthrough edge data center layer via link 391. The link 391 may comprise a high-speed link or an optical fiber link. Data may be transmitted over the link 391 using an optical transport network. A virtual router 383 residing in the cell site layer may connect to a virtual router 386 residing in the local data center layer via link 394. The link 394 may comprise a high-speed link or an optical fiber link. The one-way latency between the virtual router 382 and the virtual router 384 may comprise a first time delay and the one-way latency between the virtual router 383 and the virtual router 386 may comprise a second time delay that is less than the first time delay.

Various network functions (e.g., UPF, SMF, and AMF) and applications may run using compute and storage resources within the data center hierarchy. A virtual network function (VNF) may be run at various levels within the data center hierarchy. For example, a UPF, such as UPF 132 in FIG. 1B, may be run within a local data center (LDC) of the local data center layer or run within a breakout edge data center (BEDC) of the breakout edge data center layer.

As depicted, a first redundant link 392 between the virtual router 382 and the virtual router 385 residing in the passthrough edge data center layer may allow applications running within the cell site layer to access data from either the virtual router 384 or the virtual router 385. The first redundant link 392 allows applications running within the cell site layer with access to the virtual router 382 to receive data when a failure occurs to the virtual router 384, a failure occurs to the local zone 360*a*, or a failure occurs to the availability zone 350*a*.

A second redundant link 394 between the virtual router 383 and the virtual router 386 may allow applications running within the cell site layer with access to the virtual router 383 to receive data when a failure occurs to the virtual router 387. A third redundant link 396 between the virtual router 388 and the virtual router 385 may allow applications running within the local data center layer with access to the virtual router 388 to receive data when a failure occurs to the local zone 360*c* or a failure occurs to the availability zone 350*c*. The redundant links 392, 394, and 396 may be created or established for high priority users or sites. The redundant links 392, 394, and 396 may be established or instantiated over time using virtual routers.

Figure 4E:
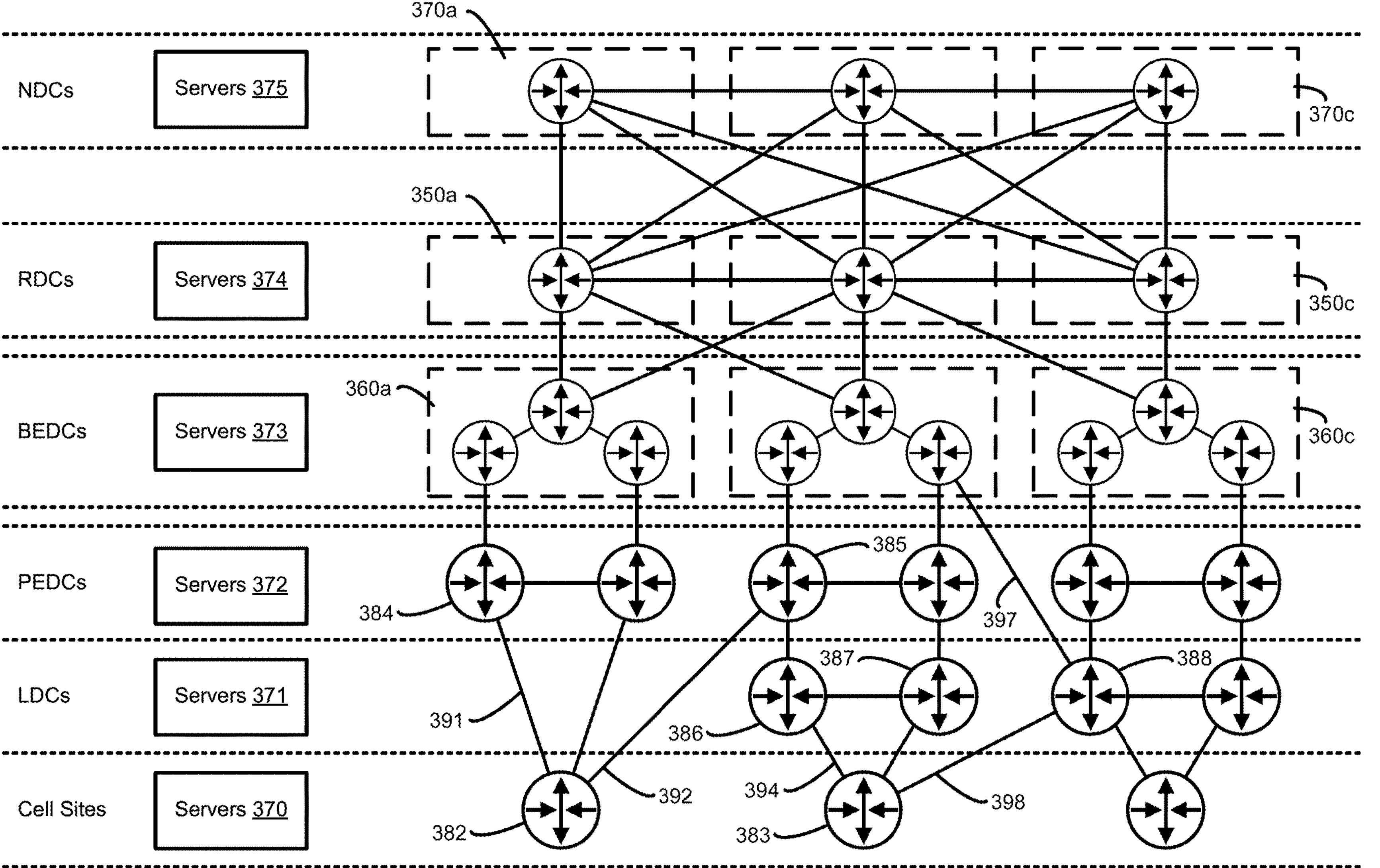
FIG. 4E depicts another embodiment of a data center hierarchy implemented using a cloud-based compute and storage infrastructure.

FIG. 4E depicts another embodiment of a data center hierarchy implemented using a cloud-based compute and storage infrastructure. As depicted, a new redundant link 398 between the virtual router 383 and the virtual router 388 residing in the local data center layer has been created. Also, a new redundant link 397 between the virtual router 388 and a virtual router residing in the breakout edge data center layer has been created. As depicted, servers 370-375 may reside within different layers of the data center hierarchy.

Figure 5:
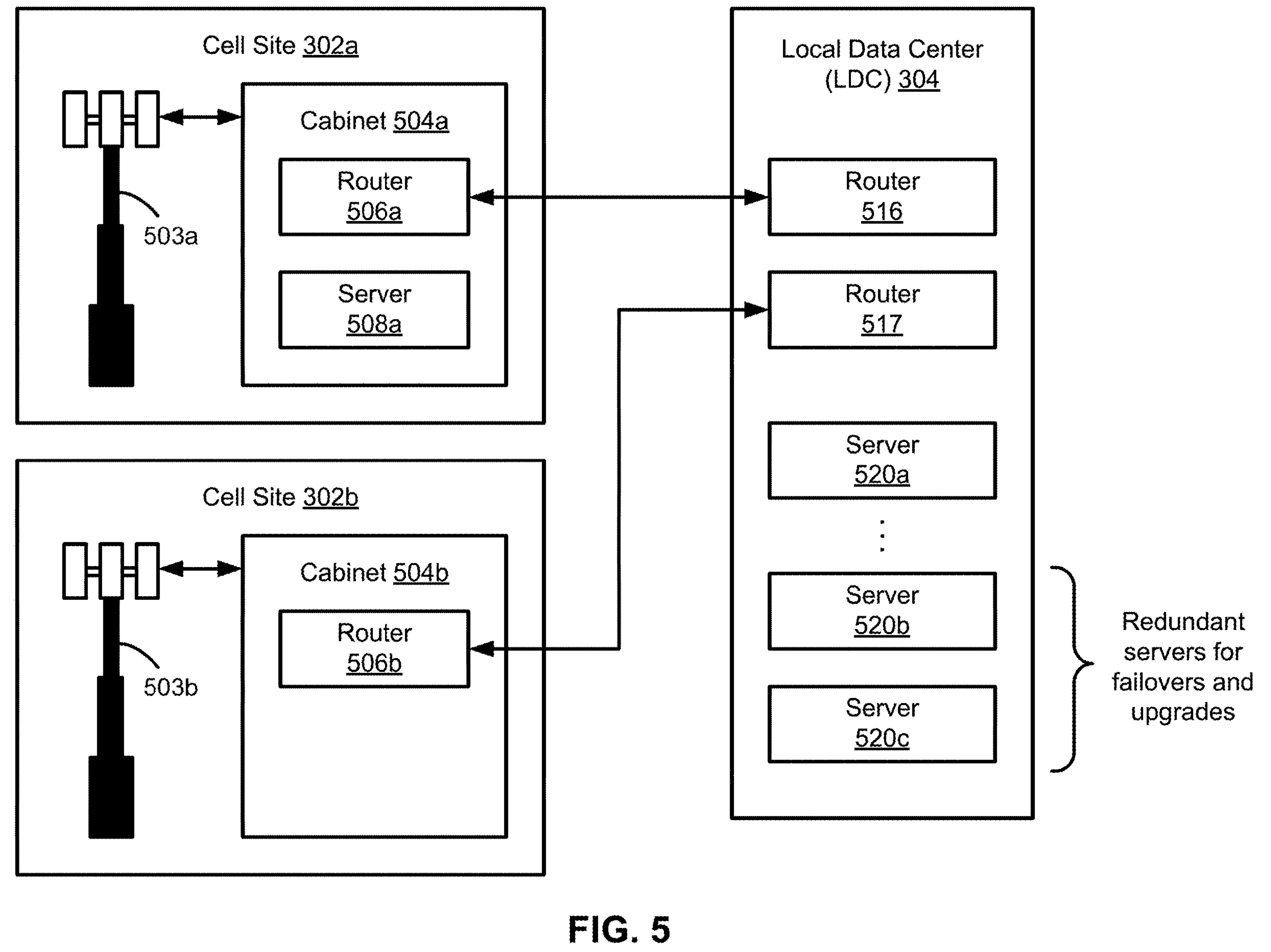
FIG. 5 depicts an embodiment of two cell sites in communication with a local data center (LDC).

FIG. 5 depicts an embodiment of cell sites 302*a* and 302*b* in communication with the local data center (LDC) 304. Each cell site 302 may include a tower structure 503 to which one or more remote radio units (RRUs) may be attached. Each cell site 302 may include a cabinet 504 that holds computer hardware and storage resources in close proximity to the tower structures 503. The cabinet 504*a* holds a router 506*a* and a hardware server 508*a*. The cabinet 504*b* holds a router 506*b*, but does not hold a hardware server; therefore DU and CU components are not able to run locally at the cell site 302*b*. The local data center (LDC) 304 includes a router 516 that is in communication with the router 506*a* at the cell site 502*a*. The local data center (LDC) 304 also includes a router 517 that is in communication with the router 506*b* at the cell site 502*b*. The local data center (LDC) 304 includes servers 520 and may include one or more redundant servers for facilitating failovers and hardware upgrades.

In some embodiments, server 508*a* at cell site 302*a* may run containerized applications. For example, the server 508*a* may run one baseband pod in the DU for L1-L2 processing for all cells connected to cell site 302*a*. A pod restart due to any failure could result in downtime for the entire cell site. To reduce the blast radius, DU application may be split into two pods to improve uptime and fault tolerance. A multi-pod architecture may improve availability of services.

In some embodiments, the server 508*a* may run containerized applications and microservices. Microservices (or a microservice architecture) structures an application as a collection of small autonomous services that communicate through application programming interfaces (APIs). An API may comprise a set of rules and protocols that define how applications connect to and communicate with each other. A REST API may comprise an API that conforms to the design principles of the representational state transfer (REST) architectural style. REST APIs may be referred to as RESTful APIs. REST APIs provide a flexible, lightweight way to integrate applications, and have emerged as the most common method for connecting components in microservices architectures. REST APIs communicate via HTTP requests to perform standard database functions like creating, reading, updating, and deleting records (also known as CRUD) within a resource. For HTTP operations, a creation operation may comprise a POST operation, a reading operation may comprise a GET operation, an updating operation may comprise a PUT operation, and a delete operation may comprise a DELETE operation. In one example, a REST API may use a GET request to retrieve a record, a POST request to create a record, a PUT request to update a record, and a DELETE request to delete a record. When a client request is made via a RESTful API, it transfers a representation of the state of the resource to the requester or endpoint. The state of a resource at any particular instant, or timestamp, is known as the resource representation. This information can be delivered to a client in virtually any format including JavaScript Object Notation (JSON), HTML, or plain text. JSON is popular because it's readable by both humans and machines—and it is programming language-agnostic.

In some embodiments, dynamic network slicing may be used to perform self-healing to compensate for a failure of a network node. Self-healing may temporarily restore coverage by increasing power of neighboring cells to increase their coverage area.

Figure 6A:
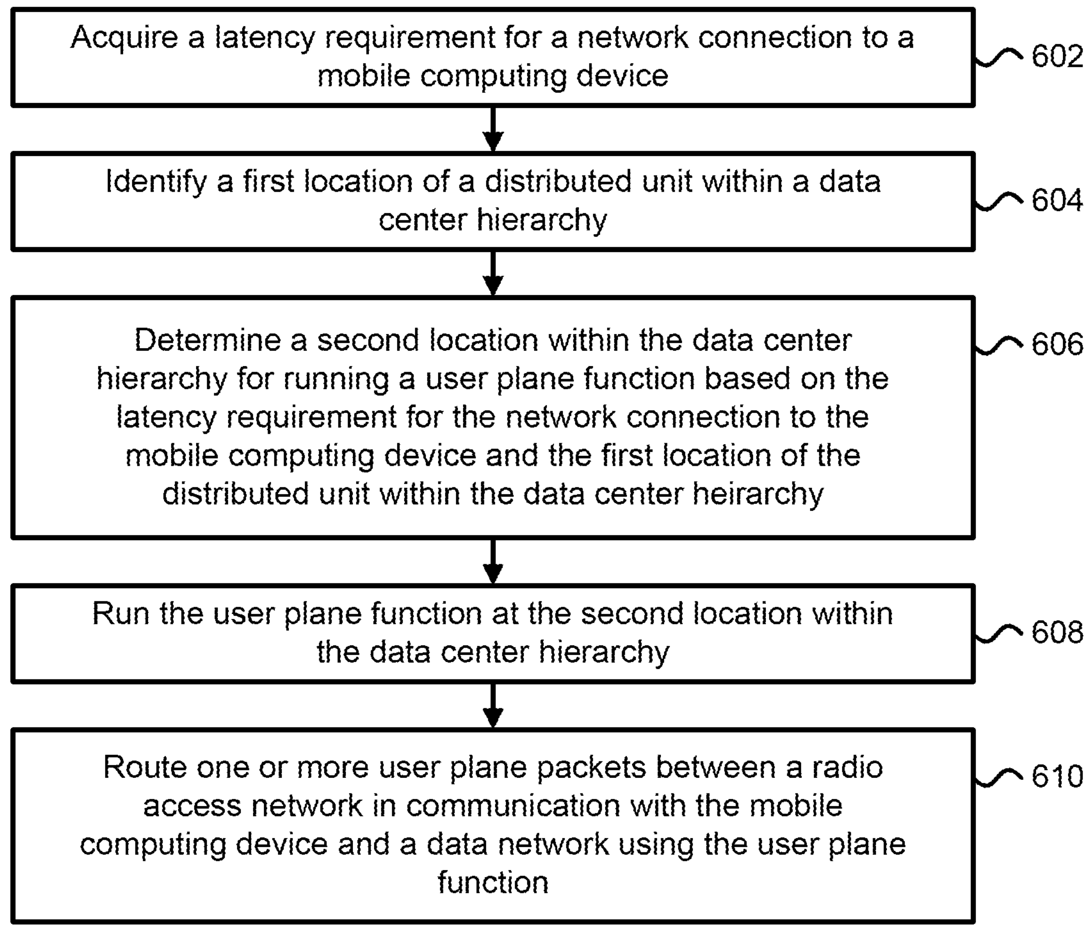
FIG. 6A depicts a flowchart describing an embodiment of a process for running a user plane function for a core network.

FIG. 6A depicts a flowchart describing one embodiment of a process for identifying a location within a data center hierarchy for running a user plane function of a core network. In one embodiment, the process of FIG. 6A may be performed by a core network, such as the core network 130 in FIG. 2E. In another embodiment, the process of FIG. 6A may be performed using one or more virtual machines and/or one or more containerized applications. In another embodiment, the process of FIG. 6A may be performed using a containerized environment, such as the containerized environment 279 in FIG. 2E.

In step 602, a latency requirement for a network connection to user equipment, such as a mobile computing device, is acquired. In step 604, a first location of a distributed unit within a data center hierarchy is identified. In some cases, the distributed unit may correspond with distributed unit DU 204 in FIG. 1B. In other cases, the distribute unit may correspond with the virtualized distributed unit VDU 201 in FIG. 3A that is located within a local data center LDC 304 within a data center hierarchy. In step 606, a second location within the data center hierarchy for running a user plane function is determined based on the latency requirement for the network connection to the user equipment and/or the first location of the distributed unit within the data center hierarchy. In some cases, the first location within the data center hierarchy and the second location within the data center hierarchy may correspond with the same location within the data center hierarchy. In other cases, the first location within the data center hierarchy and the second location within the data center hierarchy may correspond with the different locations within the data center hierarchy.

In one embodiment, the second location within the data center hierarchy for running a user plane function may correspond with a local data center, such as the LDC 304 in FIG. 3B. In another embodiment, the second location within the data center hierarchy for running a user plane function may correspond with a breakout edge data center, such as the BEDC 306 in FIG. 3A. Over time, due to updated latency requirements, the user plane function may be subsequently moved to a location within the data center hierarchy that is closer to a cell site layer or closer to the location of a VDU. For example, the user plane function may correspond with UPF 132 in FIG. 3A being moved from the BEDC 306 to the LDC 304 in FIG. 3B. In step 608, the user plane function is run at the second location within the data center hierarchy or is executed within a data center located at the second location within the data center hierarchy. In step 610, one or more user plane packets are routed between a radio access network in communication with the user equipment and a data network using the user plane function.

In some embodiments, the latency requirement for the network connection may comprise a one-way latency requirement from a mobile computing device to the user plane function. In other embodiments, the latency requirement for the network connection may comprise a round-trip latency requirement between a mobile computing device and a data network from which data is being transferred to the mobile computing device. In other embodiments, the latency requirement for the network connection may comprise a one-way latency requirement between an RRU and a DU in communication with the RRU of less than 160 microseconds. In other embodiments, the latency requirement for the network connection may comprise a one-way latency requirement between a DU and a CU in communication with the DU of less than 4 milliseconds.

Different virtualized network functions such as the user plane function and the session management function may be assigned to different locations within a data center hierarchy based on a latency requirement for a network connection to user equipment (e.g., for a particular network slice for a mobile computing device) and/or the location of the distributed unit within the data center hierarchy. In one example, a user plane function may be assigned to a first data center within a data center hierarchy and a session management function that is paired with the user plane function may be assigned to a second data center within the data center hierarchy different from the first data center.

In some embodiments, a latency requirement for a network connection to a mobile computing device is acquired, a location of a distributive unit in communication with a user plane function is identified, a data center location for running the user plane function is determined based on the latency requirement for the network connection to the mobile computing device and the location of the distributed unit, and an instruction to cause the user plane function to be run at the data center location is outputted. In one example, the instruction may be transmitted to a server that resides at the data center location.

Figure 6B:
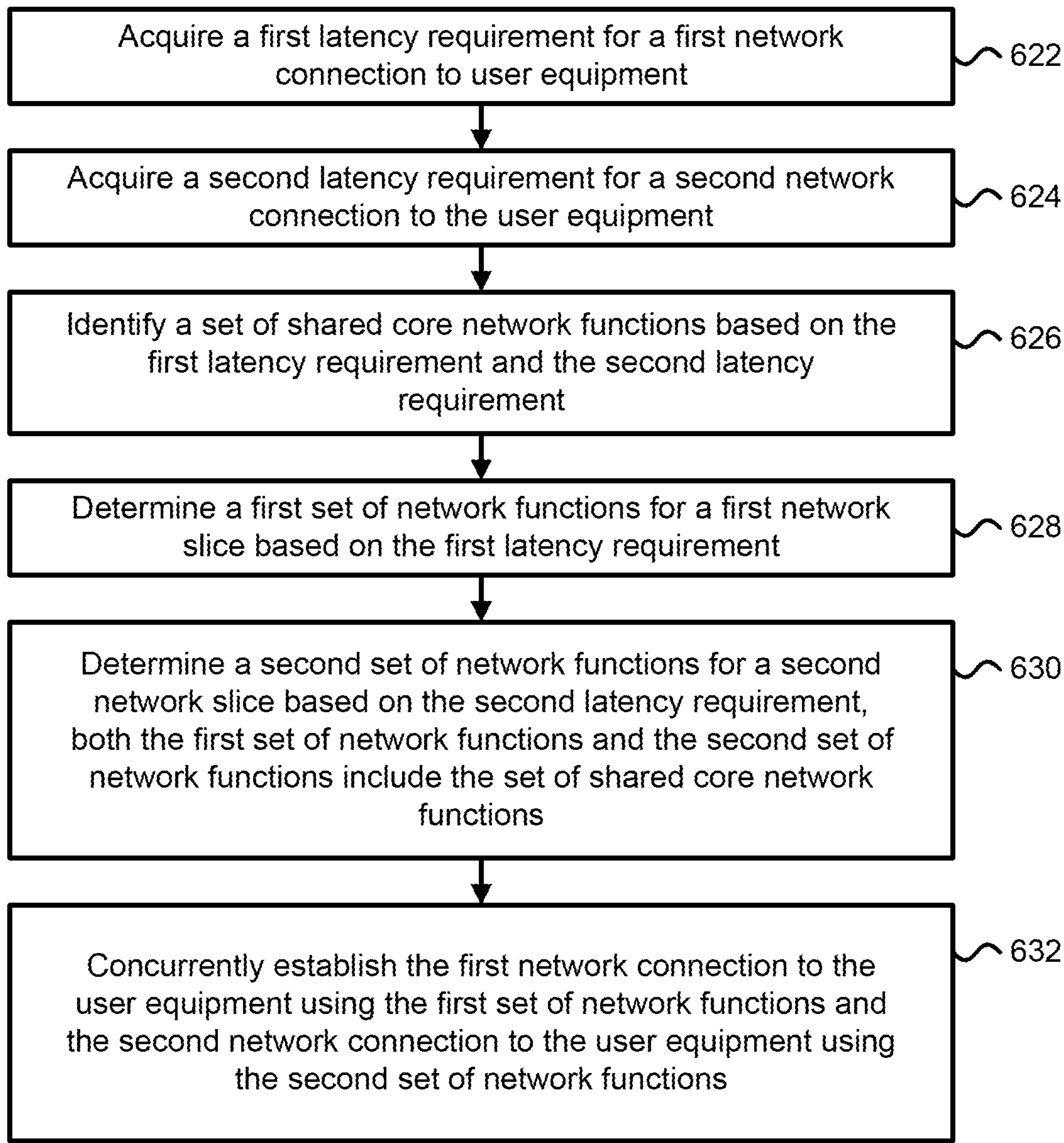
FIG. 6B depicts a flowchart describing an embodiment of a process for establishing network connections using a core network.

FIG. 6B depicts a flowchart describing an embodiment of a process for establishing network connections using a core network. In one embodiment, the process of FIG. 6B may be performed by a core network, such as the core network 130 in FIG. 2E. In another embodiment, the process of FIG. 6B may be performed using one or more virtual machines and/or one or more containerized applications. In another embodiment, the process of FIG. 6B may be performed using a containerized environment, such as the containerized environment 279 in FIG. 2E.

In step 622, a first latency requirement for a first network connection to user equipment is acquired. In step 624, a second latency requirement for a second network connection to the user equipment is acquired. The user equipment may comprise a mobile computing device. In some cases, the first latency requirement may comprise a one-way latency requirement to or from the user equipment. In other cases, the first latency requirement may comprise a round-trip latency requirement between the user equipment and a data network from which data is being transferred to the user equipment. The first latency requirement may be greater than or less than the second latency requirement.

In step 626, a set of shared core network functions is identified based on the first latency requirement and the second latency requirement. In one example, the set of shared core network functions may correspond with the shared core network functions 131 in FIG. 1H. In step 628, a first set of network functions for a first network slice is determined based on the first latency requirement. In step 630, a second set of network functions for a second network slice is determined based on the second latency requirement. In some cases, both the first set of network functions and the second set of network functions may include the set of shared core network functions. In one example, the first set of network functions may correspond with the network functions within the slice 122*a* of FIG. 1H and the shared core network functions 131 in FIG. 1H and the second set of network functions may correspond with the network functions within the slice 122*b* of FIG. 1H and the shared core network functions 131 in FIG. 1H.

In step 632, the first network connection to the user equipment (e.g., a mobile computing device) is established using the first set of network functions for the first network slice and the second network connection to the user equipment is established using the second set of network functions for the second network slice. Both the first network connection and the second network connection may be concurrently established such that a mobile computing device may simultaneously connect to a data network using both the first network connection and the second network connection.

In some embodiments, a placement of the first set of network functions within a data center hierarchy may be adjusted based on a quality of service parameter associated with the first network connection to the user equipment. The placement of the first set of network functions may correspond with the location of a data center within the data center hierarchy in which the first set of network functions are executed. The quality of service parameter may comprise a minimum network speed to user equipment or an end-to-end latency from the user equipment to a data network.

In some cases, a set of network functions for a network slice may be identified based on a latency requirement for a network connection to user equipment. The set of network functions may be updated based on an updated latency requirement for the network connection to the user equipment, which may in turn cause a network slice to be reconfigured based on the updated set of network functions.

Figure 6C:
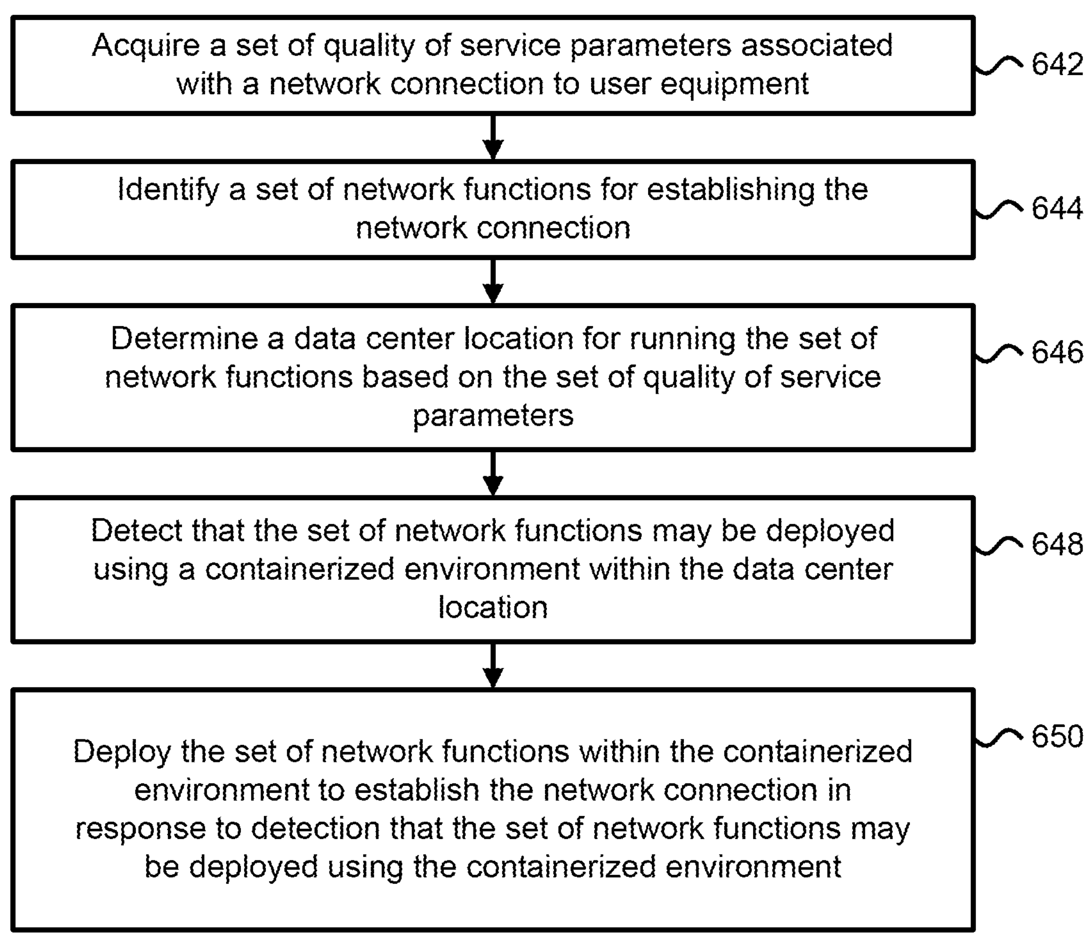
FIG. 6C depicts a flowchart describing an embodiment of a process for establishing a network connection.

FIG. 6C depicts a flowchart describing an embodiment of a process for establishing a network connection. In one embodiment, the process of FIG. 6C may be performed by a core network, such as the core network 130 in FIG. 2E, or a radio access network, such as the radio access network 120 in FIG. 2C. In another embodiment, the process of FIG. 6C may be performed using one or more virtual machines and/or one or more containerized applications. In another embodiment, the process of FIG. 6C may be performed using a containerized environment, such as the containerized environment 279 in FIG. 2E.

In step 642, a set of quality of service parameters associated with a network connection to user equipment (e.g., a mobile computing device) is acquired. The set of quality of service parameters may include bit rate, bit error rate, throughput, packet loss, maximum packet loss rate, packet error rate, packet delay variation, end-to-end latency, network availability, jitter, and/or network bandwidth. In step 644, a set of network functions for establishing the network connection is identified. The set of network connections may correspond with a set of virtualized network functions for a network slice, such as AMF 134*a*, SMF 133*a*, UPF 132*a*, NSSF 138 and PCF 135 depicted in FIG. 1G. The particular set of virtualized network functions for the network slice may be identified based on a network slice configuration (or use case) for the network slice, such as a high-reliability configuration or a low-latency configuration.

In step 646, a data center location for running the set of network functions is determined based on the set of quality of service parameters or metrics. In one example, the data center location may correspond with a local data center, such as the local data center LDC 304 in FIG. 3C, and the set of network functions may include a user plane function, such as the user plane function UPF 132 in FIG. 3C. In step 648, it is detected that the set of network functions may be deployed using a containerized environment within the data center location. In step 650, the set of network functions is deployed within the containerized environment to establish the network connection in response to detection that the set of network functions may be deployed using the containerized environment. As an example, the containerized environment may correspond with the containerized environment 279 in FIG. 2E.

In some embodiments, the determination of a data center location for running the set of network functions may be based on a latency requirement for the set of network functions. In other embodiments, the determination of a data center location for running the set of network functions may be based on a power requirement for the set of network functions, such as a maximum power requirement for the set of network functions. In one example, the maximum power requirement is associated with a maximum power consumption for computing resources executing the set of network functions (e.g., a server executing the set of network functions must consume less than 5 W).

In some cases, a set of network functions for establishing a network connection or that are associated with a network slice to establish a network connection may have a maximum power budget such that the total power consumed to execute the set of network functions across a data center hierarchy is restricted or limited. In other cases, a set of network functions for establishing a network connection or that are associated with a network slice to establish a network connection may have a maximum power budget per data center such that the power consumed to execute the set of network functions at each data center within a data center hierarchy is restricted or limited. Each data center within a data center hierarchy may have a maximum power limit for network functions associated with a particular network slice.

Figure 6D:
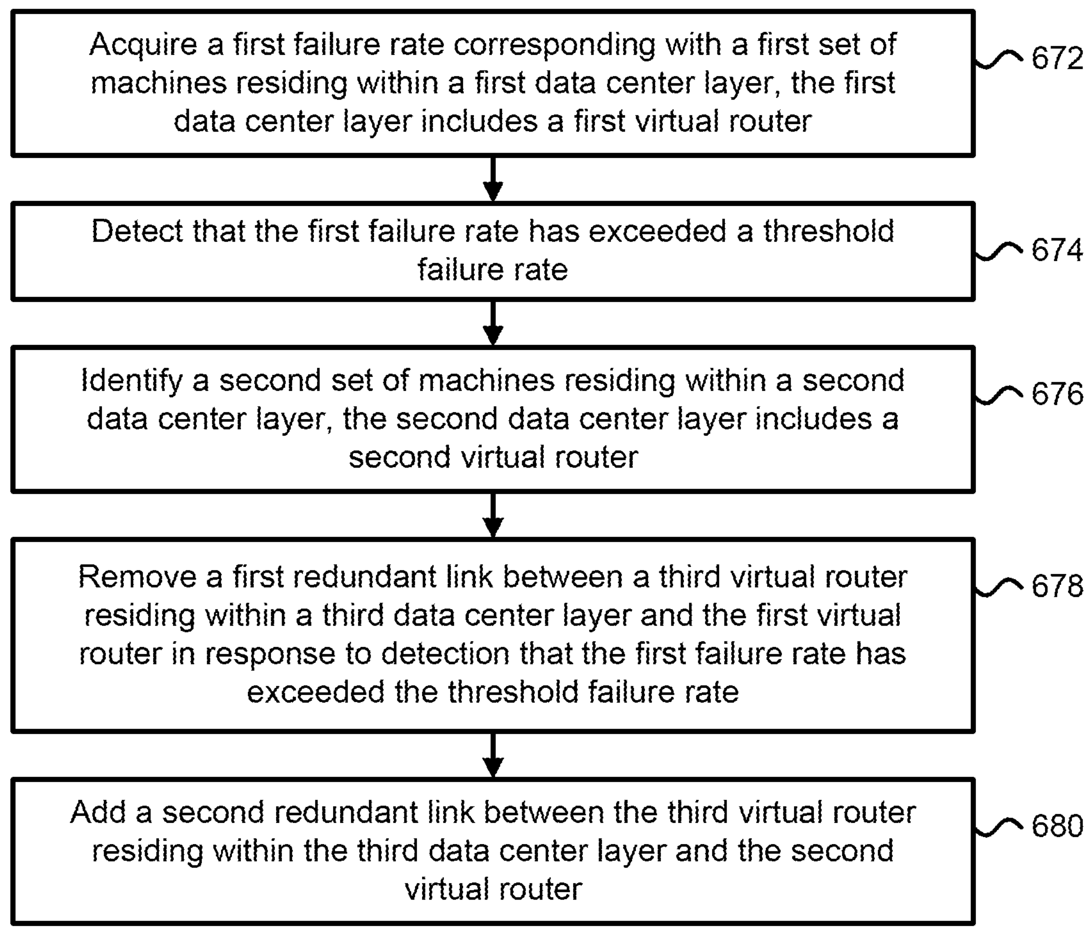
FIG. 6D depicts a flowchart describing an embodiment of a process for adding and removing redundant links.

FIG. 6D depicts a flowchart describing an embodiment of a process for adding and removing redundant links between routers. In one embodiment, the process of FIG. 6D may be performed by a core network, such as the core network 130 in FIG. 2E, or a radio access network, such as the radio access network 120 in FIG. 2C. In another embodiment, the process of FIG. 6D may be performed using one or more virtual machines and/or one or more containerized applications. In another embodiment, the process of FIG. 6D may be performed using a containerized environment, such as the containerized environment 279 in FIG. 2E.

In step 672, a first failure rate corresponding with a first set of machines residing within a first data center layer is acquired. In some cases, the failure rate may comprise the number of virtual machines that have failed over a period of time (e.g., that failed over the past hour). In other cases, the failure rate may correspond with the number of virtual machines that are no longer responsive. In some cases, the failure rate may correspond with the number of physical servers that have had a software or hardware failure within a past period of time. The first data center layer may include a first router (e.g., a virtual router or a physical router). In step 674, it is detected that the first failure rate has exceeded a threshold failure rate. For example, it may be detected that the first set of machines have had more than four failures within the past week. In step 676, a second set of machines residing within a second data center layer is identified. In step 678, a first redundant link between a third router residing within a third data center layer and the first router is removed in response to detection that the first failure rate has exceeded the threshold failure rate. In step 680, a second redundant link is added between the third router residing within the third data center layer and the second router.

In some embodiments, to conserve resources the first redundant link may be removed before adding the second redundant link. The second set of machines residing in the second data center layer may be selected or identified as an end point for the second redundant link if it is detected that the second set of machines have not exceeded the threshold failure rate.

In the situation that the first data center layer is arranged between the third data center layer and the second data center layer, the third data center layer may correspond with a cell site layer, the first data center layer may correspond with a local data center layer, and the second data center layer may correspond with a breakout edge data center layer.

Figure 7A:
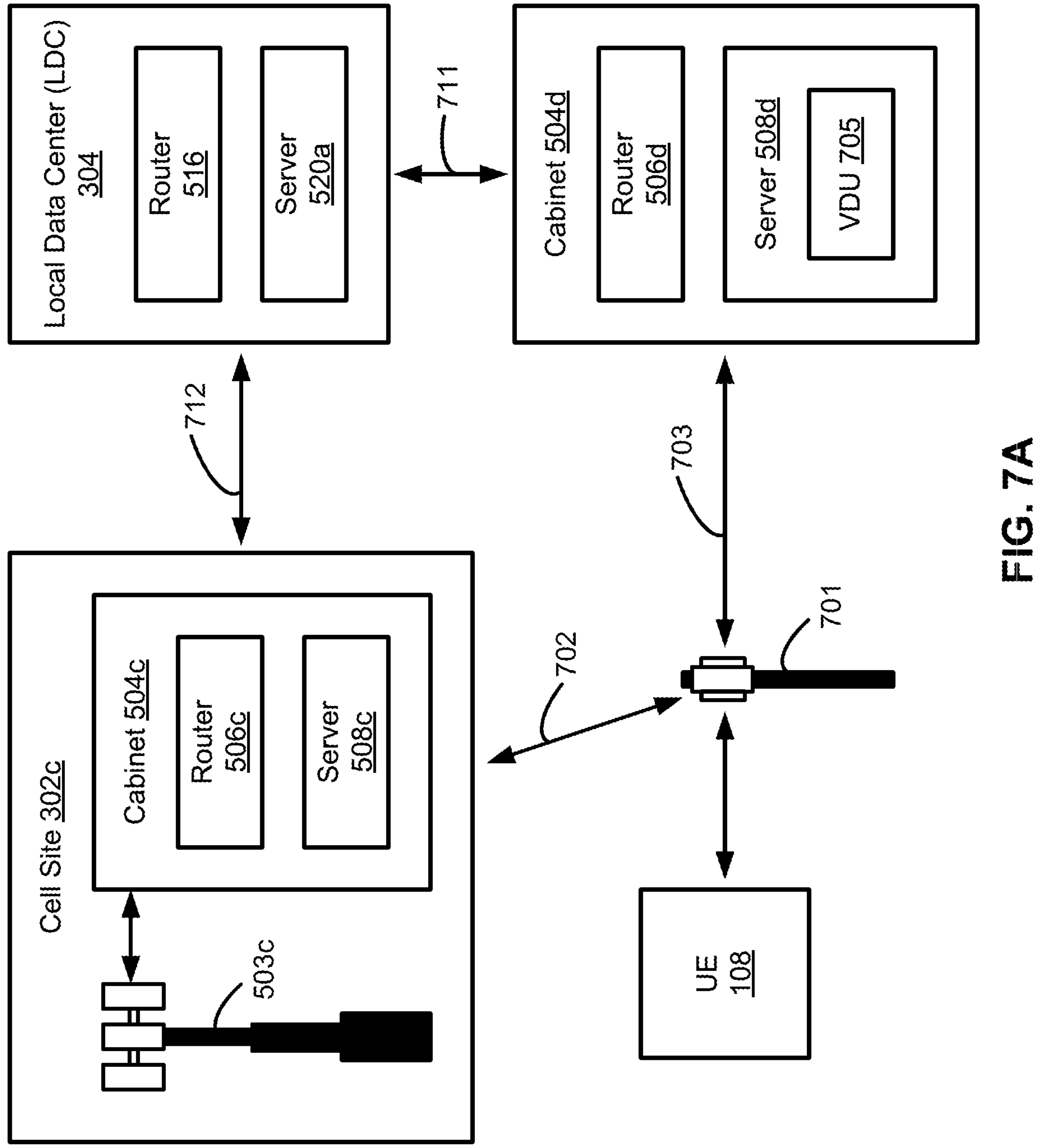
FIG. 7A depicts one embodiment of a portion of a 5G network.

FIG. 7A depicts one embodiment of a portion of a 5G network including user equipment UE 108 in communication with a small cell structure 701. The small cell structure 701 may comprise a pole or a mini-tower structure to which one or more remote radio units (RRUs) may be attached. The small cell structure 701 may simultaneously support wireless communications with numerous mobile computing devices not depicted. As depicted, a cabinet 504*d* may hold computer hardware and storage resources in close proximity to the small cell structure 701 in order to perform packet routing and data processing tasks. The cabinet 504*d* may house a router 506*d* (e.g., a real hardware router or a virtual router) and a server 508*d* (e.g., a real machine or a virtual machine) that is running a virtualized distributed unit (VDU) 705. The cabinet 504*d* may be within a wireless communication distance of a set of small cell structures including the small cell structure 701 and/or may have one or more wired connections to the set of small cell structures (e.g., network cabling located below a street connecting the small cell structure 701 to hardware within the cabinet 504*d*). The small cell structure 701 may communicate with hardware within the cabinet 504*d* via communication path 703 (e.g., a wireless communication path or a radio link path). The server 508*d* within the cabinet 504*d* may run DU and CU components. The router 506*d* may exchange data or be in communication with hardware within the local data center LDC 304 via communication path 711. The local data center LDC 304 includes a router 516 and a server 520*a*. The small cell structure 701 may communicate with hardware at the cell site 302*c* via communication path 702. The cell site 302*c* may include a cabinet 504*c*. The hardware within the cabinet 504*c* may include a router 506*c* and a server 508*c*. The router 506*c* may be in communication with hardware resources within the local data center LDC via communication path 712.

As depicted in FIG. 7A, a first communication path from the small cell structure 701 may include communication path 702 and communication path 712. Data corresponding with a first network slice may traverse the first communication path. A second communication path from the small cell structure 701 may include communication path 703 and communication path 711. Data corresponding with a second network slice different from the first network slice may traverse the second communication path.

Figure 7B:
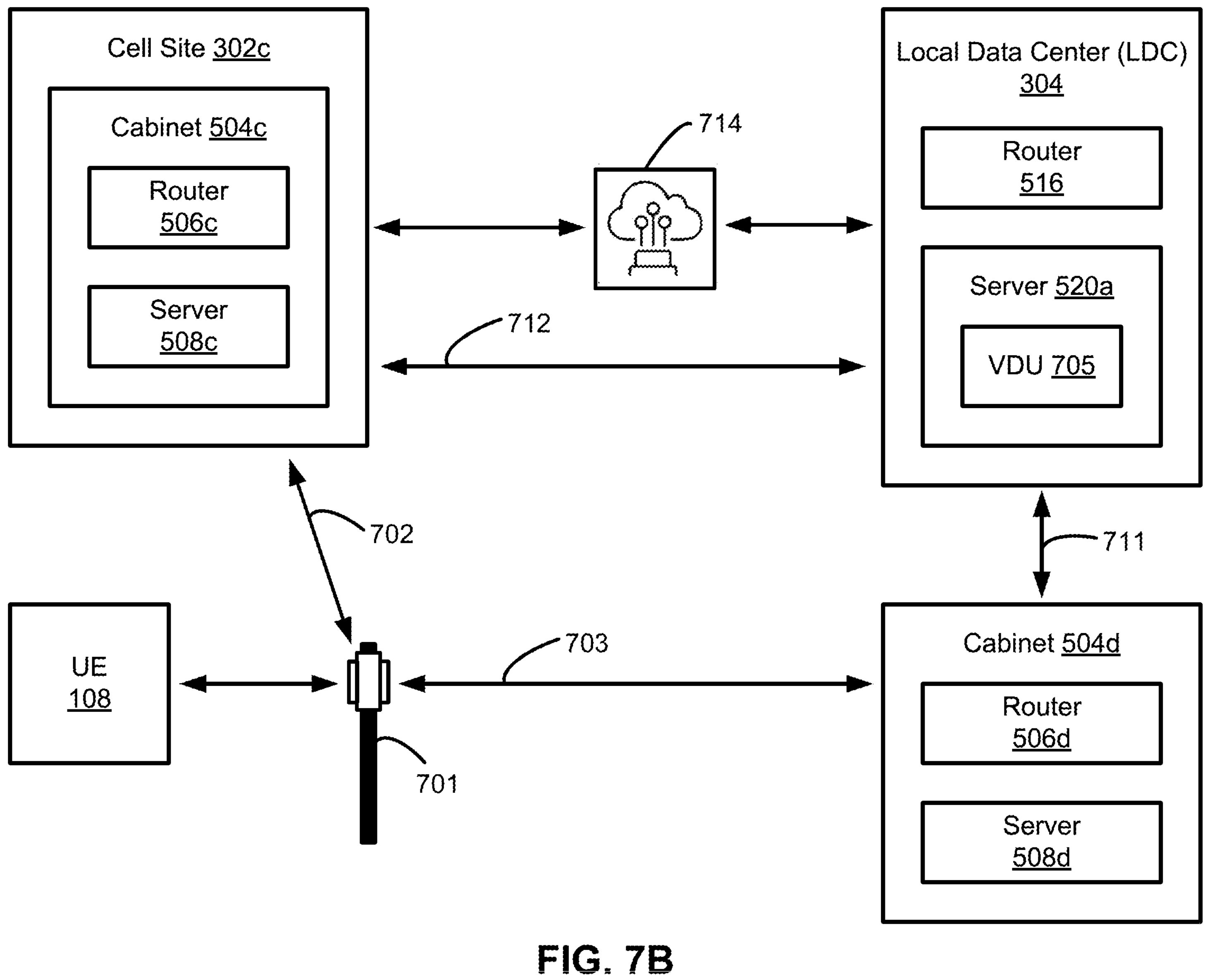
FIG. 7B depicts one embodiment of the portion of the 5G network in FIG. 7A with an additional communication path.

FIG. 7B depicts one embodiment of the portion of the 5G network in FIG. 7A with an additional communication path that comprises a direct private connection 714 between the hardware resources within the cabinet 504*c* and the hardware resources within the local data center LDC 304. Moreover, the virtualized distributed unit VDU 705 is now running on server 520*a* within the local data center LDC 304. The direct private connection 714 may include fiber-optic cables and may be used to establish or connect to a virtual private cloud hosted by the local data center LDC 304.

In one embodiment, the user equipment UE 108 may be in communication with one or more data networks not depicted via a plurality of network slices. A first network slice of the plurality of network slices may traverse communication paths 703 and 711. The first network slice may correspond with a low-latency configuration that demands a first latency requirement. A second network slice of the plurality of network slices may traverse communication paths 702 and 712. The second network slice may correspond with a high-reliability configuration that demands a second latency requirement that is greater than the first latency requirement. A third network slice of the plurality of network slices may traverse communication paths 702 and 714. The third network slice may correspond with a high-security configuration that demands a third latency requirement greater than the second latency requirement. The assignment of the virtualized restricted unit VDU 705 to a particular server within a data center hierarchy may depend on the requirements of one or more network slices supported by the VDU 705. In one example, the addition of the third network slice through the direct private connection 714 may cause the location of the VDU 705 to be moved from the server 508*d* to the server 520*a*.

In one embodiment, the virtualized distributed unit VDU 705 may only be redeployed within the local data center LDC 304 if the first latency requirement between the virtualized distributed unit VDU 705 and the user equipment 108 would still be satisfied. If the first latency requirement for the first network slice would not be satisfied, then a second virtualized distributed unit not depicted may be instantiated within a server within the local data center to support the second network slice and the third network slice. In some cases, the server assignment for the virtualized distributed unit 705 may be determined based on the latency requirements of the network slices supported by the virtualized distributed unit 705. In some cases, the server assignment for the virtualized distributed unit 705 may be determined based on the maximum latency requirements of the network slices supported by the virtualized distributed unit 705 and/or quality of service requirements of the network slices supported by the virtualized distributed unit 705.

Figure 7C:
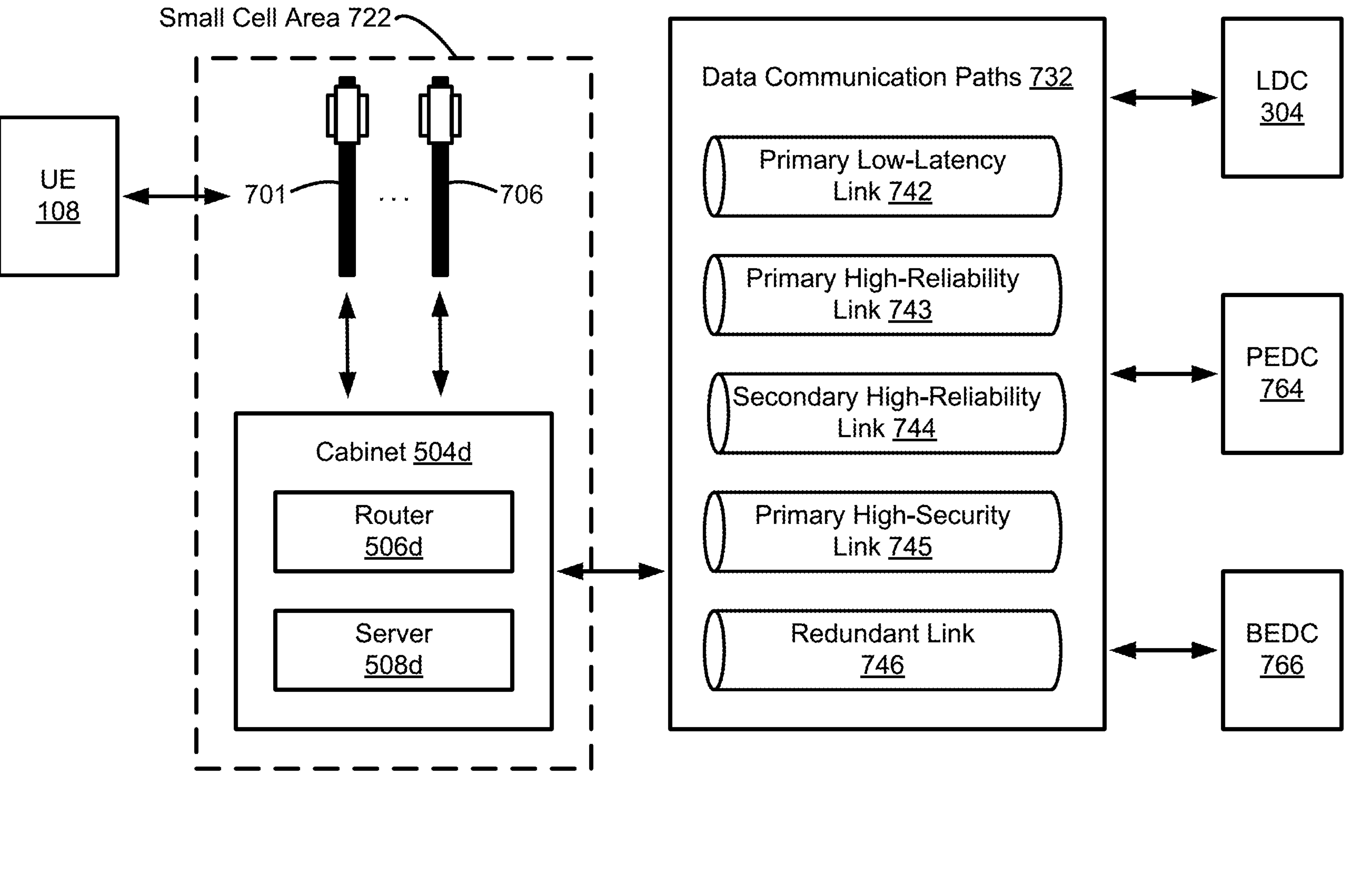
FIG. 7C depicts one embodiment of a portion of a 5G network that includes a plurality of small cell structures.

FIG. 7C depicts one embodiment of a portion of a 5G network in which a plurality of small cell structures including small cell structure 701 and small cell structure 706 are in communication with hardware resources within a cabinet 504*d*. The user equipment UE 108 may be in communication with a local data center LDC 304, a pass-through EDC 764, and a breakout EDC 766 via data communication paths 732. The data communication paths 732 may include a number of links 742-746 over which data may be transferred between the hardware resources within the cabinet 504*d* and the local data center LDC 304, the pass-through EDC 764, and the breakout EDC 766. The data communication paths 732 may include a primary low-latency link 742, a primary high-reliability link 743, a secondary high-reliability link 744, a primary high-security link 745, and a redundant link 746. The redundant link 746 may comprise a duplicate link between the router 506*d* and a router within one of the data centers to which the data communication paths 732 connects.

Figure 7D:
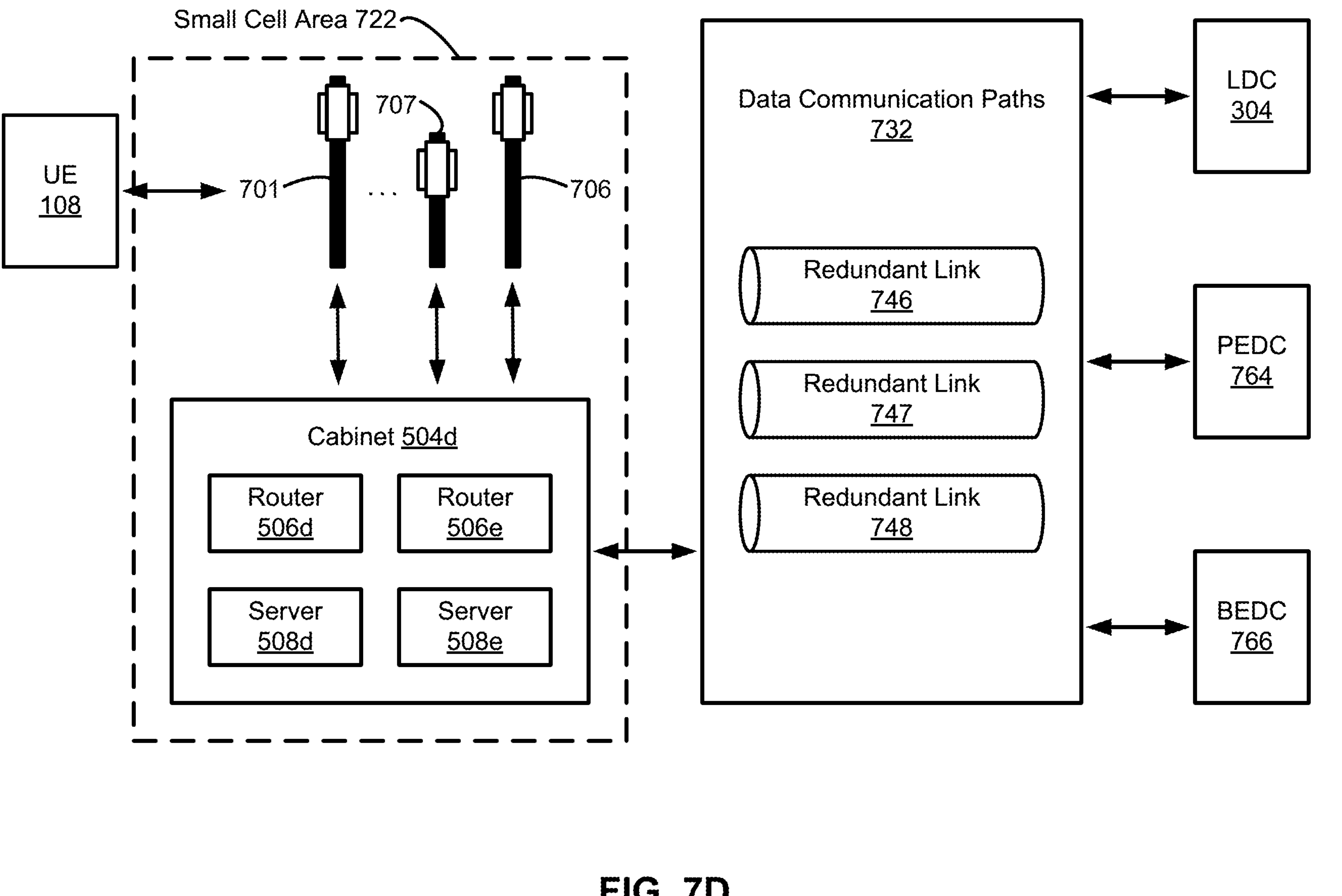
FIG. 7D depicts another embodiment of a portion of a 5G network that includes a plurality of small cell structures.

FIG. 7D depicts one embodiment of a portion of a 5G network in which a plurality of small cell structures including small cell structure 701, small cell structure 706, and small cell structure 707 are in communication with hardware resources within the cabinet 504*d*. As depicted, an increase in the number of small cells in communication with the hardware resources within the cabinet 504*d* has caused additional hardware resources to be instantiated within the cabinet 504*d*. In one embodiment, the routers 506*d* and 506*e* may comprise virtual routers and the servers 508*d* and 508*e* may comprise virtual servers or virtual machines. Over time, the number of virtualized hardware resources within the cabinet 504*d* may be scaled up or down depending on the number of mobile computing devices supported by the small cell structures within the small cell area 722. In some cases, a maximum power requirement may be used to determine the maximum number of virtual servers that may be instantiated within the cabinet 504*d*.

The data communication paths 732 includes redundant links 746-748. In some embodiments, redundant links between virtual routers within a data center hierarchy may be scaled up or down based on the number of high-reliability network slice configurations and/or the quality of service parameters associated with network slices supported by the virtual routers. In one embodiment, a data communication path for a network slice may be assigned a redundant link if the network slice has been configured with at least a minimum network speed and the network slice has experienced at least a threshold number of data errors. In another embodiment, a data communication path for a network slice may be assigned a redundant link if one or more routers and/or one or more servers supporting the network slice have experienced at least a threshold number of failures (e.g., at least two failures within the past 24 hours). The total number of redundant links available for use within the data communications paths 732 may be set based on a power requirement for supporting the redundant links.

Figure 8A:
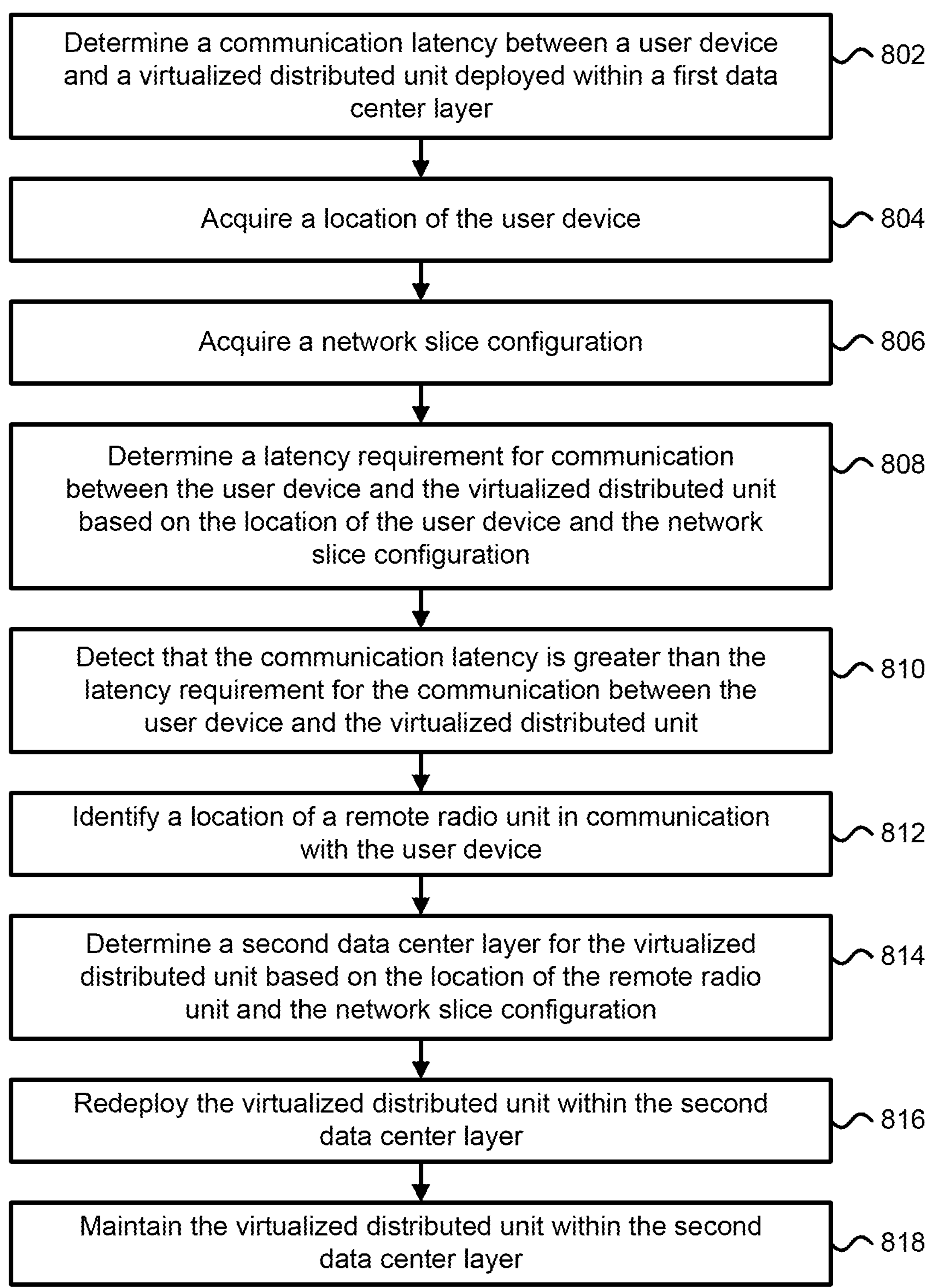
FIG. 8A depicts a flowchart describing an embodiment of a process for deploying a distributed unit within a data center hierarchy.

FIG. 8A depicts a flowchart describing an embodiment of a process for deploying a distributed unit within a data center hierarchy. In one embodiment, the process of FIG. 8A may be performed by a core network, such as the core network 130 in FIG. 2E, or a radio access network, such as the radio access network 120 in FIG. 2C. In another embodiment, the process of FIG. 8A may be performed using one or more virtual machines and/or one or more containerized applications. In another embodiment, the process of FIG. 8A may be performed using a containerized environment, such as the containerized environment 279 in FIG. 2E.

In step 802, a communication latency between a user device (e.g., a mobile computing device) and a virtualized distributed unit deployed within a first data center layer is determined. The communication latency may correspond with a one-way data latency between the user device and the virtualized distributed unit. The user device may correspond with user equipment. In step 804, a location of the user device is acquired. In one embodiment, the location of the user device may comprise a GPS location. In step 806, a network slice configuration is acquired. The network slice configuration may be associated with a low latency configuration or a high reliability configuration. A network slice configuration may be associated with a minimum network bandwidth or a maximum data transfer latency between the user device and a data network. In step 808, a latency requirement for communication (e.g., data communication) between the user device and the virtualized distributed unit is determined based on the location of the user device and the network slice configuration.

In step 810, it is detected that the communication latency is greater than the latency requirement for the communication between the user device and the virtualized distributed unit. In step 812, a location of a remote radio unit in communication with the mobile computing device is identified. The location of the remote radio unit may correspond with a data center within a data center hierarchy. In one example, the location of the remote radio unit may correspond with a cell site or cell tower. In step 814, a second data center layer for the virtualized distributed unit is determined based on the location of the remote radio unit and the network slice configuration. In step 816, the virtualized distributed unit is redeployed within the second data center layer. The virtualized distributed unit may be transferred from the first data center layer to the second data center layer. In step 818, the virtualized distributed unit is maintained within the second data center layer. One example of a process for maintaining a virtualized distributed unit is depicted in FIG. 8B.

Figure 8B:
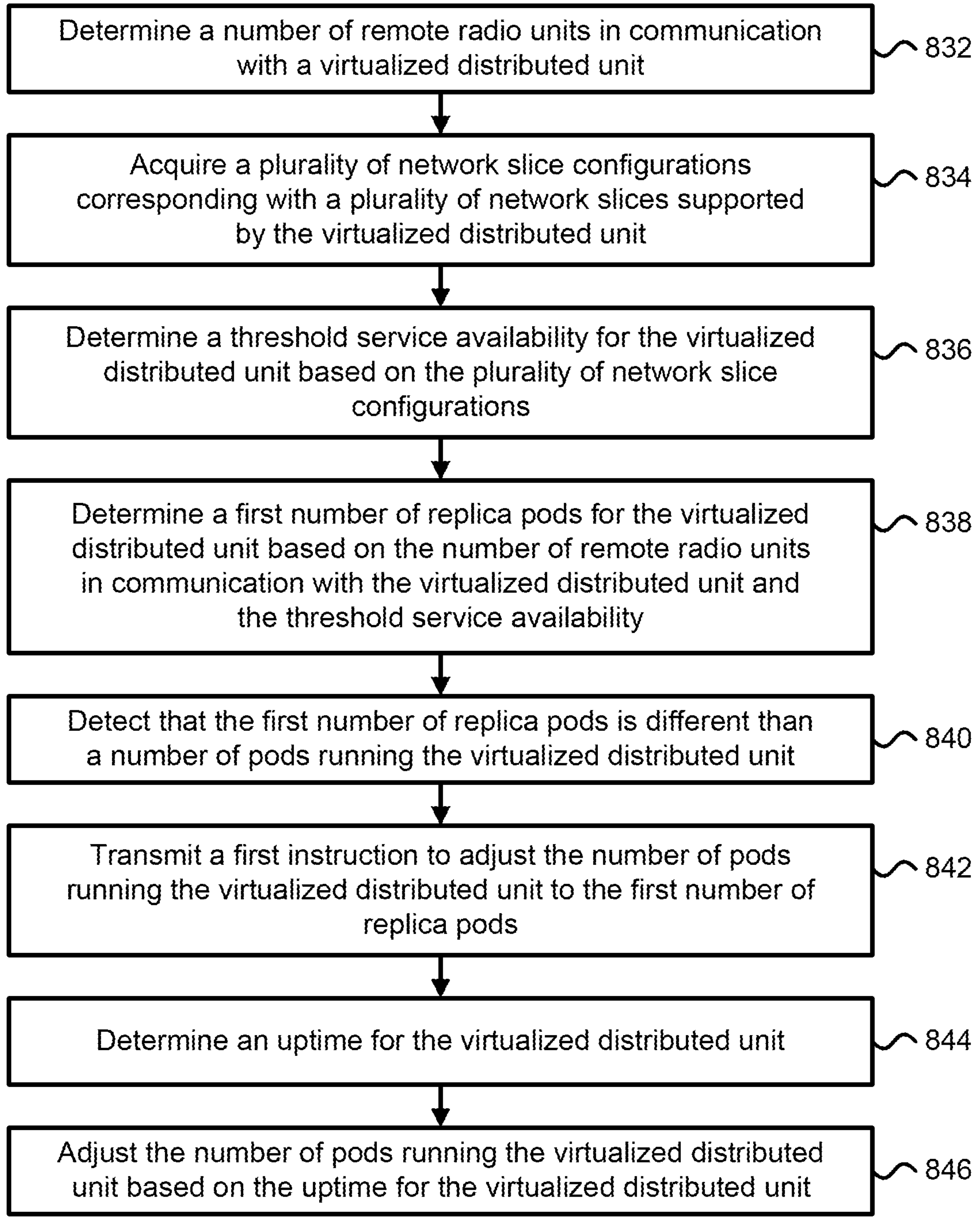
FIG. 8B depicts a flowchart describing an embodiment of a process for maintaining a distributed unit.

FIG. 8B depicts a flowchart describing an embodiment of a process for maintaining a distributed unit. In one embodiment, the process of FIG. 8B may be performed by a core network, such as the core network 130 in FIG. 2E, or a radio access network, such as the radio access network 120 in FIG. 2C. In another embodiment, the process of FIG. 8B may be performed using one or more virtual machines and/or one or more containerized applications. In another embodiment, the process of FIG. 8B may be performed using a containerized environment, such as the containerized environment 279 in FIG. 2E or the containerized environment 279 in FIG. 2C.

In step 832, a number of remote radio units in communication with a virtualized distributed unit is determined. In one example, the virtualized distributed unit may connect to at least ten different remote radio units. In step 834, a plurality of network slice configurations corresponding with a plurality of network slices supported by the virtualized distributed unit is acquired. In step 836, a threshold service availability for the virtualized distributed unit is determined based on the plurality of network slice configurations. In some cases, the service availability may correspond with a percentage of time that the virtualized distributed unit is available for operation or correspond with a particular system uptime. The threshold service availability may be set to the highest service availability required by the plurality of network slice configurations. In step 838, a first number of replica pods for the virtualized distributed unit is determined based on the number of remote radio units in communication with the virtualized distributed unit and the threshold service availability. In one example, the first number of replica pods for the virtualized distributed unit may comprise the number of remote radio units in communication with the virtualized distributed unit.

In step 840, it is detected that the first number of replica pods is different than a number of pods running the virtualized distributed unit. In step 842, a first instruction to adjust the number of pods running the virtualized distributed unit to the first number of replica pods is transmitted. In step 844, an uptime for the virtualized distributed unit is determined. In step 846, the number of pods running the virtualized distributed unit is adjusted based on the uptime for the virtualized distributed unit. In one example, a second instruction may be transmitted to a replication controller to increase the first number of replica pods for the virtualized distributed unit. In some embodiments, the first number of replica pods for the virtualized distributed unit may be reduced in response to detection that an uptime for the virtualized distributed unit is greater than a threshold uptime.

At least one embodiment of the disclosed technology includes determining a first failure rate corresponding with a first set of machines residing within a first data center layer. The first data center layer includes a first router. The method further comprises detecting that the first failure rate has exceeded a threshold failure rate and identifying a second set of machines residing within a second data center layer based on the threshold failure rate in response to detection that the first failure rate has exceeded the threshold failure rate. The second data center layer includes a second router. The method further comprises removing a first redundant link between a third router residing within a third data center layer and the first router in response to detection that the first failure rate has exceeded the threshold failure rate and adding a second redundant link between the third router residing within the third data center layer and the second router.

At least one embodiment of the disclosed technology includes determining a data transfer latency between a mobile computing device and a virtualized distributed unit deployed within a first data center layer, acquiring a latency requirement for communication between the mobile computing device and the virtualized distributed unit, detecting that the data transfer latency is greater than the latency requirement for the communication between the mobile computing device and the virtualized distributed unit, identifying a second data center layer for the virtualized distributed unit in response to detection that the data transfer latency is greater than the latency requirement for the communication between the mobile computing device and the virtualized distributed unit, terminating the virtualized distributed unit within the first data center layer, and deploying the virtualized distributed unit within the second data center layer such that a data transfer latency between the mobile computing device and the virtualized distributed unit deployed within the second data center layer is less than the data transfer latency between the mobile computing device and the virtualized distributed unit when the virtualized distributed unit was deployed within the second data center layer.

At least one embodiment of the disclosed technology includes determining a first number of replica pods for a virtualized distributed unit, detecting that the first number of replica pods is different than a number of pods running the virtualized distributed unit, and transmitting an instruction to a replication controller to adjust the number of pods running the virtualized distributed unit to the first number of replica pods.

At least one embodiment of the disclosed technology includes acquiring a latency requirement for a network connection to user equipment, determining a location within a data center hierarchy for running a user plane function based on the latency requirement for the network connection to the user equipment, routing one or more user plane packets between a radio access network in communication with the user equipment and a data network using the user plane function, and running the user plane function at the location within the data center hierarchy.

In some cases, the method may further comprise identifying a location of a distributed unit (e.g., a virtualized distributed unit) in communication with the user plane function and determining the location within the data center hierarchy for running the user plane function based on the location of the distributed unit.

At least one embodiment of the disclosed technology includes determining a first latency requirement for a first network connection to user equipment, determining a second latency requirement for a second network connection to the user equipment, identifying a set of shared core network functions based on the first latency requirement and the second latency requirement, determining a first set of network functions for a first network slice based on the first latency requirement, and determining a second set of network functions for a second network slice based on the second latency requirement. Both the first set of network functions and the second set of network functions include the set of shared core network functions. The method further comprises concurrently establishing the first network connection to the user equipment using the first set of network functions and the second network connection to the user equipment using the second set of network functions.

At least one embodiment of the disclosed technology includes acquiring a set of quality of service parameters associated with a network connection to user equipment, identifying a set of network functions for establishing the network connection, determining a data center location for running the set of network functions based on the set of quality of service parameters, detecting that the set of network functions may be deployed using a containerized environment within the data center location, and deploying the set of network functions within the containerized environment to establish the network connection in response to detection that the set of network functions may be deployed using the containerized environment.

The disclosed technology may be described in the context of computer-executable instructions being executed by a computer or processor. The computer-executable instructions may correspond with portions of computer program code, routines, programs, objects, software components, data structures, or other types of computer-related structures that may be used to perform processes using a computer. Computer program code used for implementing various operations or aspects of the disclosed technology may be developed using one or more programming languages, including an object oriented programming language such as Java or C++, a function programming language such as Lisp, a procedural programming language such as the "C" programming language or Visual Basic, or a dynamic programming language such as Python or JavaScript. In some cases, computer program code or machine-level instructions derived from the computer program code may execute entirely on an end user's computer, partly on an end user's computer, partly on an end user's computer and partly on a remote computer, or entirely on a remote computer or server.

The flowcharts and block diagrams in the figures provide illustrations of the architecture, functionality, and operation of possible implementations of systems, methods, and computer program products according to various aspects of the disclosed technology. In this regard, each step in a flowchart may correspond with a program module or portion of computer program code, which may comprise one or more computer-executable instructions for implementing the specified functionality. In some implementations, the functionality noted within a step may occur out of the order noted in the figures. For example, two steps shown in succession may, in fact, be executed substantially concurrently, or the steps may sometimes be executed in the reverse order, depending upon the functionality involved. In some implementations, steps may be omitted and other steps added without departing from the spirit and scope of the present subject matter. In some implementations, the functionality noted within a step may be implemented using hardware, software, or a combination of hardware and software. As examples, the hardware may include microcontrollers, microprocessors, field programmable gate arrays (FPGAs), and electronic circuitry.

For purposes of this document, the term "processor" may refer to a real hardware processor or a virtual processor, unless expressly stated otherwise. A virtual machine may include one or more virtual hardware devices, such as a virtual processor and a virtual memory in communication with the virtual processor.

For purposes of this document, it should be noted that the dimensions of the various features depicted in the figures may not necessarily be drawn to scale.

For purposes of this document, reference in the specification to "an embodiment," "one embodiment," "some embodiments," "another embodiment," and other variations thereof may be used to describe various features, functions, or structures that are included in at least one or more embodiments and do not necessarily refer to the same embodiment unless the context clearly dictates otherwise.

For purposes of this document, a connection may be a direct connection or an indirect connection (e.g., via another part). In some cases, when an element is referred to as being connected or coupled to another element, the element may be directly connected to the other element or indirectly connected to the other element via intervening elements. When an element is referred to as being directly connected to another element, then there are no intervening elements between the element and the other element.

For purposes of this document, the term "based on" may be read as "based at least in part on."

For purposes of this document, without additional context, use of numerical terms such as a "first" object, a "second" object, and a "third" object may not imply an ordering of objects, but may instead be used for identification purposes to identify or distinguish separate objects.

For purposes of this document, the term "set" of objects may refer to a "set" of one or more of the objects.

For purposes of this document, the phrases "a first object corresponds with a second object" and "a first object corresponds to a second object" may refer to the first object and the second object being equivalent, analogous, or related in character or function.

For purposes of this document, the term "or" should be interpreted in the conjunctive and the disjunctive. A list of items linked with the conjunction "or" should not be read as requiring mutual exclusivity among the items, but rather should be read as "and/or" unless expressly stated otherwise. The terms "at least one," "one or more," and "and/or," as used herein, are open-ended expressions that are both conjunctive and disjunctive in operation. The phrase "A and/or B" covers embodiments having element A alone, element B alone, or elements A and B taken together. The phrase "at least one of A, B, and C" covers embodiments having element A alone, element B alone, element C alone, elements A and B together, elements A and C together, elements B and C together, or elements A, B, and C together. The indefinite articles "a" and "an," as used herein, should typically be interpreted to mean "at least one" or "one or more," unless expressly stated otherwise.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A system, comprising:

one or more processors configured to:

determine a service availability for a virtualized distributed unit that performs medium access control layer operations;

determine a first number of replica pods to satisfy the service availability for the virtualized distributed unit;

detect that the first number of replica pods is different from a number of pods running the virtualized distributed unit; and transmit a control signal to a replication controller to adjust the number of pods running the virtualized distributed unit to match the first number of replica pods in response to detection that the first number of replica pods is different from the number of pods running the virtualized distributed unit.

2. The system of claim 1, wherein:

the one or more processors are configured to adjust the first number of replica pods for the virtualized distributed unit based on a change to the service availability.

3. The system of claim 2, wherein:

the one or more processors are configured to transmit an instruction to the replication controller to increase the first number of replica pods for the virtualized distributed unit.

4. The system of claim 1, wherein:

the service availability corresponds with a percentage of time that the virtualized distributed unit is available for operation.

5. The system of claim 1, wherein:

the service availability corresponds with a system uptime of at least 99.9%.

6. The system of claim 1, wherein:

the service availability corresponds with a downtime duration of less than five minutes per month.

7. The system of claim 1, wherein:

the one or more processors are configured to detect that the service availability for the virtualized distributed unit is less than a threshold service availability and increase the first number of replica pods for the virtualized distributed unit in response to detection that the service availability for the virtualized distributed unit is less than the threshold service availability.

8. The system of claim 1, wherein:

the one or more processors are configured to detect that an uptime for the virtualized distributed unit is less than a threshold uptime and increase the first number of replica pods for the virtualized distributed unit in response to detection that the uptime for the virtualized distributed unit is less than the threshold uptime.

9. The system of claim 1, wherein:

the one or more processors are configured to detect that an uptime for the virtualized distributed unit is greater than a threshold uptime and decrease the first number of replica pods for the virtualized distributed unit in response to detection that the uptime for the virtualized distributed unit is greater than the threshold uptime.

10. The system of claim 1, wherein:

the virtualized distributed unit runs within a containerized environment.

11. A method, comprising:

determining a service availability for a virtualized distributed unit that performs medium access control layer operations;

determining a first number of replica pods to satisfy the service availability for the virtualized distributed unit;

detecting that the first number of replica pods is different from a number of pods running the virtualized distributed unit; and transmitting an instruction to a replication controller to adjust the number of pods running the virtualized distributed unit to match the first number of replica pods.

12. The method of claim 11, further comprising:

adjusting the first number of replica pods for the virtualized distributed unit based on a change to the service availability.

13. The method of claim 12, wherein:

the adjusting includes transmitting a second instruction to the replication controller to increase the first number of replica pods for the virtualized distributed unit.

14. The method of claim 11, wherein:

the service availability corresponds with a percentage of time that the virtualized distributed unit is available for operation.

15. The method of claim 11, further comprising:

detecting that the service availability for the virtualized distributed unit is less than a threshold service availability; and increasing the first number of replica pods for the virtualized distributed unit in response to detection that the service availability for the virtualized distributed unit is less than the threshold service availability.

16. The method of claim 11, further comprising:

detecting that an uptime for the virtualized distributed unit is greater than a threshold uptime; and decreasing the first number of replica pods for the virtualized distributed unit in response to detection that the uptime for the virtualized distributed unit is greater than the threshold uptime.

* * * * *